United States Patent
Bulzacki et al.

(10) Patent No.: US 12,106,625 B2
(45) Date of Patent: Oct. 1, 2024

(54) SYSTEMS AND METHODS FOR TRACKING PLAYING CHIPS

(71) Applicant: ARB LABS INC., Toronto (CA)

(72) Inventors: Adrian Bulzacki, Mississauga (CA); Vlad Cazan, Thornhill (CA); Muhammad Talal Ibrahim, Niagara Falls (CA); Alexander George Stal, Grimsby (CA)

(73) Assignee: ARB LABS INC., Toronto (CA)

( * ) Notice: Subject to any disclaimer, the term of this patent is extended or adjusted under 35 U.S.C. 154(b) by 0 days.

(21) Appl. No.: 17/769,056

(22) PCT Filed: Oct. 15, 2020

(86) PCT No.: PCT/CA2020/051382
§ 371 (c)(1),
(2) Date: Apr. 14, 2022

(87) PCT Pub. No.: WO2021/072540
PCT Pub. Date: Apr. 22, 2021

(65) Prior Publication Data
US 2024/0119791 A1    Apr. 11, 2024

Related U.S. Application Data

(60) Provisional application No. 62/915,460, filed on Oct. 15, 2019.

(51) Int. Cl.
*G07F 17/32* (2006.01)
*G06T 7/246* (2017.01)
(Continued)

(52) U.S. Cl.
CPC .......... *G07F 17/3209* (2013.01); *G06T 7/248* (2017.01); *G06T 7/292* (2017.01);
(Continued)

(58) Field of Classification Search
CPC .......................... G07F 17/322; G07F 17/3232
See application file for complete search history.

(56) References Cited

U.S. PATENT DOCUMENTS

| 9,779,582 B1* | 10/2017 | Ben Hanan | ......... G07F 17/3225 |
| 2005/0272501 A1* | 12/2005 | Tran | ..................... G07F 17/3241 |
| | | | 463/29 |

(Continued)

FOREIGN PATENT DOCUMENTS

WO    2018227294 A1    12/2018

OTHER PUBLICATIONS

Micro Tech Lab: "Sensor sensitivity (ISO) 1-15 in digital cameras", Jul. 6, 2012 (Jul. 6, 2012), XP093121646, Retrieved from the Internet: URL:https://www.Imscope.com/en/Digital_Camera_Sensitivity_ISO_en.html [retrieved on Jan. 19, 2024].

(Continued)

*Primary Examiner* — James S. McClellan
(74) *Attorney, Agent, or Firm* — Norton Rose Fulbright Canada LLP

(57) ABSTRACT

Systems and methods of tracking playing chips on a gaining table. The system may include a game playing surface, a chip tray including a plurality of chip storage formations for receiving playing chips, a light emitting device to illuminate the playing chips, and a diffuser associated with the light emitting device to modify the light emitted by the light emitting device into a second light distribution pattern. Images of the illuminated playing chips are processed to identify the one or more playing chips and the one or more playing chip amounts associated with the one or more playing chips. The playing chip amounts are transmitted to a gaining monitoring server.

20 Claims, 52 Drawing Sheets

(51) Int. Cl.
  *G06T 7/292*  (2017.01)
  *G06T 7/80*  (2017.01)
  *G06V 10/10*  (2022.01)
  *G06V 20/52*  (2022.01)
  *H04N 23/74*  (2023.01)
  *H04N 23/90*  (2023.01)

(52) U.S. Cl.
  CPC ............... *G06T 7/80* (2017.01); *G06V 10/10* (2022.01); *G06V 20/52* (2022.01); *G07F 17/322* (2013.01); *G07F 17/3232* (2013.01); *G07F 17/3241* (2013.01); *G07F 17/3248* (2013.01); *H04N 23/74* (2023.01); *G06T 2207/20212* (2013.01); *H04N 23/90* (2023.01)

(56) References Cited

U.S. PATENT DOCUMENTS

| | | | |
|---|---|---|---|
| 2006/0019739 A1 | 1/2006 | Soltys et al. | |
| 2007/0077987 A1 | 4/2007 | Gururajan et al. | |
| 2017/0112416 A1 | 4/2017 | Hao et al. | |
| 2017/0330414 A1* | 11/2017 | Dallmeier | ........... G07F 17/3209 |
| 2018/0350191 A1* | 12/2018 | Shigeta | ............... G07F 17/3293 |

OTHER PUBLICATIONS

European Patent Office (EPO), Extended European Search Report to EP Application No. 20876387.0, Feb. 1, 2024.
Canadian Intellectual Property Office (CIPO), International Search Report and Written Opinion to PCT Application No. PCT/CA2020/051382, Dec. 8, 2020.

* cited by examiner

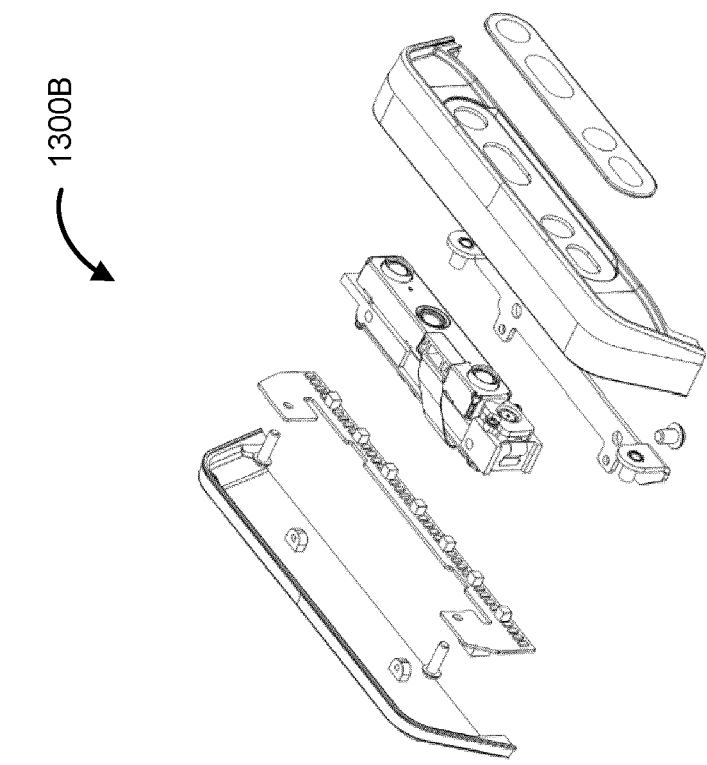
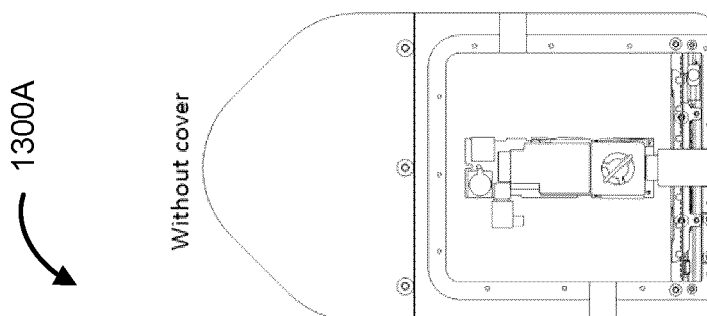
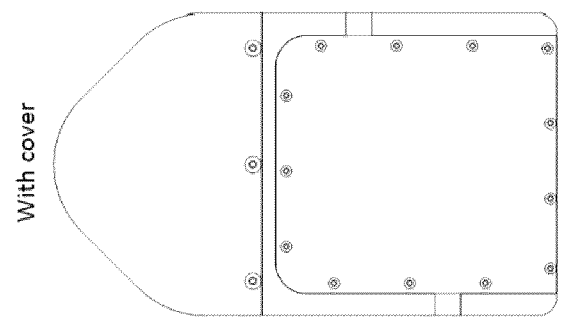
FIG. 13B
FIG. 13A

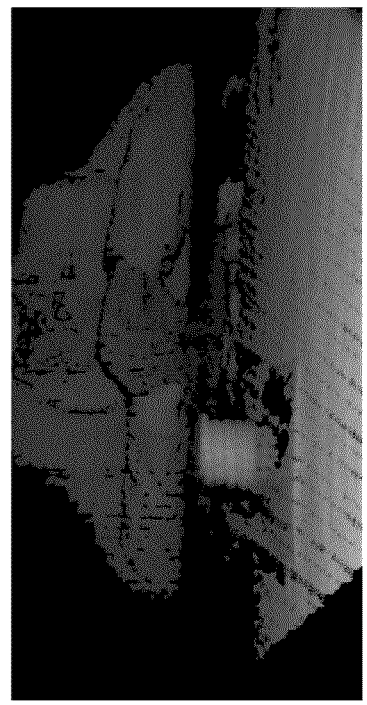
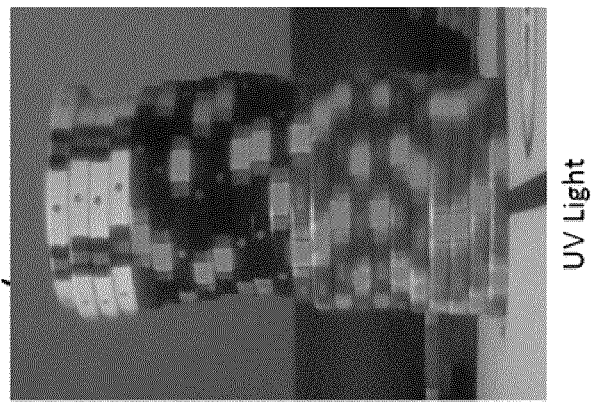
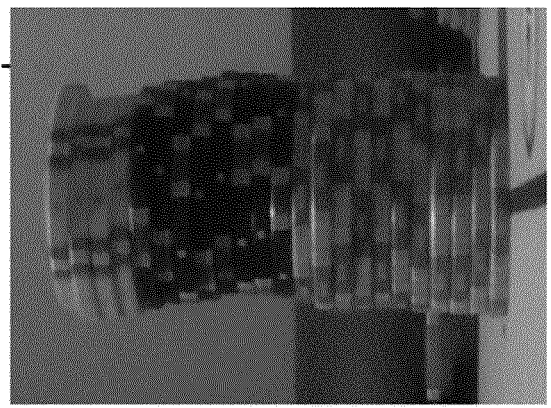
FIG. 14B
FIG. 14A

Examples of 2D sinusoids of varying frequencies of size 255 × 255 with $A = 10$ and $\phi = 0$.

Passbands are represented by the greyish area. a) Frequency partition b) Frequency partition map of Gabor filter bank.

Example of Quincunx downsampled image. a) Cameraman. b) Downsampled by $Q$.

Types of ideal passbands for DFB structure
a) For modulated structure
b) For non-modulated structure Sang DFB structure. a) First stage. b) Second stage. c) Third stage.

3-stage DDFB structure proposed in [20].

DDFB structure  a) First stage. b) Second stage. c) Third stage.

a) Frequency response of 2D low-pass filter. b) Frequency response of 2D filter after applying Quincunx downsampling matrix. c) Frequency response of $v(x,y)$. d) Frequency response of $h(x,y)$.

5100

```
receive image data reflective of the playing chips illuminated by
diffused light
5002
```
↓
```
process the image data with a classifier, the classifier trained to
identify chip locations of the playing chips and one or more chip
types associated with each chip location by comparing the image
data to reference image data reflective of reflected diffused light
in the normalized feature range incident on reference playing
chips illuminated by the diffused light and captured with a
reference camera having the static sensor sensitivity values for
perceiving reflected diffused light within the normalized feature
range
5104
```
↓
```
determine a series of amounts reflective of an amount of chip
locations associated with each of the one or more chip types
5106
```
↓
```
transmit the series of amounts to a game monitoring server
5108
```

FIG. 51 activate a light emitting device to emit a light towards the playing chips in a chip tray, the light emitted according to a light source distribution pattern, wherein a diffuser is positioned between the light emitting device and the chip tray, the diffuser modifying the light passing through the diffuser into a diffused light emitted according to a second light distribution pattern, the second light distribution pattern calibrated to reflect the diffused light incident on the playing chips towards the camera
5202 capture image data, with a camera preprogrammed to generate image data based on optimized sensor sensitivity values, the camera positioned to capture the image data of the playing chips, the camera having one or more image signal processing features disabled to generate the image data based on static sensor sensitivity values, the camera static sensor sensitivity values perceiving reflected diffused light within a normalized feature range
5204 train a classifier based on identifying a chip location of each of the playing chips in the image data based on the normalized feature range; identifying a chip type of one or more chip types for each identified chip location based on the normalized feature range; and adjusting the one or more diffusion calibration parameters to have the classifier identify the identified boundaries of the playing chips and the corresponding type of the playing chips
5206 store the one or more diffusion calibration parameters on a memory
5208

SYSTEMS AND METHODS FOR TRACKING PLAYING CHIPS

CROSS REFERENCE

This application is a non-provisional of, and claims all benefit, including priority, to: U.S. Application No. 62/915,460, entitled: SYSTEMS AND METHODS FOR TRACKING PLAYING CHIPS, filed Oct. 15, 2019, incorporated herein by reference.

FIELD

Embodiments of the present disclosure relate to the field of tracking gaming activity, and in particular to systems and methods of tracking playing chips on gaming tables.

BACKGROUND

Gaming establishments, such as casinos, offer a variety of card games or non-card games to patrons. The variety of games require player actions via one or more playing chips, in place of currency, and tracking the playing chips in an accurate, quick, and reliable manner is challenging.

Gaming establishments have diverse environment layouts, including lighting levels, air quality levels, etc., which may increase the difficulty in tracking chips. Playing chips may have a variety of designs, including colors, markers, between establishments, making accurately, quickly, and reliably detecting playing chips between gaming establishments difficult to accomplish with a single system.

SUMMARY

Systems and methods described herein may be directed to tracking playing chips exchanged during gaming activity within a gaming establishment, such as a casino or the like, using one or more images of the playing chips. The one or more images of the playing chips may be captured with a camera capturing light incident upon the playing chips.

Technical challenges associated with tracking playing chips through captured images in an environment having the one or more lights include adjusting the environment, via the one or more lights, to provide sufficient light to be incident upon the one or more playing chips to enable consistent images. In example embodiments, the technical challenges include: (1) emitting light to provide consistent image quality across a variety of different gaming environments, including, variety of establishment controlled environmental variables (e.g., differences in lighting employed between establishments, and the related geometries), user generated environmental variables (e.g., shadows cast by players, smoke from cigars, etc.), (2) emitting light to provide consistent image quality across a variety of different playing chips from different gaming establishments (e.g., a casino may employ a unique type of playing chip, which various playing chips may have different properties in reflecting light), and (3) positioning the one or more lights to provide sufficient and consistent illumination of the playing chips without impeding playing of the gaming game.

In addition to the technical challenges associated with manipulating the environment of the playing chips, tracking playing chips through captured images can also include the technical challenges associated with processing image data reflective of one or more images captured by a camera. The technical challenges can include: (1) configuring the image processing to detect playing chip amounts reflective of the amount and type of chips in the environment quickly, and with the use of limited computing resources which may be embedded in a small space, and (2) calibrating the image processing techniques (e.g., a classifier or other machine learning image detection model) to be portable between varying gaming establishment environments, and (3) creating image processing techniques which are capable of being adjusted depending on gaming establishment playing chips without extensive recalibration.

Embodiments described herein may include one or more chip trays including a plurality of chip storage apertures for receiving playing chips. One or more lighting devices emit light according to a light emitting device distribution pattern towards the one or more playing chips within the chip storage apertures. A camera is positioned to capture one or more images of playing chips when they are illuminated.

One or more diffusers are associated, respectively, with the one or more lighting devices and positioned between the one or more lighting devices and the playing chips. The one or more diffusers diffuse or modify the light emitted according to the light emitting device distribution pattern passing through the diffuser into a diffused light emitted according to a second light distribution pattern, the second light distribution pattern emitting light at a more uniform intensity over the one or more playing chips relative to the light emitting device distribution pattern. The camera captures one or more images of the playing chips illuminated with the diffused light. The diffused light may cover a greater area of the chip tray, compared to the light emitted according to the light emitting device distribution pattern. The diffused light may be in the shape of an ellipse or circle or other shapes.

In example embodiments, capturing images, with the camera, of the one or more playing chips illuminated with the diffused light provides more consistent and normalized images of the playing chips within the chip trays. For example, the light emitted according to the second distribution pattern may provide a relatively uniform intensity of light distribution across the playing chips within the chip tray, such that the captured color of a chip nearest to the light emitting device is similar to the captured color of a chip furthest from the light emitter, to the extent possible. The color variation between the playing chips both further away from and closer to the one or more lights may be more consistent irrespective of the gaming environment. For example, in a generally darker gaming environment, the color of the near and distant playing chips may be captured as being darker, but the darker color may be more consistent between the playing chips.

The more normalized the images captured by the camera as a result of the diffused light may allow for the disabling of various automatic clarifying features of the cameras. Cameras, which may include preprogrammed clarifying features intended to increase the clarity of captured images, such as auto brightness features, auto balancing features, etc., may be configured to deactivate said preprogrammed clarifying features in order to promote normalization between captured images. For example, the camera clarifying features may introduce undesirable variability into the captured images, as a result of changing brightness between images, and said automatic clarifying feature may be disabled during the course of capturing one or more images of the one or more playing chips.

According to further example embodiments, capturing images, with the camera, of the one or more playing chips illuminated with the light being emitted according to the second light distribution pattern provides for more normalized captured images across various gaming establishments, which allows for simpler image processing techniques to be used. For example, one or more playing chips illuminated with the diffused light may be illuminated to a minimum extent by the light emitting device of the system, irrespective of the lighting conditions within the gaming establishment. Continuing the example, the one or more lights may be adjusted to get more intense light in response to a darker casino environment, and the diffuser adjusting the light from the light emitting device to be emitted according to the second client distribution pattern may more uniformly distributed lay across the one or more playing chips, preventing a minimum amount of shadows within the image. This normalization of the images may provide for image processing techniques that are less focused on adjusting to a plethora of lighting conditions in different gaming establishments, and more accurate at detecting playing chips and playing chip amounts in fewer environmental conditions.

Moreover, according to some embodiments, for example, capturing images, with the camera, of the one or more playing chips illuminated with the light being emitted according to the second light distribution pattern provides for more normalized captured images in a variety of different environments. For example, shadows cast by players or other objects onto the playing chips within the chip tray, which shadows are inherently localized, may not impact the captured image of the playing chips as a result of the more even distribution of light incident on the playing chips as a result of light being emitted according to the second light distribution pattern.

The diffuser may only allow light emitted according to the second light distribution pattern to pass through, which pattern may minimize the amount of light emitted in a direction other than the one or more playing chips. For example, the second light distribution pattern may be asymmetrical across a horizontal axis, wherein most of the light being emitted above a certain horizontal axis may be prevented from doing so, preventing light being emitted directly into players eyes.

In example embodiments, the cameras are capable of capture images according to a variety of different channels, including for example a red, green, blue channel, an incorrect channel, and so forth, and similarly the lights and diffusers are capable of emitting and filtering light of a variety of different wavelengths.

The systems and methods described herein which include the diffuser may further allow for a decrease in the amount of the one or more lights used to illuminate the playing chips as a result of the more even distribution of light across the plain chips.

In example embodiments where multiple cameras are used to track gaming activities including one or more playing chips, the systems and methods which include the diffuser may allow for fewer cameras being used while maintaining a requisite level of accuracy.

Image data reflective of one or more images captured by the camera are provided to a processor which processes the captured one or more images determine one or more playing chip amounts of the one or more playing chips. In example embodiments, the processor identifies the one or more playing chips in the chip tray in the one or more images based on reference representations of playing chips illuminated with the diffused light in a reference representation library. For example, the processor may compare and one or more playing chips in the one or more images to all reference representations of playing chips in the reference representation library to determine the most similar reference representation, and assign the playing chip value of the most similar reference representation to the respective playing chip.

As a result of the more normalized image representations of the playing chips, which may be an effect of the diffused light being incident on the playing chips, the image processing techniques used to track playing chips may require less computational resources to account for environmental variables when identifying the playing chips and the one or more images. For example, the classifier used to identify playing chips and the one or more images may require fewer layers, or simpler activation functions as a result of the captured images being more normalized. The less computational resource intensive and processing techniques may in turn allow for systems for tracking gaming activity which are smaller and faster.

In example embodiments, the reference representation library, as a result of image processing techniques trained on more normalized images, can be generated on-site at a specific gaming establishment, increasing the portability of the system. For example, one or more images of the gaming establishment specific playing chips in the chip tray may be captured by the camera, annotated, and be used as the reference representation.

The diffuser diffusing the emitted light into a diffused light emitted according to the second light distribution pattern may advantageously allow for more optimal position of the one or more lights. For example, the result of the more even distribution of light across the playing chips, the one or more lights may be positioned with greater distance between the lights.

In an aspect, a non-transitory computer-readable medium or media having stored thereon machine interpretable instructions which, when executed by a processor may cause the processor to perform one or more methods as described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. In addition, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 13A and 13B illustrate views of a cage device, in accordance with embodiments of the present application;

FIGS. 14A and 14 B illustrate image capture data, in accordance with embodiments of the present application;

FIG. 51 illustrates another further method of tracking playing chips, in accordance with an embodiment of the present application; and FIG. 52 illustrates a flowchart of a method of calibrating a system for tracking playing chips, in accordance with an embodiment of the present application.

DETAILED DESCRIPTION

Examples of embodiments described herein relate to playing chips and game playing tables at gaming establishments. However, embodiments described herein may also relate to other environments associated with exchange of resources, such as precious metal or resources (e.g., diamonds) exchange trading establishments, retail store establishments, currency stock exchange environments, or the like. In example gaming establishments, such as casinos, cameras may be used for tracking activities within the gaming establishments.

There are challenging technical problems associated with tracking activities with cameras within gaming establishments.

First, environment conditions can be variable, such as irregular lighting, variable air quality, or other environmental features, deteriorating image quality. In approaches where playing chips are tracked via being detected in captured images, the changing environmental conditions can make it difficult to track playing chips. For example, the images may include bright spots that wash out colors of objects, making detection based on color within images difficult. In another example, shadows or inadequate lighting may generate false boundaries associated with shadows or lack of differentiation between portions of the image which are poorly lit, making detecting features associated with or based on boundaries difficult. Images which are normalized, or capture features within an image in a consistent manner are desirable.

Moreover, tracking playing chips based on captures image data requires methods that require limited computational resources, and that are adaptable to various gaming establishment environments. Image processing techniques which have a high latency may detect playing chips too late to stop a theft or other improper conduct by an employee. A further technical challenge associated with tracking playing chips based on captures image data is that the available means made to be assigned for limited computing resources. For example, computing resources available (e.g. as a result of the available space, or as a result of existing legacy computing infrastructure) may be limited, and image processing techniques made to be capable of being implemented in remedy computing resource environments.

Improved systems and methods of tracking gaming activity, such as tracking playing chip exchange on a gaming surface (alternatively referred to as gaming tables), are desirable.

Figure 1:
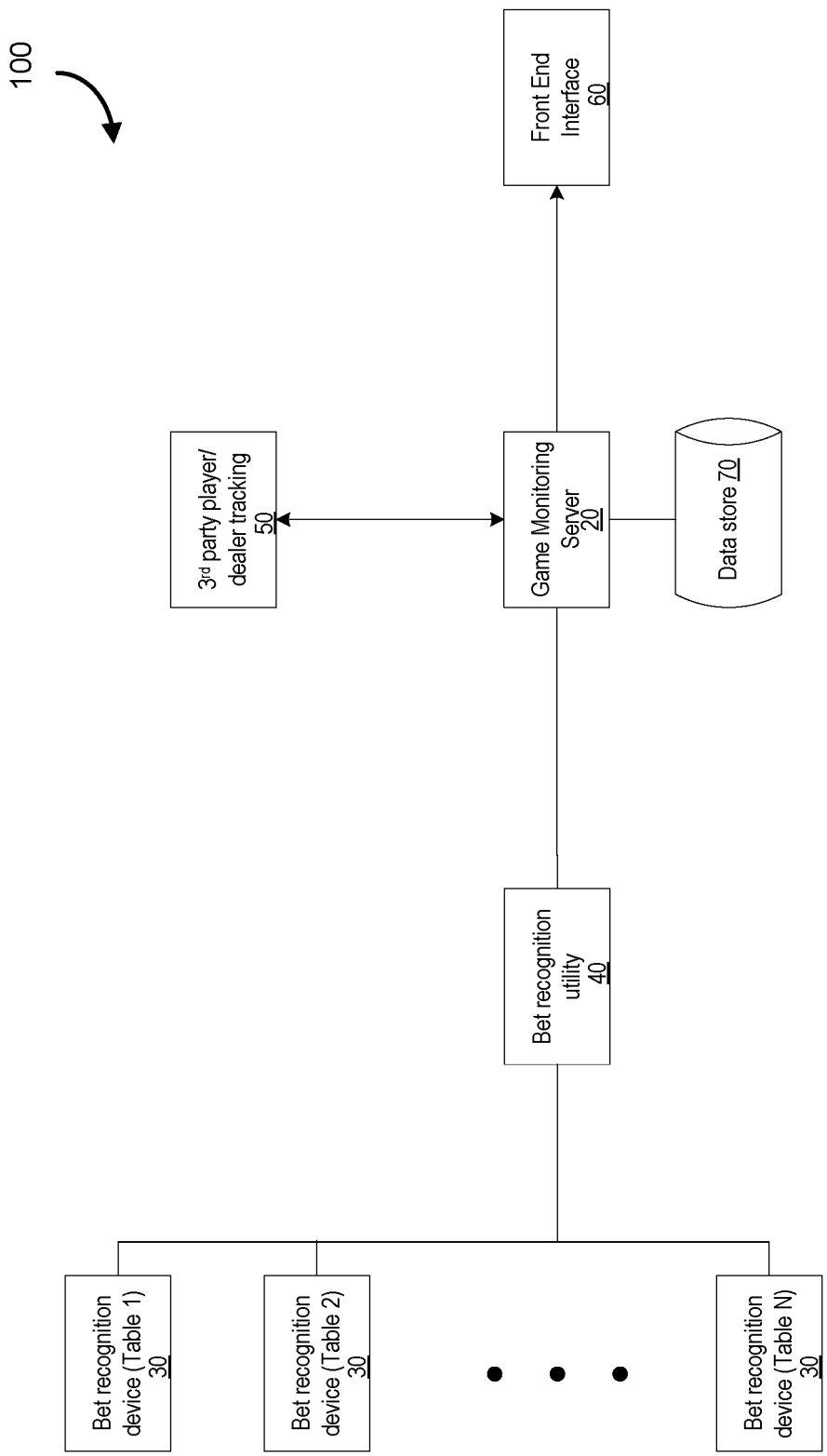
FIG. 1 illustrates a block diagram of a system for monitoring gaming activities at gaming tables, in accordance with embodiments of the present application.

Reference is made to FIG. 1, which illustrates a block diagram of a system 100 for monitoring gaming activities occurring on a gaming surface, in accordance with some embodiments of the present application. The system 100 may be configured such that sensors and/or cameras (alternatively referred to as image capture device(s)) are utilized to track gaming activities. The system may generate sensory data that may be sent to a central system for processing. The gaming activities include one or more playing chips being placed in gaming areas, and the sensors and/or cameras may include sensors adapted for capturing images of the gaming areas to be used in conjunction with machine vision processing techniques. The system 100 may include chip amount recognition devices 30 (1 to N) integrated with gaming tables (1 to N). The chip amount recognition devices 30 may include various sensors and cameras, among other physical hardware.

Each chip amount recognition device 30 may include a camera(s) for capturing image data for the gaming table surface. The gaming table surface has defined gaming areas, and the camera(s) captures image data for the gaming areas. A transceiver transmits the captured image data (i.e., one or more images) over a network. In example embodiments, the chip amount recognition device 30 receives calibration data for calibrating the chip amount recognition device for the gaming areas. According to some example embodiments, the chip amount recognition device 30 calibrates based on image data captured by the chip amount recognition device 30. Chip amount recognition device 30 may also include a sensor component and a scale component. The image data may, for example, focus on a particular region of interest or regions of interest that are within the field of view of the sensor component.

In some embodiments, the chip amount recognition devices 30 are hardware electronic circuitry that are coupled directly to or indirectly to a gaming surface. In some embodiments, the chip amount recognition device 30 may be integrated into the gaming surface. The chip amount recognition device 30 may be provided as a retrofit for exiting gaming surfaces (e.g., screwed in, provided as part of a chip tray, or the like).

The chip amount recognition devices 30 may further include illuminating components (e.g., lights) or other components utilized to increase the accuracy of the chip amount recognition. For example, an illuminating bar may be provided that provides direct illumination to chip stacks such that the cameras is more able to obtain consistent imagery, which may aid in processing and/or pre-processing of image data. The illuminating bar may include more than one light emitting device to increase the amount of illumination provided.

In some embodiments, another component may include pressure sensitive sensors in a gaming area to identify when chips are present in the gaming area. In some embodiments, the weight of chips (e.g., which can be used to infer a number of chips) can be cross-checked against captured image data.

The chip amount recognition device 30 may have one or more processors or computational capabilities directly built into the chip amount recognition device 30. In some embodiments, these computational capabilities may be used to improve efficiency (e.g., file-size, relevancy, redundancy, load balancing) of images ultimately provided to a central system for downstream processing. According to further example embodiments, all processing is conducted on the chip amount recognition device 30 which has sufficient computational capabilities, by way of special purposes processors used for chip amount recognition, or otherwise.

The chip amount recognition device 30 may include some storage features for maintaining past data and records. Some implementations (e.g., those related to rapid gaming activities) provide for a relatively small window of processing time and store a limited amount of information. Pre-processing the images in accordance with the disclosure set out herein may increase computational speed.

In some embodiments, the chip amount recognition device 30 contains multiple physical processors, each of the physical processors associated with a corresponding sensor and adapted to track a particular gaming area. In such an embodiment, the system has increased redundancy as the failure of a processor may not result in a failure of the entirety of chip amount recognition capabilities, and the system may also provide for load balancing across each of the physical processors, improving the efficiency of computations. Each sensor may be tracked, for example, using an individual processing thread.

The system 100 includes a game monitoring server 20 with a processor coupled to a data store 70. In some embodiments, the game monitoring server 20 may reside on, near or proximate the gaming surface or gaming table. For example, the game monitoring server 20 may include a computing system that is provided as part of a dealer terminal, a computer that is physically present at a gaming table or surface, etc. In example embodiments, the game monitoring server 20 is integrated with the chip amount recognition device 30.

The game monitoring server 20 may be configured to aggregate gaming activity data received from chip amount recognition devices 30 and to transmit commands and data to chip amount recognition devices 30 and other connected devices. The game monitoring server 20 processes and transforms the gaming activity data from various chip amount recognition devices to compute chip amount data and to conduct other statistical analysis.

Respective chip amount recognition devices 30 may be linked to a particular gaming table and may monitor game activities at the gaming table. A gaming table may be retrofit to integrate with a chip amount recognition device 30. Chip amount recognition device 30 may include a cameras as described herein. In some embodiments, chip amount recognition device may also include sensors or scales to detect chips.

Chip amount recognition utility device 40 may connect chip amount recognition devices 30 to the game monitoring server device 20. Chip amount recognition utility 40 may act as a hub and aggregate, pre-process, normalize or otherwise transform game activity data, including image data of the gaming tables. Chip amount recognition utility 40 may be linked to a group of gaming tables, or a location, for example. In some embodiments, chip amount recognition utility 40 may relay data. In example embodiments, similar to the game monitoring server device 20, the chip amount recognition utility 40 may be integrated into the chip amount recognition device 30.

Chip amount recognition utility device 40, for example, may be a central system server cluster or data center that has a larger set of available computing resources relative to the game monitoring server 20. The chip amount recognition utility device 40 may be configured to provide image data in the form of extracted and/or compressed information, and may also receive accompanying metadata tracked by the chip amount recognition device 30, such as timestamps, clock synchronization information, dealer ID, player ID, image characteristics (e.g., aperture, shutter speed, white balance), tracked lighting conditions, reference illumination settings, among others.

The accompanying metadata, for example, may be used to provide characteristics that are utilized in a feedback loop when gaming outcomes are tracked. For example, the type of image characteristics or reference illumination characteristics of the chip amount recognition utility device 40 may be dynamically modified responsive to the confidence and/or accuracy of image processing performed by the chip amount recognition utility device 40. In some embodiments, the chip amount recognition utility device 40 extracts from the image data a three-dimensional representation of the gaming and maybe used to track not only gaming values but also chip positioning, orientation, among others. This information may, for example, be used to track patterns of gaming and relate the patterns to hand outcomes, the provisioning of complimentary items, player profile characteristics, etc.

The system may also include a front end interface 60 to transmit calculated gaming data (e.g., chip amounts associated with the playing chips), and receive game event requests from different interfaces. Front end interface 60 may reside on different types of devices. Front end interface 60 may provide different reporting services and graphical renderings of gaming data for client devices. Reports may be selectable by date, time, table, dealer, action range, and by player, for instance.

Reports may include, but are not limited to, player average action, player side action average, player hands per hour (game decisions summary report), player maximum and minimum action, player total action, player side action total, side action participation per game (e.g., as a percentage), table hands per hour, dealer hands per hour (e.g., dealer speed ranking by spot), table action per hour, dealer efficiency (e.g., weighted average against the casino average by dealer), dealer efficiency relative to number of players, dealer ranking vs peers by game, dealer side action participation percentage, action per seat per hour, player initial action, player theoretical losses, side action theoretical losses, total theoretical losses, live hours per table and pit, and player utilization, among others.

Graphical renderings of gaming data may be used, for example, by various parties and/or stakeholders in analyzing gaming trends. Gaming facilities may track the aggregate amounts of actions by account, demographic, dealer, game type, action type, etc. Dealers may utilize gaming information on a suitable interface to verify and/or validate gaming that is occurring at a table, pit bosses may use the gaming information to more accurately determine when complimentary items should be dispensed and provided, etc.

Front end interface 60 may provide an interface to game monitoring server 20 for end user devices and third-party systems 50. Front end interface 60 may generate, assemble and transmit interface screens as web-based configuration for cross-platform access. An example implementation may utilize Socket.io for fast data access and real-time data updates.

Front end interface 60 may assemble and generate a computing interface (e.g., a web-based interface). A user can use the computing interface to subscribe for real time game event data feeds for particular gaming tables, via front end interface 60. The interface may include a first webpage as a main dashboard where a user can see all the live gaming tables and gaming data in real time, or near real time. For example, the main dashboard page may display gaming data, hand count data, player count data, dealer information, surveillance video image, and so on. Gaming data may include, for example, total average and hourly average actions per hand, player or dealer, per hour gaming data for each gaming table in real time, and so on. The display may be updated in real-time.

Front end interface 60 may include a historical data webpage, which may display historical gaming data of a selected gaming table. It may allow the user to browse the historical gaming data by providing a date range selecting control. The gaming data may be organized hourly, daily, monthly, and so on depending on the range the user chooses. The gaming data along with the hand data and a theoretical earning coefficient may be used to estimate the net earnings of the gaming table over the selected date period.

A server and client model may be structured based on receiving and manipulating various sorts of game event data, such as hand count data, gaming data, player data, dealer data, and so on. The interface may be expanded to process other types of game data such as average action per hands on a table. Gaming data can be displayed on the monitor or management page in an additional graph, for example. The date range selection tool may be used for analyzing the added data along with the gaming data. Similarly, the main dashboard may show real-time statistics of both the gaming data and the additional game data.

In some embodiments, the chip amount recognition utility device 40 may receive activation/deactivation signals obtained from various external devices, such as an external shoe, a hand counting system, a player account registration system, a pit boss/employee manual triggering system, etc. These external devices may be adapted to transmit signals representative of when a gaming event has occurred or has terminated. For example, a specially configured dealer shoe may be operated to transmit signals when the dealer shoe is shaken, repositioned, activated, etc., or a hand counting system may be interoperating with the chip amount recognition utility device 40 to indicate that a new round of gaming has occurred, etc. In some embodiments, gaming may be triggered based on the particular game being played in view of pre-defined logical rules establishing when gaming rounds occur, when optional gaming is possible (e.g., side-actions, insurance actions, progressive actions), etc.

The system 100 may also integrate with one or more third party systems 50 for data exchange. For example, a third party system 50 may collect dealer monitoring data which may be integrated with the gaming data generated by game monitoring server device 20. As another example, a third party system 50 may collect player monitoring data which may be integrated with the gaming data generated by game monitoring server device 20.

Figure 2:
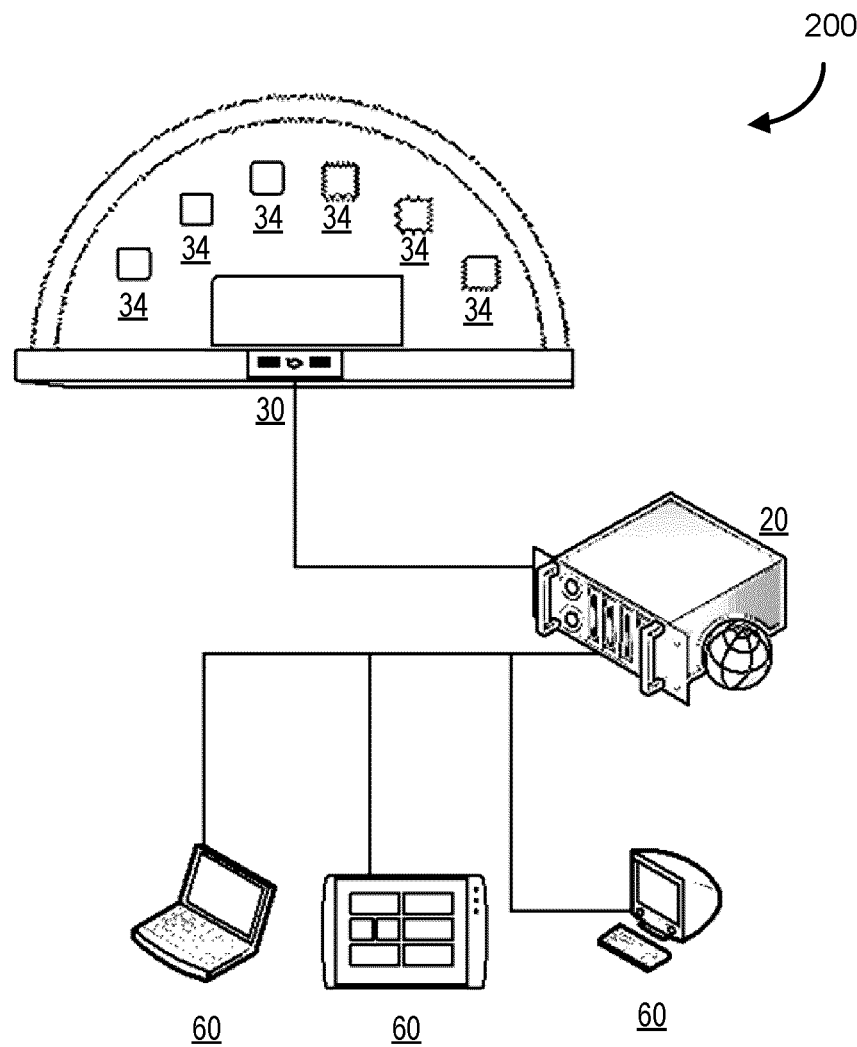
FIG. 2 illustrates a block diagram of a system for tracking playing chips on a gaming table, in accordance with embodiments of the present application.

Reference is made to FIG. 2, which illustrates a block diagram 200 of a system for tracking playing chips on a gaming table, in accordance with some embodiments of the present application. The system 200 may include chip amount recognition devices 30 at a gaming table with defined gaming areas 34 on the gaming table surface. In the system of FIG. 2, the chip amount recognition device 30 may couple to the game monitoring server 20 to provide image data of the gaming table surface and the gaming areas 34. In some embodiments, one or more computing devices may communicate with the game monitoring server 20.

Figure 3:
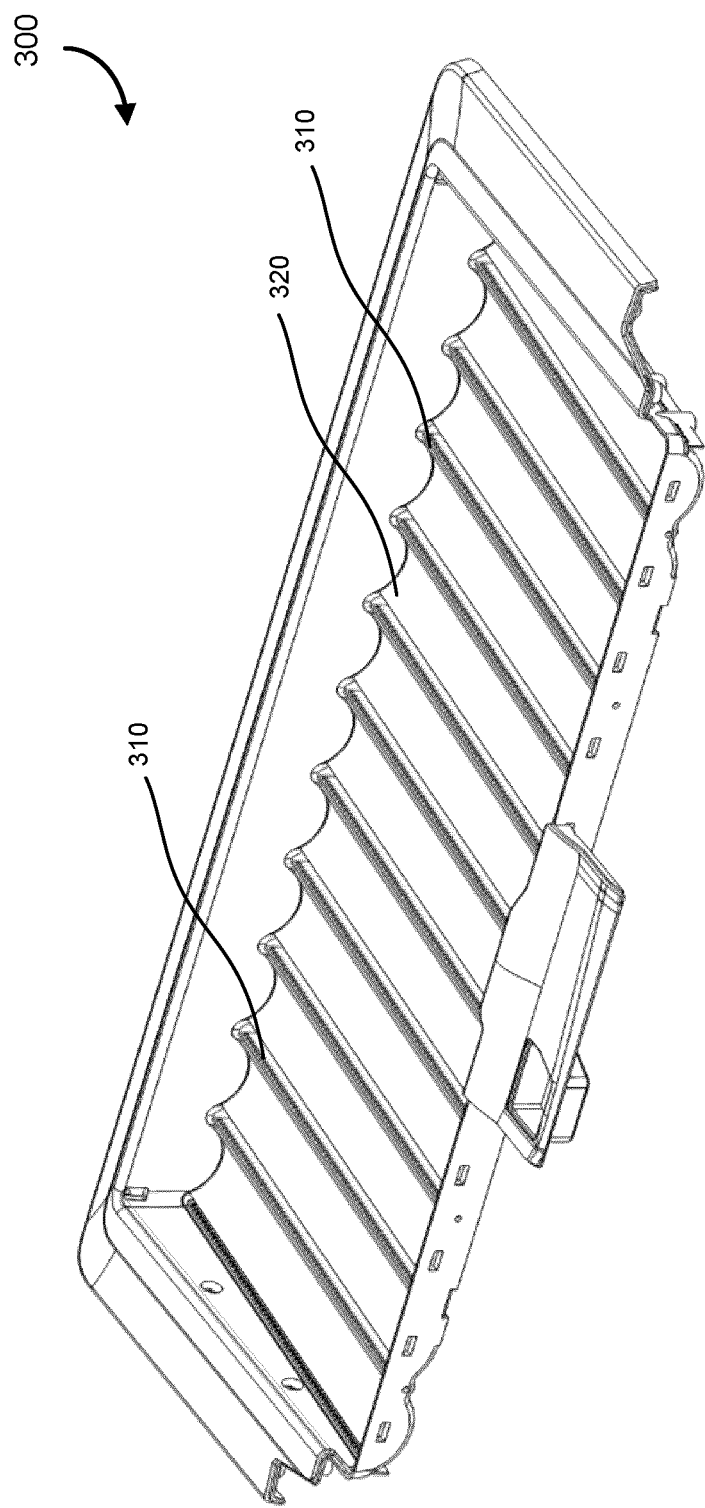
FIG. 3 illustrates a partial cutaway view of a chip tray for storing playing chips, in accordance with embodiments of the present application.

In some scenarios, it may be desirable to track a number of playing chips, or resource markers, within a chip tray. To illustrate, reference is made to FIG. 3, which illustrates a partial cutaway views of a chip tray 300 for storing playing chips, in accordance with an embodiment of the present application. In FIG. 3, a perspective view of a chip tray with one or more sensors 310 along chip storage aperture 320 is shown. The chip storage aperture 320 may store cylindrical shaped gaming chips. In some other embodiments, the gaming chips may be configured as other shapes and the chip storage aperture may include a corresponding shape for receiving the gaming chips.

The one or more sensors 310 may include RGB sensors (e.g., based on red, green, and/or blue additive color model) or infrared (IR) sensors. The one or more sensors 310 may be configured to provide sensor data based on sensing the presence of chips within the chip storage aperture 320.

Figure 4:
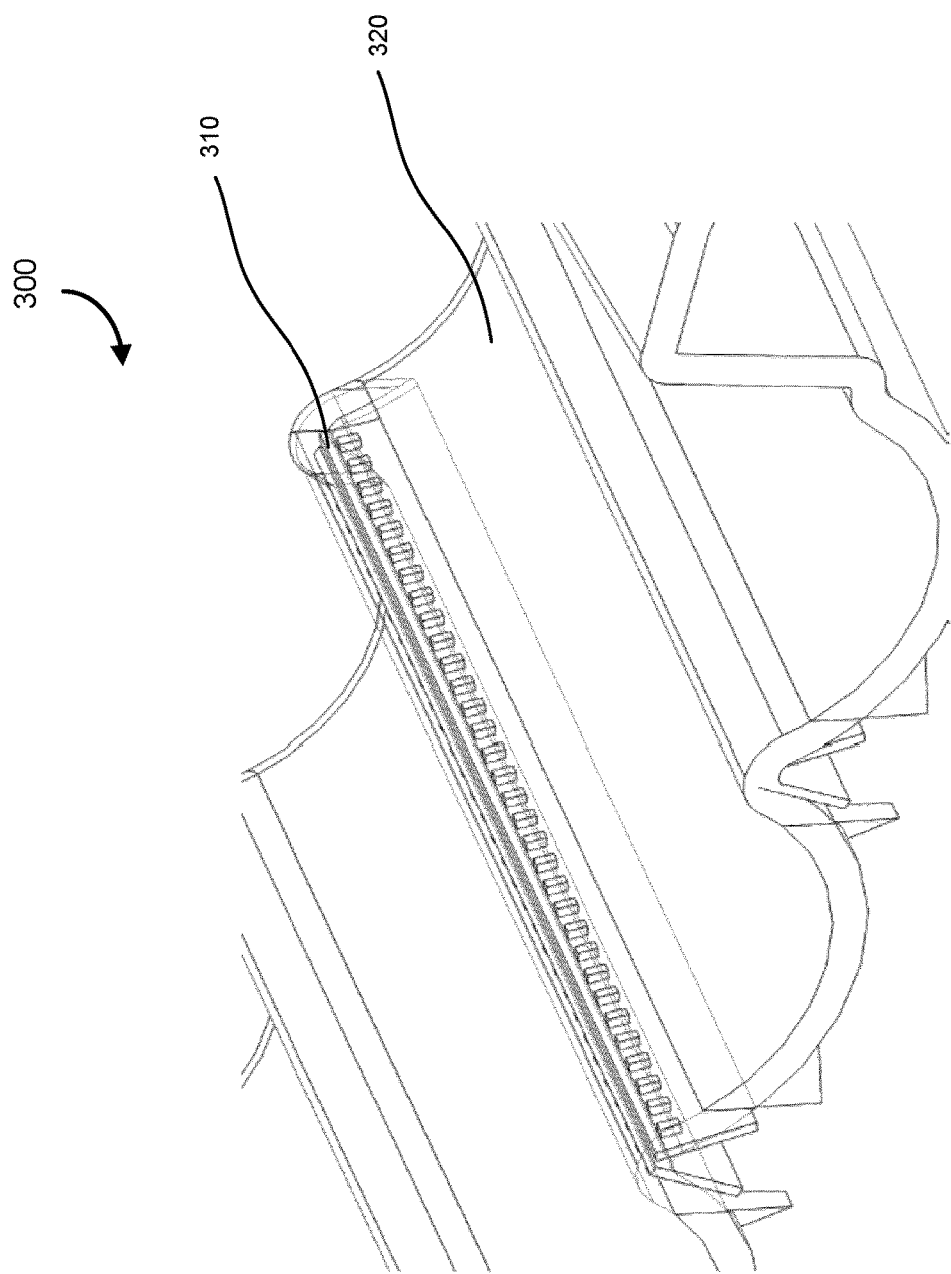
FIG. 4 illustrates an enlarged view of a sensor within a portion of the chip storage aperture, in accordance with embodiments of the present application.

Reference is made to FIG. 4, which illustrates an enlarged view of a sensor 310 extending in an elongate direction and lining a portion of the chip storage aperture 320, in accordance with an embodiment of the present application. The sensor 310 may include a series of RGB sensors or a series of IR sensors along the chip storage aperture 320. In some embodiments, the sensor 310 may be positioned between a pair of adjacent chip storage apertures to detect one or more playing chips within one of the chip storage apertures 320. Other types of sensors may be contemplated.

In some embodiments, the respective sensors 310 may extend in an elongate direction and may line a portion of the chip storage aperture 320. In some embodiments, a pair of PCBs may be configured along an elongate portion between adjacent chip storage apertures 320 and may be configured in an angular configuration, as illustrated.

Figure 5:
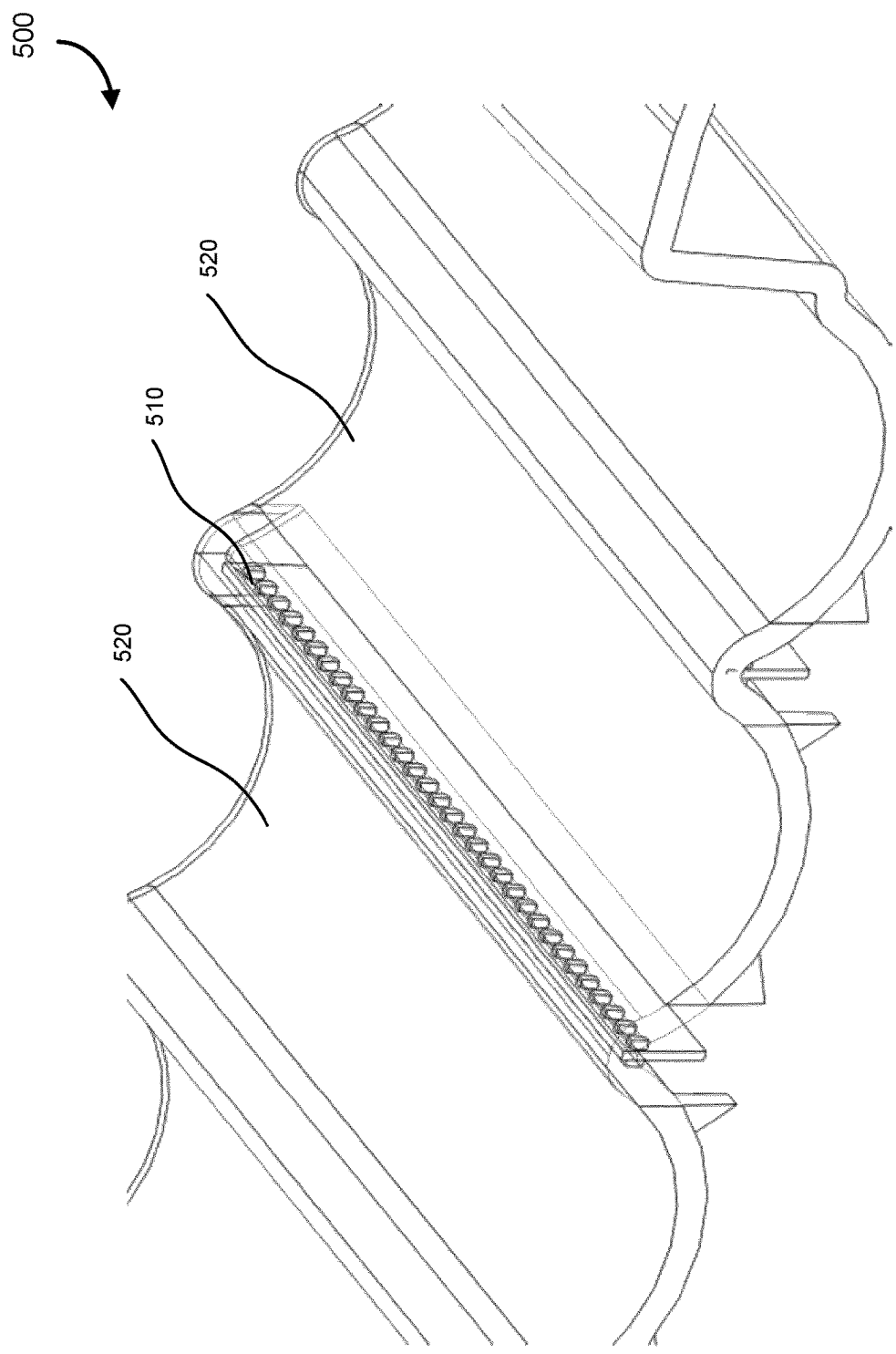
FIG. 5 illustrates an enlarged view of a sensor, in accordance with embodiments of the present application.

Reference is made to FIG. 5, which illustrates an enlarged view of a sensor 510 extending in an elongate direction and lining a portion of a chip storage aperture 520, in accordance with an embodiment of the present application. In FIG. 5, the sensor 510 may be configured as a double sided PCB and may be positioned between adjacent chip storage apertures 520. The double sided PCB may include electrical traces on opposing sides of the circuit board for positioning one or more sensors to detect chips within adjacent chip storage apertures 520.

Figure 6:
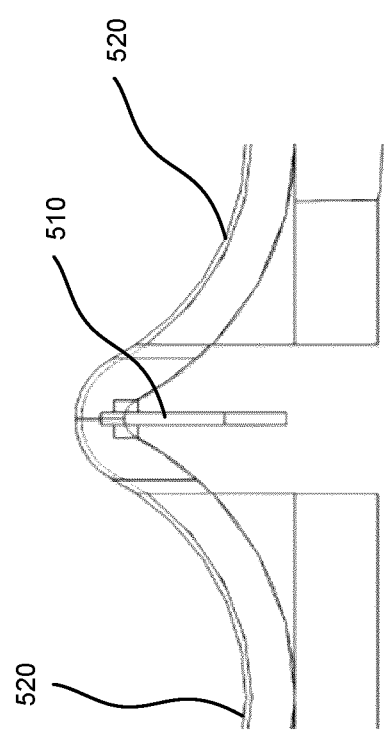
FIG. 6 illustrates a front view of a sensor illustrated in FIG. 5.

Reference is made to FIG. 6, which illustrates a front view of the sensor 510 of FIG. 5. As described, the sensor 510 may be configured as a double-sided PCB and may be positioned between adjacent chip storage apertures 520.

Figure 7:
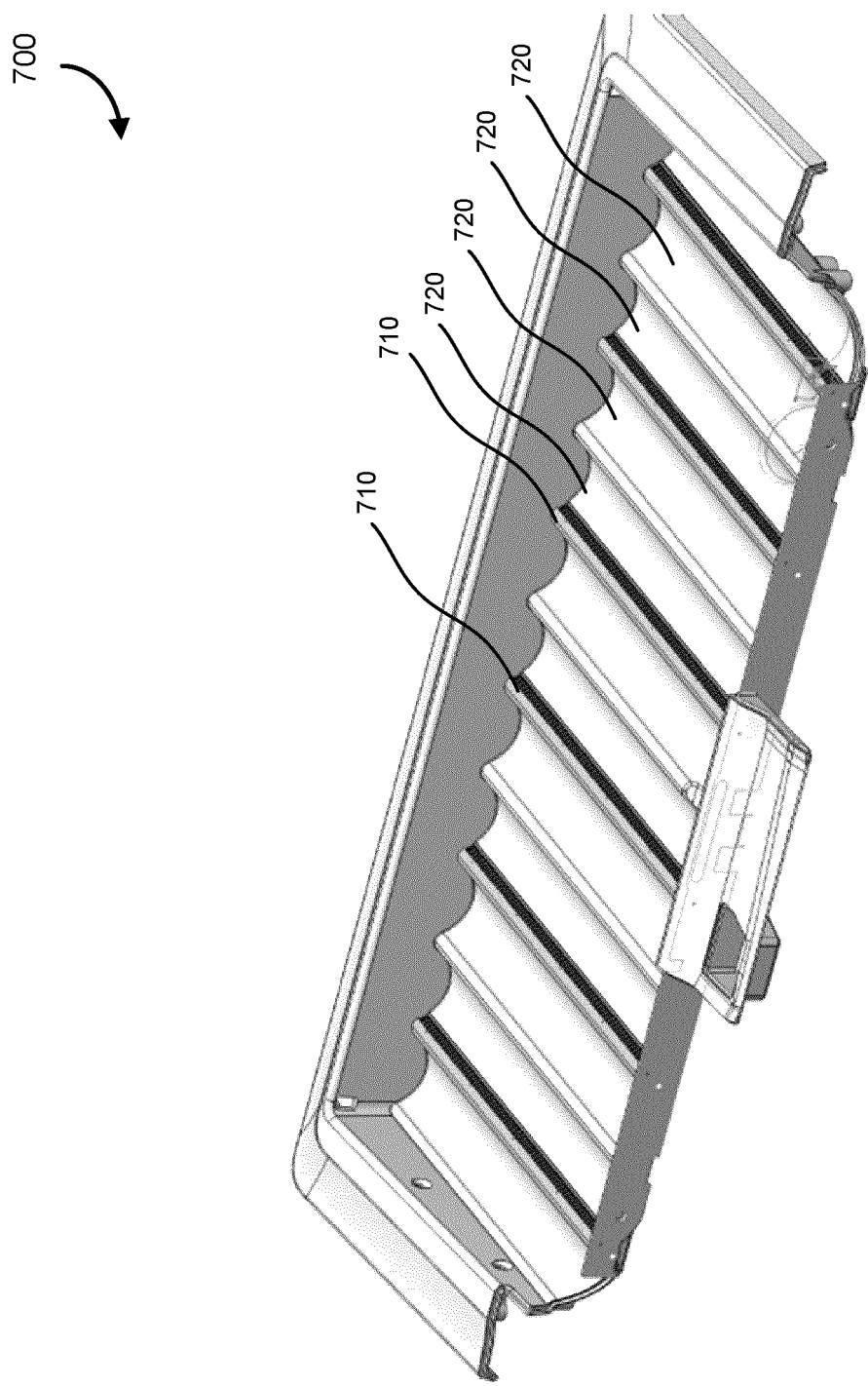
FIG. 7 illustrates a perspective view of a chip tray, in accordance with embodiments of the present application.

Reference is made to FIG. 7, which illustrates a perspective view of a chip tray 700, in accordance with another embodiment of the present application. In FIG. 7, the chip tray 700 includes a plurality of chip storage apertures 720. The chip tray 700 may include an elongate sensor 710 positioned at a transition portion between adjacent chip storage apertures 720. The elongate sensor 710 may be similar to the one or more sensors described with reference to FIG. 3. In the example illustrated in FIG. 7, the elongate sensor 710 may be positioned at every other transition portion that is between adjacent chip storage apertures 720.

Embodiments of the chip tray described herein may include one or a combination of IR sensors, RGB sensors, or accelerometers for tracking chips entering or leaving the chip tray. In some embodiments, IR sensors may be configured as a hand count sensor array for detecting presence of a hand or portions of a hand (e.g., fingers, palm, wrist, etc.) within the chip tray or the chip storage apertures. When IR sensors are the sole sensors, a line-of-sight between adjacent transition portions of adjacent chip storage apertures may be needed. For example, an IR sensor on a first transition portion of a chip storage aperture may include an IR emitter and a second transition portion of an adjacent chip storage aperture may include an IR receiver, and infrared beams from the IR emitter may be projected across a chip storage aperture to be received by the IR receiver.

In some embodiments, a combination of IR sensors and RGB surface scanner arrays may be configured to detect changes in presence of chips within the chip storage apertures. The RGB surface scanner arrays may be configured to detect colors of gaming chips that may be stored in the chip storage apertures.

In some embodiments, the chip tray may include one or more accelerometers configured to track gaming chips entering or leaving the chip tray. For example, the one or more accelerometers may be configured to detect movement within or adjacent to the chip tray, and when a processor detects movement within or adjacent to the chip tray, the processor may configure the IR sensors or the RGB surface scanner arrays to capture data for identifying gaming chips that may be placed within the chip tray or for identifying that gaming chips that were previously in the chip tray are no longer in the chip tray.

In some embodiments, the chip tray may include one or more chip spacers configured to separate groups of gaming chips stored within the chip tray. For example, the chip storage apertures may be filled with gaming chips and the spacers may be configured to organize chips into defined groupings of chips. In some embodiments, the IR sensors, the RGB sensors, or other types of sensors within the chip tray may be configured to capture sensor data, and a processor may identify based on the captured sensor data gaming chips from chip spacers.

In some examples, a game monitoring server 20 (FIG. 1) may identify a gap between recognized gaming chips for identifying chip spacers; may presume chip spacers are placed within the chip tray and deduce chip spacer location based on identified gaming chip denominations. For example, $5 chips may be separated by groupings such as $25, $50, $100, etc., while $25 chips may be separated by groupings such as $100, $200, $500.

Embodiments of chip trays may be placed on game playing tables for storing playing chips. A game dealer may store playing chips in the chip tray. When the dealer collects playing chips from the game playing table, the game dealer may place the playing chips in the chip tray. When the game dealer disburses playing chips from the game playing table (e.g., providing smaller denomination playing chips to players in exchange for larger denomination playing chips, or providing playing chips associated with player winnings, or the like), the game dealer may remove playing chips from the chip tray. It may be desirable to track hand movement into or out of the chip tray.

Figure 8:
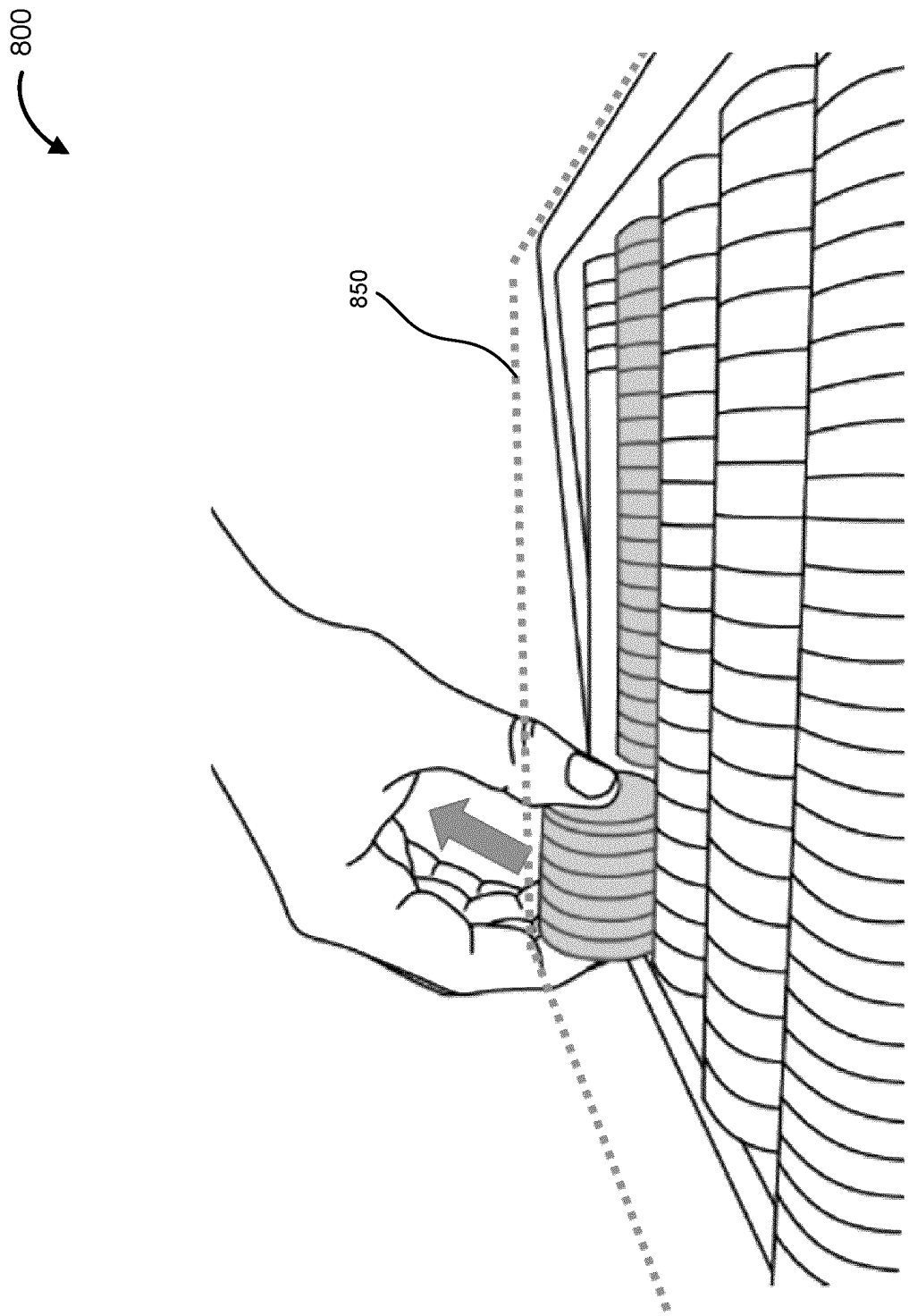
FIG. 8 illustrates a side perspective view of a chip tray, in accordance with embodiments of the present application.

Reference is made to FIG. 8, which illustrates a side perspective view of a chip tray 800, in accordance with an embodiment of the present application. The chip tray 800 may be associated with a boundary threshold 850 alternatively referred to as a perimeter of the chip tray). A game monitoring server may define the boundary threshold 850 proximal to a chip tray opening. The chip tray opening may be configured for allowing a dealer hand to access playing chips stored within the chip tray 800. In some embodiments, one or more sensors proximal to the chip tray opening may be configured to provide sensor data associated with the boundary threshold 850. For example, the one or more sensors may be IR sensors (e.g., emitter/receiver pairs) emitting infrared beams and receiving infrared beams that may correspond to the boundary threshold 850. When a hand crosses the boundary threshold 850, the hand may interrupt the infrared beams and the one or more sensors may detect an interruption of the infrared beams, thereby indicating that a dealer hand or other object may have crossed the boundary threshold 850. Although infrared (IR) sensors are described in the present example, other types of sensors configured to identify when a dealer hand crosses the boundary threshold 850 may be contemplated. For example, one or more image sensors may be positioned proximal to the chip tray opening for capturing images of the chip tray opening and identifying based on image recognition operations when a dealer hand may cross the boundary threshold 850. The system may be configured to generate an alert in response to the hand crossing the boundary threshold 850.

In some embodiments, when the game monitoring server detects that a dealer hand crosses the boundary threshold 850, the game monitoring server may log the event as a playing chip deposit or withdrawal from the chip tray 800. In some embodiments, one or more chip storage apertures may be configured to store a single playing chip denomination. Thus, when the game monitoring server detects that a dealer hand may have crossed the boundary threshold 850, the game monitoring server may conduct operations described herein for identifying a quantity of playing chips and/or a denomination of the playing chips removed from the chip tray 800. For example, the game monitoring server may conduct operations for identifying the quantity of chips remaining in the chip tray 800, and by deduction can determine the quantity of playing chips removed from the chip tray 800.

In some embodiments, the game monitoring server may conduct operations to determine a quantity of playing chips in a dealer hand. To illustrate, reference is made to FIGS. 9A and 9B, which illustrates images of a chip tray 900 and/or a quantity of playing chips 970 held within a dealer hand 960, in accordance with an embodiment of the present application. The images of the chip tray 900 or the quantity of playing chips 970 may be captured by a camera positioned at a position along a left side (alternatively referred to as a first side) of the chip tray 900 or at a position along a right side(alternatively referred to as a second side) of the chip tray 900. The camera may capture image data of a user hand crossing a threshold boundary associated with a threshold boundary associated with openings of the chip storage apertures.

Figure 9B:
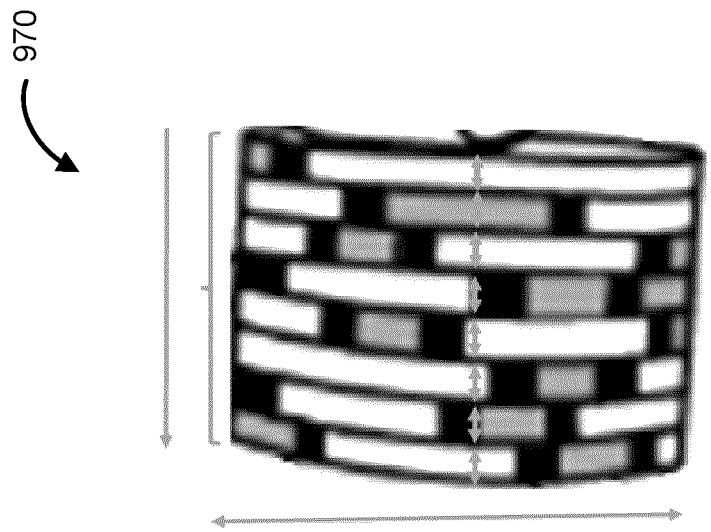
FIGS. 9A and 9B illustrate images of a chip tray, in accordance with embodiments of the present application.

In some embodiments, the game monitoring server may conduct operations for determining a quantity of playing chips 970 being held by a dealer hand and that may be placed within or may be withdrawn from the chip tray 900. Referring to FIG. 9B, which illustrates an enlarged view of playing chips within the dealer hand 960. In some embodiments, the game monitoring server may conduct operations for identifying a denomination of the playing chips based at least on color, texture, printed pattern, or other discernible physical characteristic of one or more playing chips. In some embodiments, the game monitoring server may conduct operations for identifying physical dimensions of the respective playing chips in a group or stack of playing chips within the dealer hand 960.

In some embodiments, the game monitoring server may conduct operations for tracking a position or orientation of portions of the dealer hand 960. For example, the game monitoring server may conduct operations to track skeleton outline features of the dealer hand 960.

In some embodiments, the chip tray may include a camera 998 positioned at a rear side (e.g., a proximate side) of the chip tray. The camera 998 may include one or more image sensors having a 180 degree field of view. Other types of image sensors with other field of view characteristics or specifications may be contemplated.

The camera 998 may be configured to capture images of playing chips within the chip tray 900. In some examples, the chip tray may be positioned recessed within the playing surface of the playing table, and the front side elevation of the chip tray 900 may be greater than a rear side elevation of the chip tray 900. Accordingly, the chip tray may be configured to be sloping downward toward a dealer user or sloping downward towards a rear side of the chip tray 900.

Figure 9A:
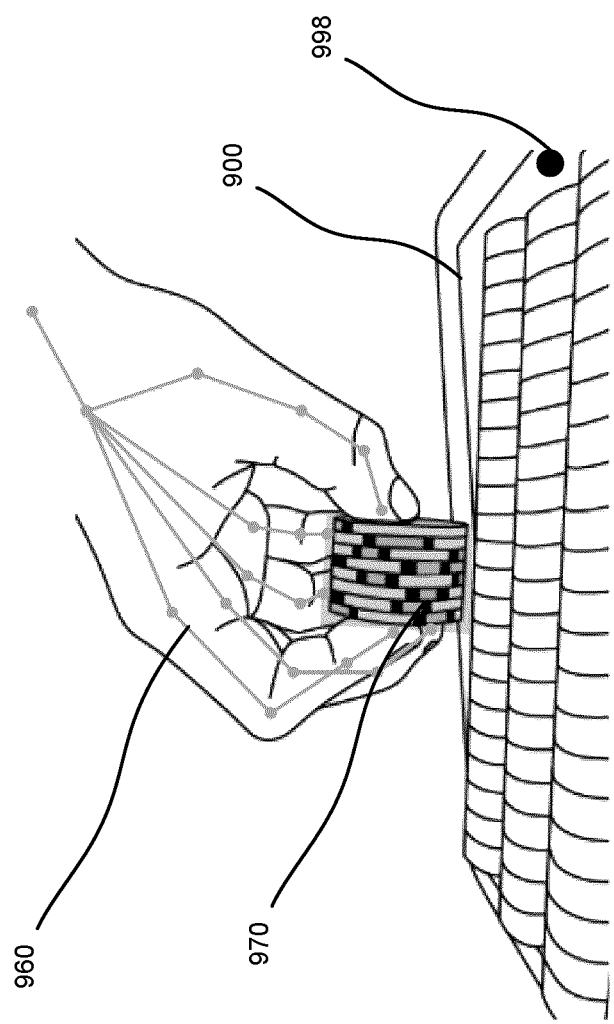
Figure 10B:
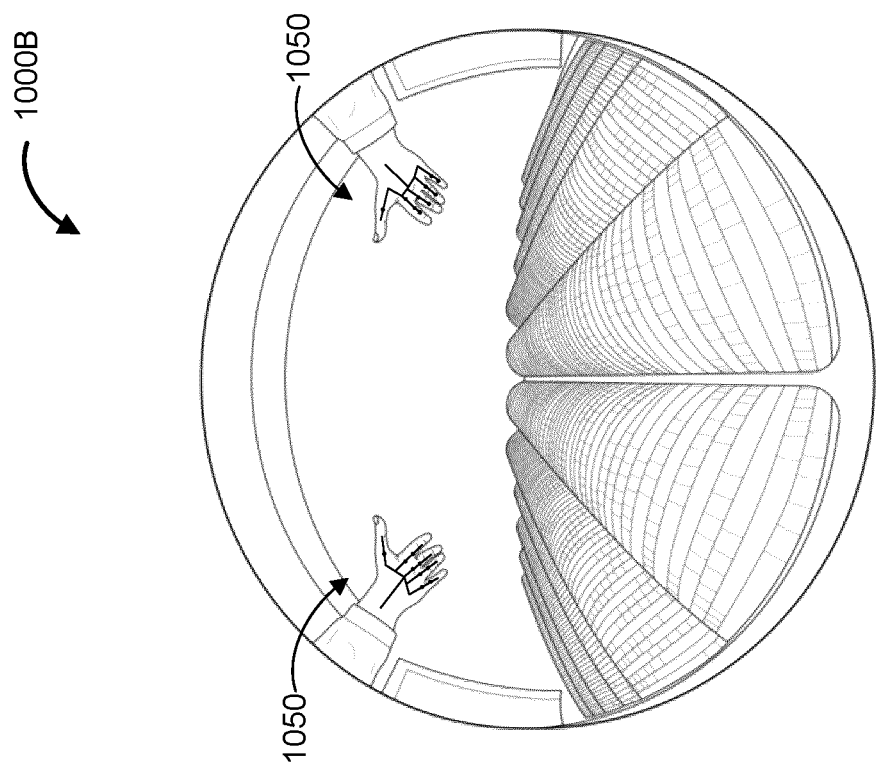
FIGS. 10A and 10B illustrate images captured, in accordance with embodiments of the present application.
Figure 10A:
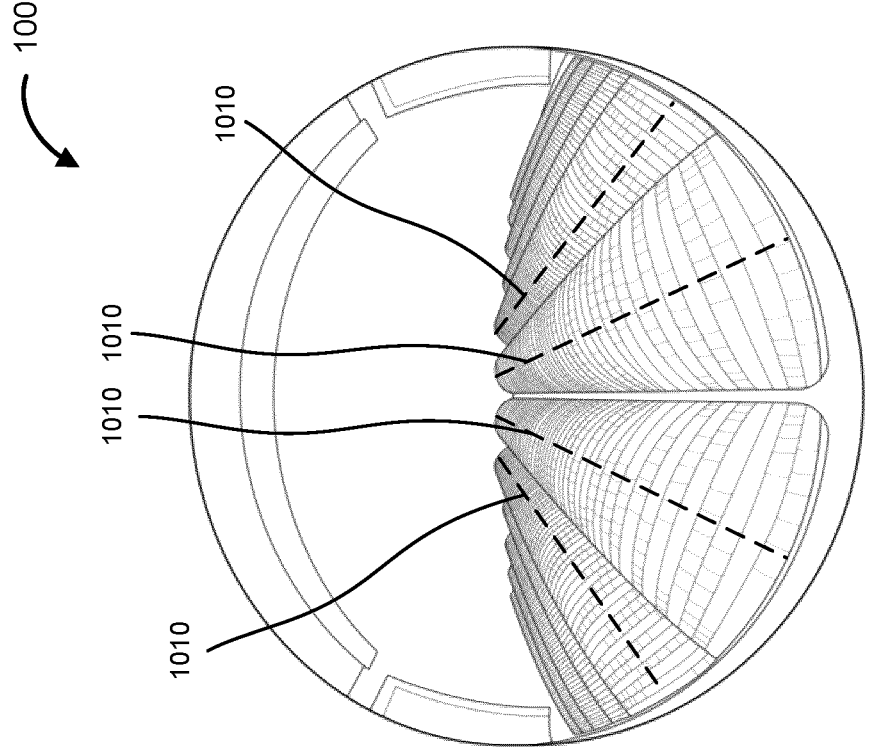

To illustrate, reference is made to FIGS. 10A and 10B, which illustrate images captured by the camera 998 illustrated in FIG. 9. In FIG. 10A, the image 1000 includes a 180 degree field of view of the plurality of chip storage apertures. In some scenarios, the camera 998 may be configured to capture images with a 180 degree field of view and may be configured to identify or track quantities of playing chips placed within or withdrawn from the chip storage apertures. In some embodiments, the captured images may be used to track a subset of the chip storage apertures (e.g., three chip storage apertures centrally located within the captured image). In some embodiments, the captured images may be used to track the plurality of chip storage apertures.

In some embodiments, the game monitoring system may be configured to provide threshold guides 1010 or threshold lines for respective chip storage apertures, illustrated in FIG. 10A as hashed lines. The system may provide the threshold guides 1010 for some or all of the chip storage apertures. Operations of image processing methods may utilize the threshold guides 1010 or lines for identifying or differentiating respective stacks of playing chips from other stacks of playing chips.

In some scenarios, the camera 998 may capture images that include positive, negative, or both positive and negative radial distortions. In some embodiments, the game monitoring server may conduct operations to compensate for at least one of the positive or negative radial distortions.

In FIG. 10A, the camera 998 may capture image data of the chip storage apertures and chips stored within the chip storage apertures. In embodiments where the chip tray may be sloping downward toward a dealer user/sloping downward toward a rear side of the chip tray 900, the camera 998 may generate images with an increased number of pixels for playing chips that may be located distant from the camera 998. As the generated images may include increased number of pixels representing the playing chips, the game monitoring server may be provided with greater amount of image data for identifying movement of playing chips/status of playing chips within the chip tray, as compared to if the chip tray was on a level surface (e.g., non-sloping).

In some embodiments, the chip tray may be sloped approximately 5 degrees relative to a level playing table surface. Other ranges of slopes may be contemplated, such as 5 to 10 degrees.

In some embodiments, to increase the number of pixels representing the playing chips, the chip tray may include chip storage apertures having a shorter length than other example chip trays. In some embodiments, the chip tray may be configured to increase a chip tray border height.

To increase image capture capability, in some embodiments, the chip tray may be illuminated with additional incandescent light or ultra-violet (UV) light and the camera 998 may be configured to capture and provide image data based on the UV light illumination.

In some embodiments, the camera 998 may be configured to capture images of hand gestures of a dealer user conducted within the field of view of the camera. For example, referring to FIG. 10B, the captured image 1000B may include image detail illustrating hand gestures of a dealer user that may signal a start of a game. In some embodiments, the camera 998 may operate to capture video data or may operate to capture images at a high frame rate and the gaming monitoring server may be configured to detect defined hand gestures and, in response to detecting such defined hand gestures, may trigger other operations, such as playing chip inventory operations (e.g., activating other sensors described herein for identifying chip quantities or chip deposits or withdrawals to/from the chip tray).

In some embodiments, the game monitoring server may conduct operations for tracking a position, orientation, or movement of portions of the dealer hand 1050. In some embodiments, the game monitoring server may conduct operations to track skeleton outline features (example illustrated in FIG. 10B) of the dealer hand 1050.

In some scenarios, it may be desirable to monitor designated portions of a gaming table to identify playing chips that may be deposited or withdrawn. In some scenarios, the game monitoring server may be configured to identify playing chips that may be unintentionally or unscrupulously deposited or withdrawn from designated gaming areas.

Figure 11:
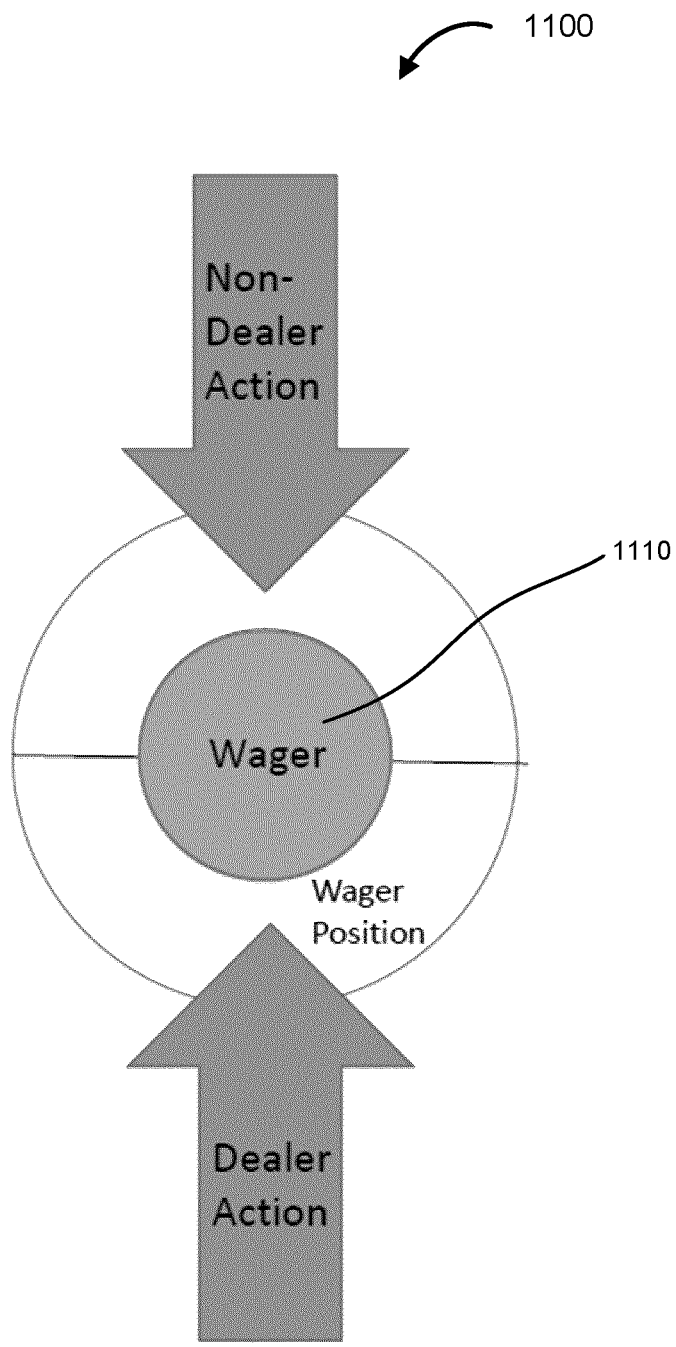
FIG. 11 illustrates an example designated gaming area, in accordance with embodiments of the present application.

Reference is made to FIG. 11, which illustrates an example designated gaming area 1100, in accordance with an embodiment of the present application. The designated gaming area may be positioned on a playing table. The designated gaming area may include an action area and two or more action position areas. For example, the designated gaming area 110 may include a designated area adjacent the action area that may be associated with dealer user movement or action and another designated area adjacent the action area that may be associated with non-dealer user movement. In some embodiments, one or more sensors, such as cameras, IR sensors, pressure sensors, or other type of sensors, may be configured to detect movement or interruption within the respective designated areas. Accordingly, a game monitoring server may conduct operations for identifying whether a user hand or object entering the designated gaming area 1100 may be associated with a dealer hand or a non-dealer hand.

In some embodiments, the game monitoring server may conduct operations to identify if there may be movement of a hand or object entering into the action area 110, and if detected, which side of the action area 1110 a hand or object may have entered from. For instance, a hand or object entering from a position that is associated with a dealer may not trigger mitigation operation; however, a hand or object entering from a position that is associated with a non-dealer (e.g., once a game session has begun) may trigger operations for detecting quantity of playing chips within the action area 1110 or other designated areas of the playing table.

Figure 12B:
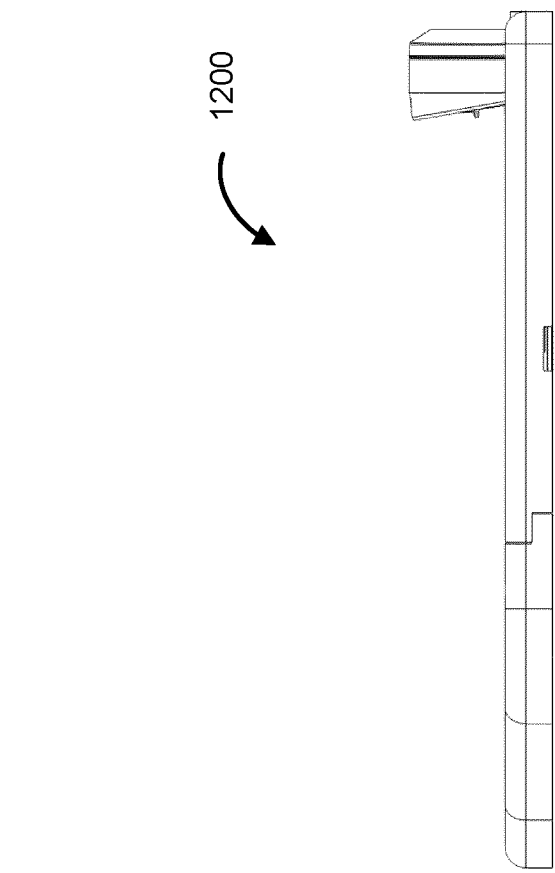
FIGS. 12A and 12B illustrate views of a cage device, in accordance with embodiments of the present application.
Figure 12A:
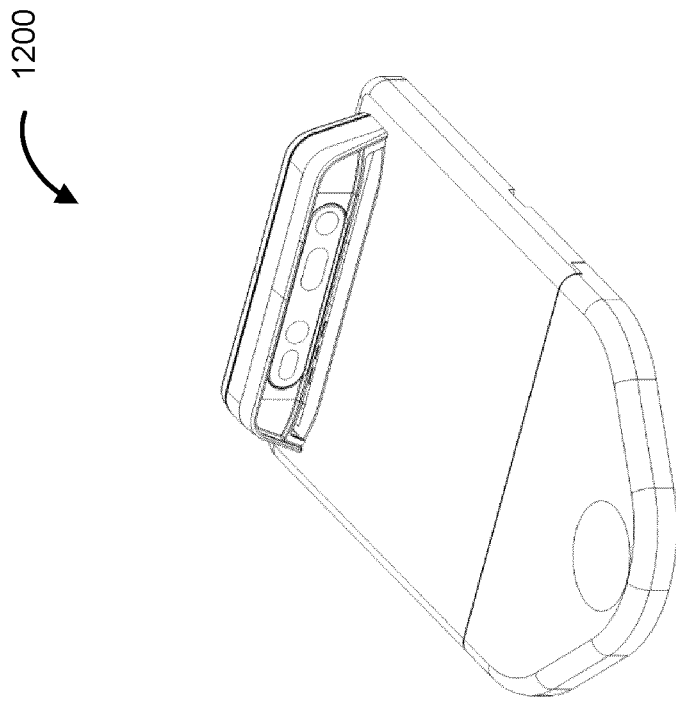

Reference is made to FIGS. 12A and 12B, which illustrate a perspective view and a side view of a cage device 1200 for detecting a quantity of playing chips, in accordance with examples of the present application. In some embodiments, operation of the cage device 1200 may be manually triggered by a user upon a quantity of playing chips being placed on the platform of the cage device 1200. The cage device 1200 may include sensors, such as radio frequency sensors, acoustic/X-ray sensors, magnetic sensors, optical or image sensors, pressure sensors, or the like for detecting a quantity of playing chips placed on the cage device 1200. The cage device 1200 may be automated by adding a hand count sensor beneath the chip platform of the cage device 1200.

In some embodiments, the cage device 1200 may be configured to have predefined playing chip gaming areas (e.g., specific gaming area for playing chips worth $1, $5, etc.), and an image or infrared sensor may conduct operations for identifying depth of a stack of playing chips (e.g., height) to detect the quantity of playing chips placed on the cage device 1200.

In some embodiments, where playing tables may not have predefined playing chip gaming areas, other operations of the game monitoring system described herein may be conducted for identifying quantity of chips within a stack of playing chips.

Reference is made to FIGS. 13A and 13B, which illustrate bottom views 1300A of the cage device 1200 of FIG. 12 and an exploded view 1300B of a camera and light emitting diode housing of the cage device 1200 of FIG. 12, respectively, in accordance with embodiments of the present application.

In some embodiments, the cage device 200 of FIG. 12 may be positioned atop a playing table and at respective player zones. The cage device 1200 may include multiple designated playing chip gaming positions and one or more sensors associated with the cage device 1200 and may be configured for capturing sensor data, such that the game monitoring system may deduce or determine a quantity of playing chips.

Reference is made to FIGS. 14A and 14B, which illustrate image capture data when a stack of playing chips may be illuminated with light 1400A and when a stack of playing chips may be represented by image data 1400B illustrating a "depth blob" associated with the stack of playing chips, in accordance with embodiments of the present application. In some embodiments, the cage device 1200 may emit visible and/or ultra-violet light for illuminating a stack of playing chips. A camera associated with the cage device 1200 may capture images when the stack of playing chips is illuminated by visible light and capture images when the stack of playing chips is illuminated by the visible and/or ultra-violet light.

In some embodiments, a camera associated with the cage device 1200 may capture images with ultra-violet light illumination when an RGB camera (e.g., using red-green-blue color sensors) detects playing chips having ultra-violet security marking features. For example, large denomination playing chips may be configured with ultra-violet security marking features, while relatively smaller denomination playing chips may not be configured with ultra-violet security marking features.

In some embodiments, a camera associated with the cage device 1200 may capture image data and generate a transformed image, such as a depth blob, representing height or depth of a stack of playing chips. In some embodiments, the game monitoring system may conduct operations for tracking the quantity of chips on a playing table by determining changes to depth blob profiles.

In some embodiments, cameras described herein may wide dynamic range (high-dynamic-range imaging) devices. For example, the cameras may be configured to reproduce a greater dynamic range of luminosity, thereby providing a range of luminance. That is, cameras with wide dynamic range functionality may conduct operations to combine multiple images captured with various exposures to generate an image including a wide range of color and/or detail.

In some embodiments, cameras capable of wide dynamic range operations may be desirable for increasing resolution and/or color quality of images taken in environments that may not be well lit. In some embodiments, cameras may include camera response function (CRF) features for measuring image/frame irradiance at the image/frame plane to the measured intensity values. In some embodiments, various applications, such as color constancy, photometric stereo, and shape from shading, require object radiance rather than image/frame intensity. In some embodiments, cameras may include features to generate and display HDR images from an exposure sequence, or may include features of exposure fusion for producing low dynamic range images that may not require exposure time data (see e.g., https://docs.opencv.org/3.1.0/d2/df0/tutorial_py_dhr.html). See also "Tom Mertens, Jan Kautz, and Frank Van Reeth. 2007. Exposure Fusion. In Proceedings of the 15$^{th}$ Pacific Conference on Computer Graphics and Applications (PG '07). IEEE Computer Society, Washington, DC, USA, 382-390. DOI: https://doi.org/10.1109/PG. 2007.23.

Figure 15B:
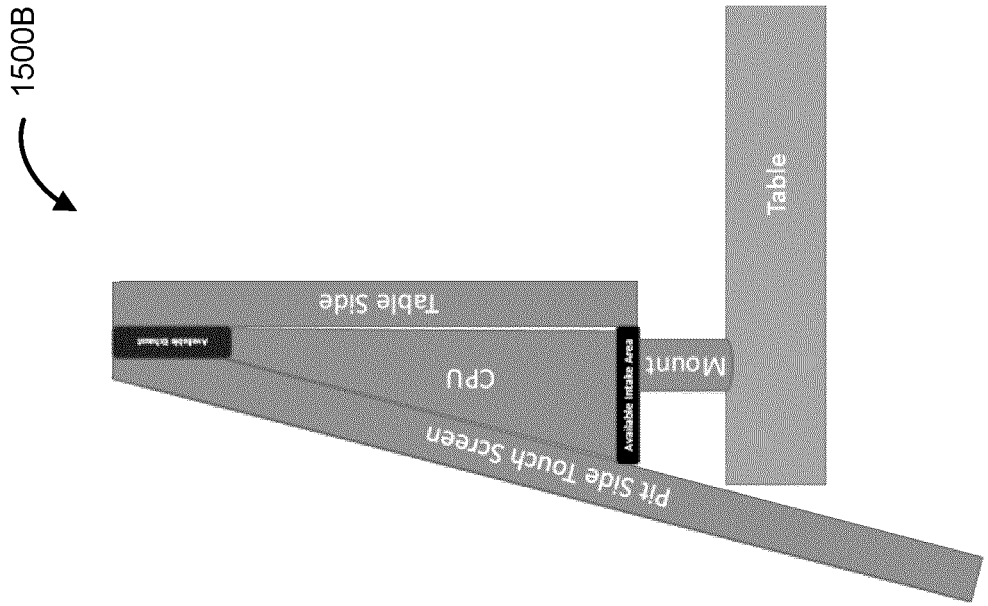
FIGS. 15A and 15B illustrate views of a keypad and a display module, respectively, in accordance with embodiments of the present application.
Figure 15A:
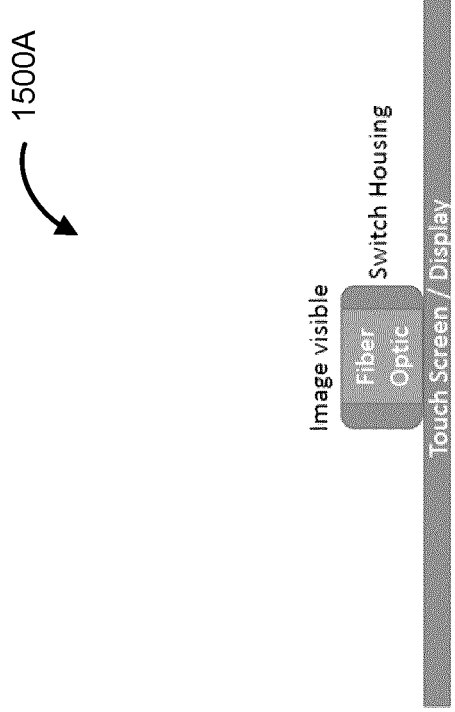

Reference is made to FIGS. 15A and 15B, which illustrate side elevation views of a keypad 1500A and a display module 1500B, in accordance with embodiments of the present application. In example embodiments, the front end interface 60 includes one or more display modules 1500B.

In some embodiments, in addition to traditional keypad input devices (e.g., mechanical keyboard keys), the keypad 1500A may include a combination of fiber optic material combined with a mechanical switch that may be positioned adjacent a digital display, such as a liquid crystal display (LCD). In some embodiments, a touch screen display may include mechanical input keys allowing a polished compressed fiber optic material to reveal a digital display atop the mechanical key switch. As illustrated in FIG. 15A, when a user depresses the switch, a touch event may be triggered on the touch screen.

FIG. 15B illustrates a display module 1500B. The display module 1500B may be configured to be positioned atop a playing table. The display module 1500B may include a pit side touch screen display that may be accessible by a dealer user or a gaming table administrator. In some embodiments, the display module 1500B includes a table side display. The display module 1500B may include an air intake and an air exhaust.

Figure 16B:
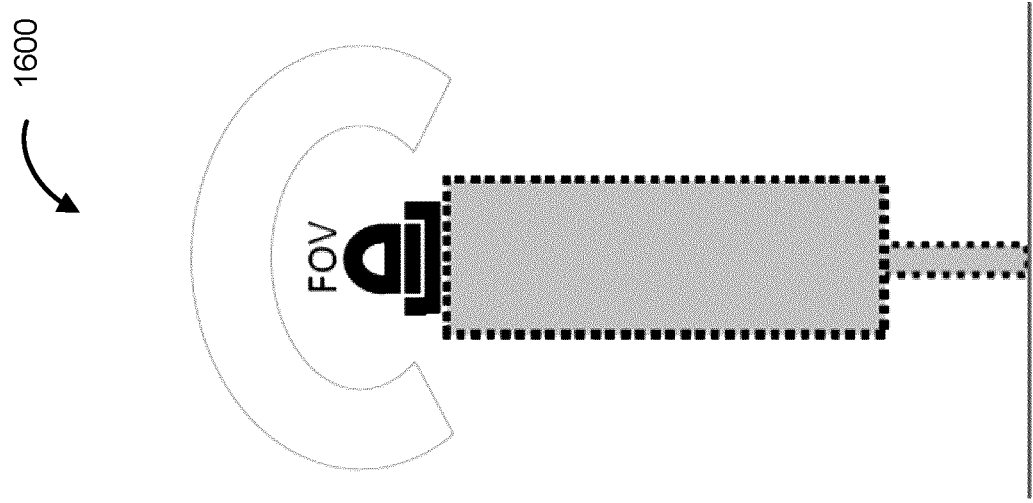
FIGS. 16A and 16B illustrate example display modules, in accordance with embodiments of the present application.
Figure 16A:
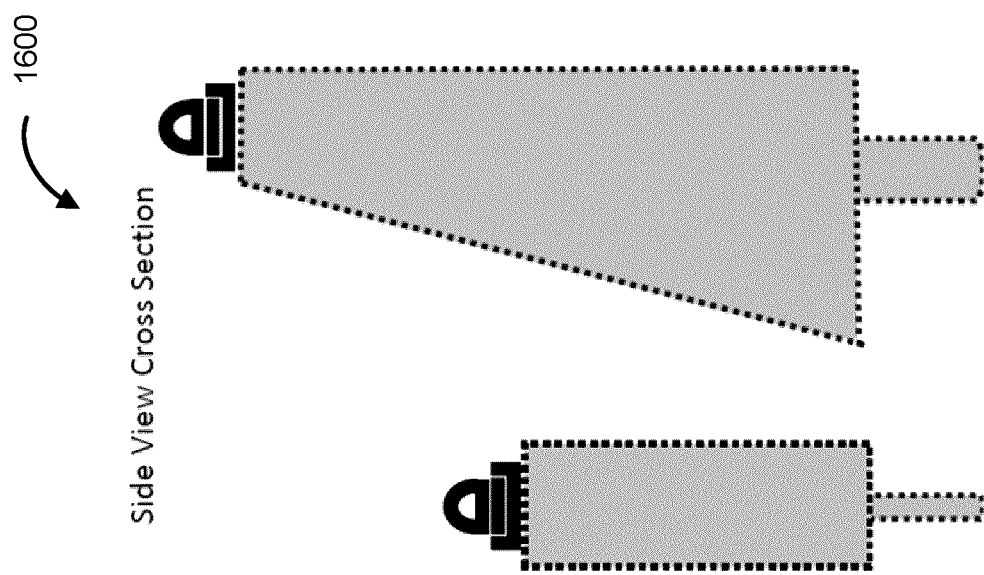

FIGS. 16A and 16B illustrate example display modules 1600 having one or more optical sensors positioned thereon, in accordance with embodiments of the present application. In some embodiments, the optical sensors may be a complementary metal-oxide-semiconductor (CMOS) sensor. The optical sensor may be a 360-degree fisheye camera. In some embodiments, the 360-degree image sensor may have a 180-degree horizontal and a 180-degree vertical field of view.

In some embodiments, it may be desirable to include one or more optical sensors on the example display modules because the captured images may be associated with table level views of the gaming table surface.

Figure 17:
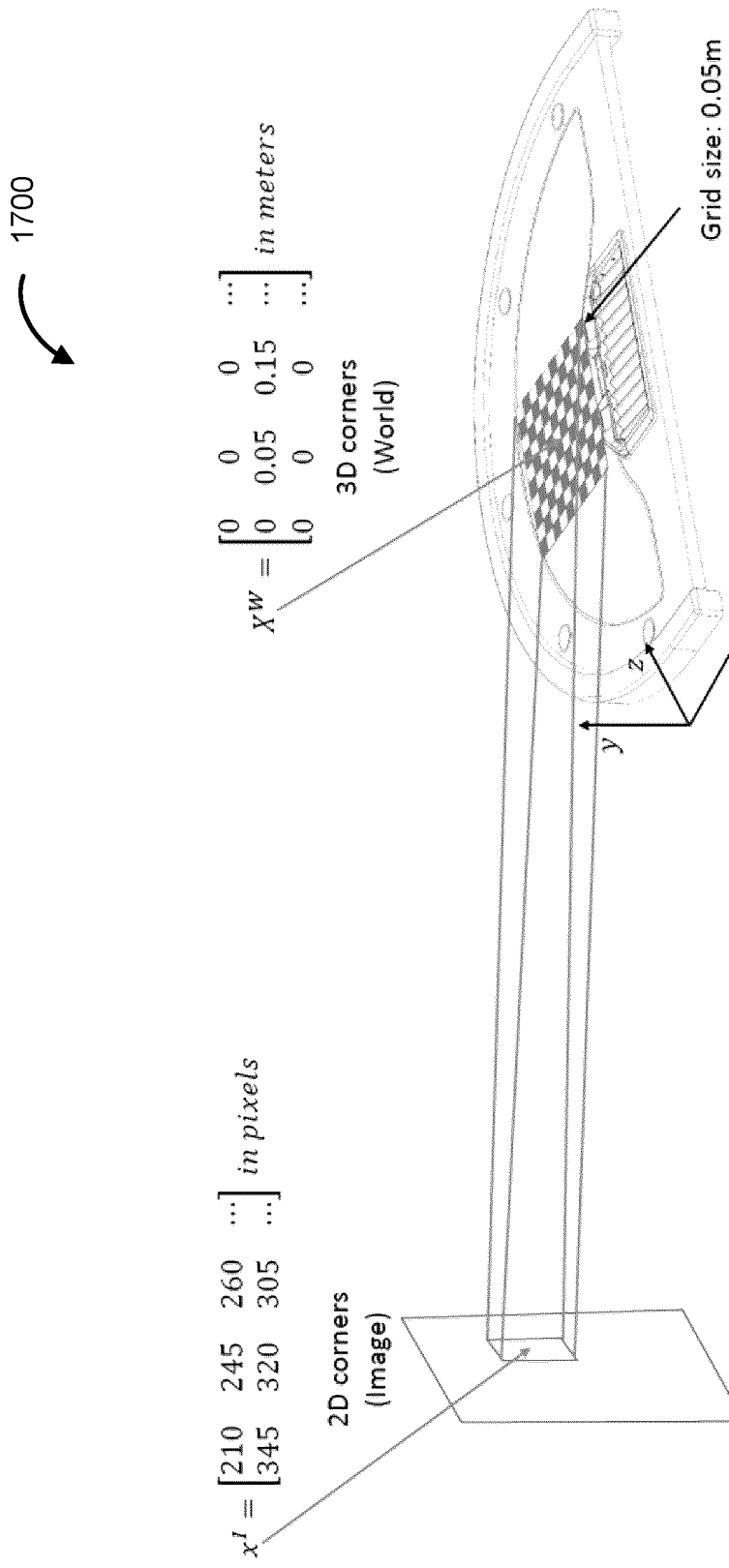
FIG. 17 illustrates mapping of a captured image to a gaming table environment, in accordance with embodiments of the present application.

Reference is made to FIG. 17, which illustrates mapping 1700 of a captured image to a gaming table environment, in accordance with an embodiment of the present application. In some embodiments, the gaming table may include one or more predefined patterns (alternatively referred to herein as chip tray fiducials, or simply fiducials), such as quick response (QR) codes and the game monitoring system may conduct operations for calibrating cameras that may capture images of the gaming table.

In some embodiments, the cameras may include intrinsic parameter K, including focal length, skew, and/or principal point, and extrinsic parameter P, including rotation and translation. The camera calibration may include the following transformations:

$$x_k^I = KPX_k^W$$

$$x_k^I = \begin{bmatrix} f_x & s & p_x \\ 0 & f_y & p_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} X_k^W$$

Figure 18:
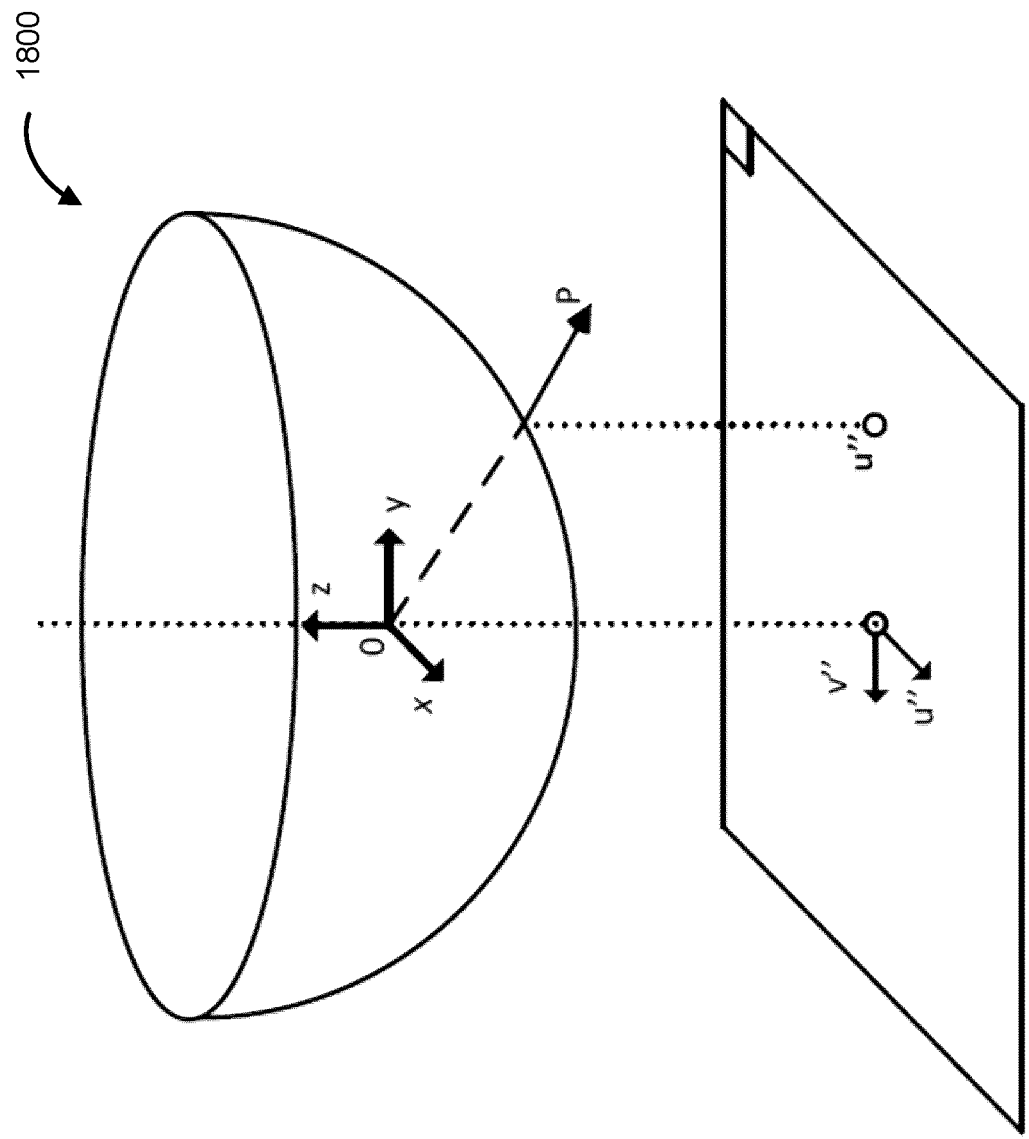
FIG. 18 illustrates an omnidirectional camera model, in accordance with embodiments of the present application.

Reference is made to FIG. 18, which illustrates an omnidirectional camera model 1800, in accordance with an embodiment of the present application. The omnidirectional camera may be catadioptric.

In some embodiments, cameras may conduct operations to conduct 360 degree fisheye transformation. In some embodiments, the camera may conduct operations of equirectangular projection.

In some embodiments, based on equirectangular projection operations, a camera may capture images for tracking gaming players and/or dealer users. For example, the camera may detect user poses (e.g., detecting whether a player hits or stays, based on hand gestures to wave off or tap the gaming table). In some examples, the camera may detect facial gestures or facial features (e.g., for player identification, emotion recognition associated with responsible game playing). In some examples, camera may capture images that track whether a user player who may have excluded themselves from a game may still be actively playing. In some examples, the camera may conduct operations to track physiological metrics of users, such as tracking heartrate of players or dealers. In some examples, the camera may track images associated with tracking a player's attention span with the active game (e.g., whether a player user may be gaming without viewing cards, which may be an indication of a player's skill level). The camera may conduct other operations for capturing images associated with biometric analysis based on optical images.

Figure 19:
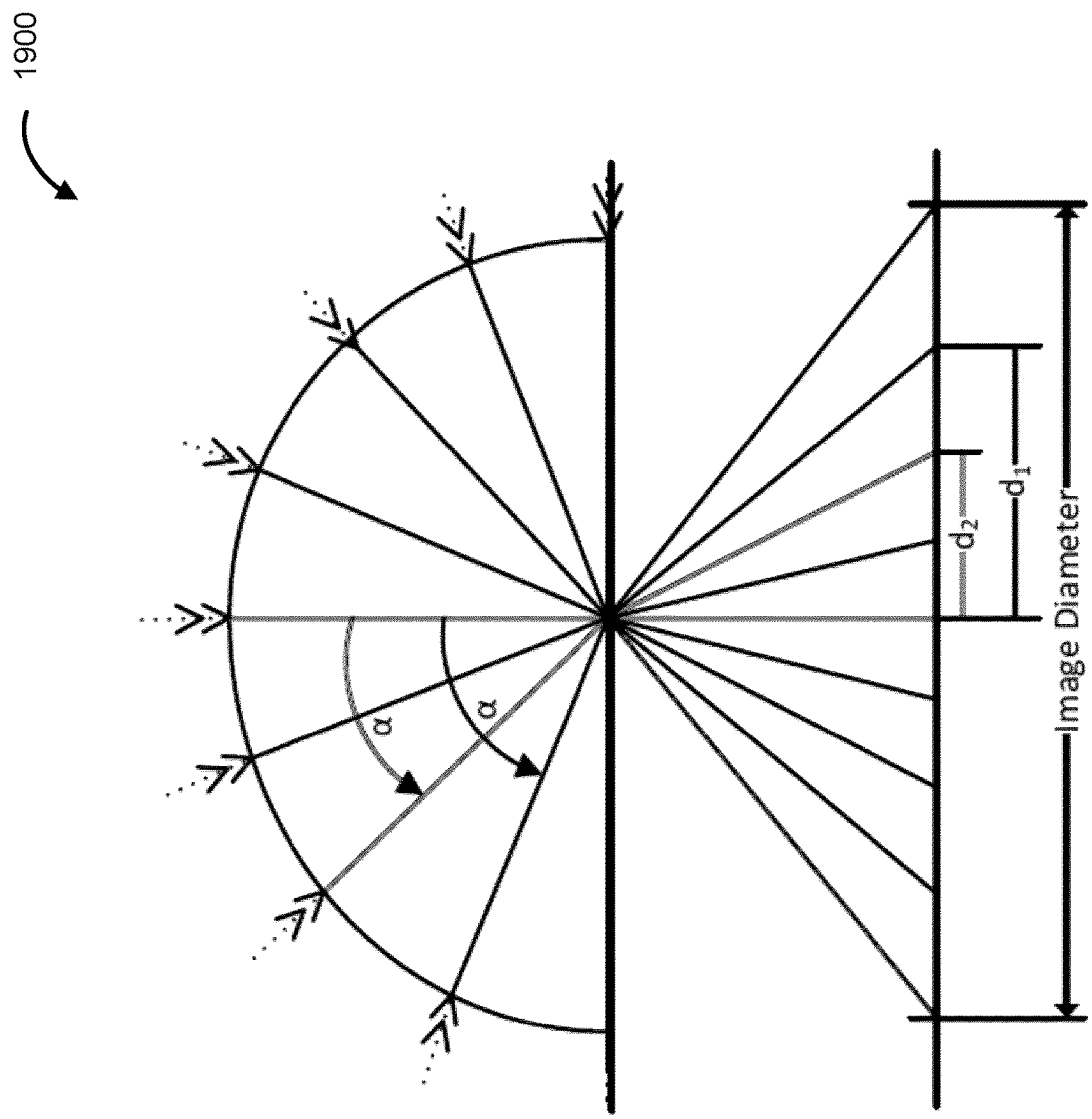
FIG. 19 illustrates an omnidirectional camera model, in accordance with embodiments of the present application.

Reference is made to FIG. 19, which illustrates an omnidirectional camera model 1900, in accordance with another embodiment of the present application. The omnidirectional camera may be dioptric.

In some embodiments, cameras may be calibrated based on omnidirectional camera calibration and structure based on motion. In some examples, it may not be critical whether a camera model is catadioptric or whether the camera model is ioptric. In some examples, factors such as focal length, skew, or principal point may not be critical parameters. In some examples, camera modeling may be based on Taylor series expansion:

$$\lambda x = \lambda \begin{bmatrix} u \\ v \\ f(\rho) \end{bmatrix} = [R \ t]X = PX$$

Calibration Parameters:
Taylor expansion coefficient α
Rotation R
Translation t $$f(\rho)=\alpha_0+\alpha_1\rho+\alpha_2 p^2+\ldots+a_N p^N$$

In some embodiments, a playing table may include a trend board having integrated cameras for playing card recognition or integrated 360-degree cameras for surveillance operations.

In some embodiments, integrated cameras may be used for tracking splits and double downs in example games. For example, if combined with a smart shoe, operations may accurately estimate splits or double downs based on reviewing previous hands in reverse. In some embodiments, if combined with optical card recognition, operations may determine orientation and clustering of cards as key indicators. In some embodiments, if only chip amount recognition cameras may be used, operations may determine splits or double downs based on increase in gaming volumes in key playing chip regions.

In some embodiments, the gaming monitoring system may receive trigger operations that may capture splits or double downs. A dealer user may place split or double down actions on top of primary actions to sum the new total action for a round of game playing.

In some embodiments, the gaming monitoring system may include a player user reward system, including features such as: portal for players to access services, recommendations, personal player tracking, manage personal profiles, facilitate player to player digital interactions, real time recommendation of tables and dealer users, cashing in complementary rewards, ordering drinks/services, progressive jackpots, or player side analytics.

Figure 20:
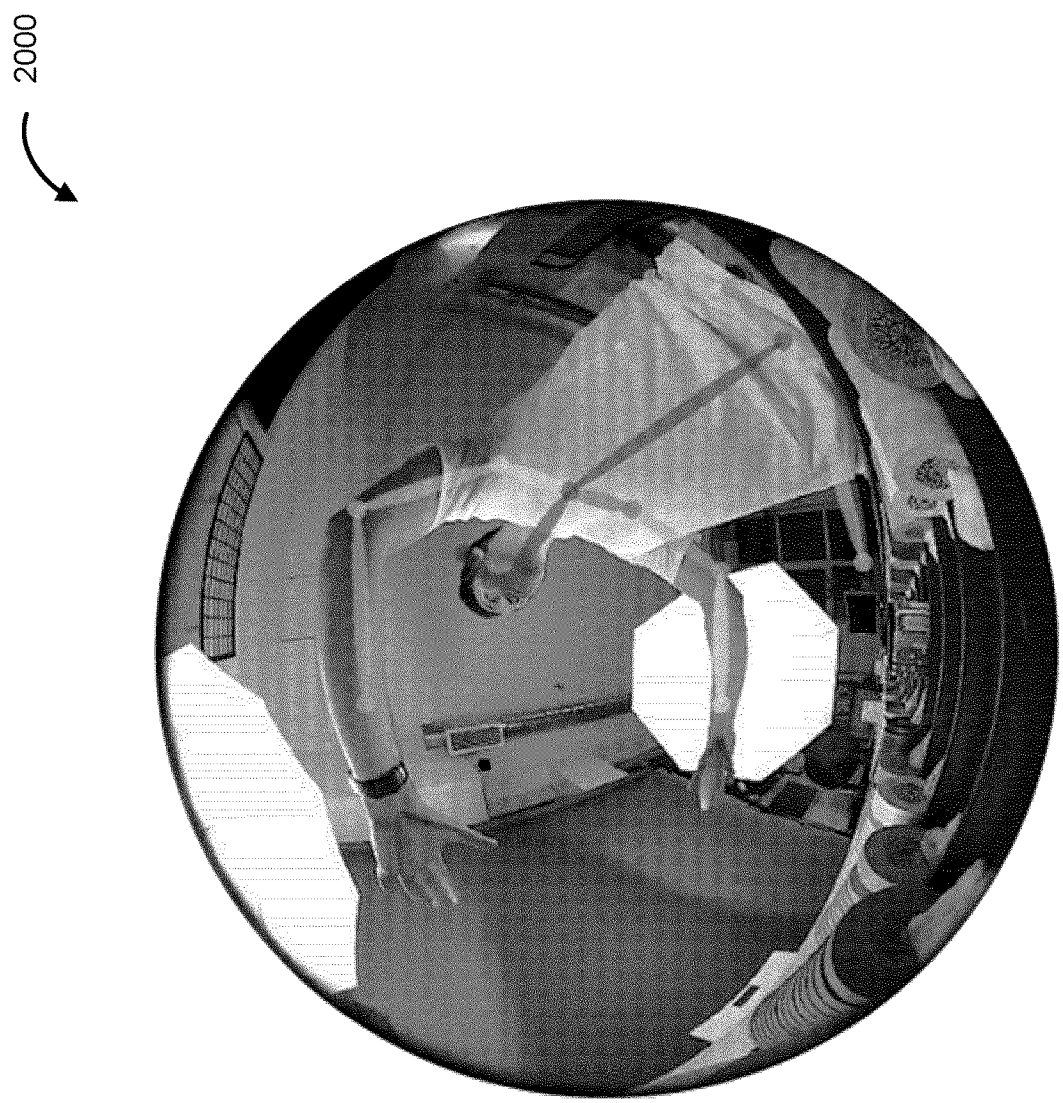
FIG. 20 illustrates an example image of playing chips and a dealer user, in accordance with embodiments of the present application.

Reference is made to FIG. 20, which illustrates an example image 2000 captured by a camera on a side position of a chip tray, in accordance with an embodiment of the present application. In some embodiments, the camera may be: a stereo black and white camera, a dual 360 degree camera, a stereo camera, a 360 degree camera, or a wide dynamic range/high dynamic range camera. In some other embodiments, cameras may be positioned on a rear portion or a front portion (alternatively referred to as a distal portion) of the chip tray.

In some embodiments, cameras may generate images for tracking dealer gestures or movements. The tracked dealer gestures or movements may trigger tracking of game sessions or may trigger playing chip detection operations. Other operations in response to dealer user gestures may be contemplated.

Figure 21B:
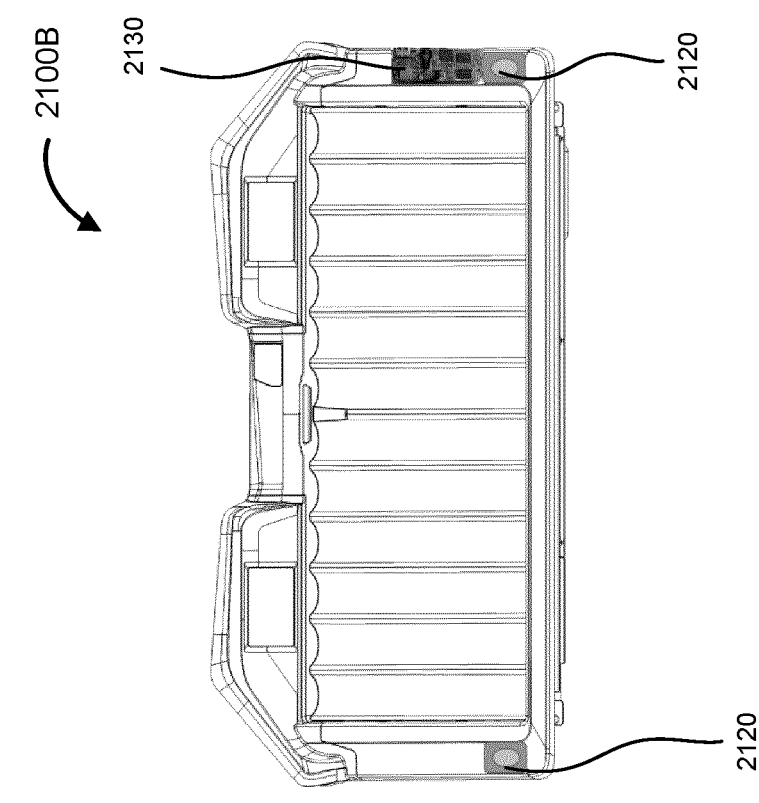
FIGS. 21A and 21B illustrate chip trays, in accordance with embodiments of the present application.
Figure 21A:
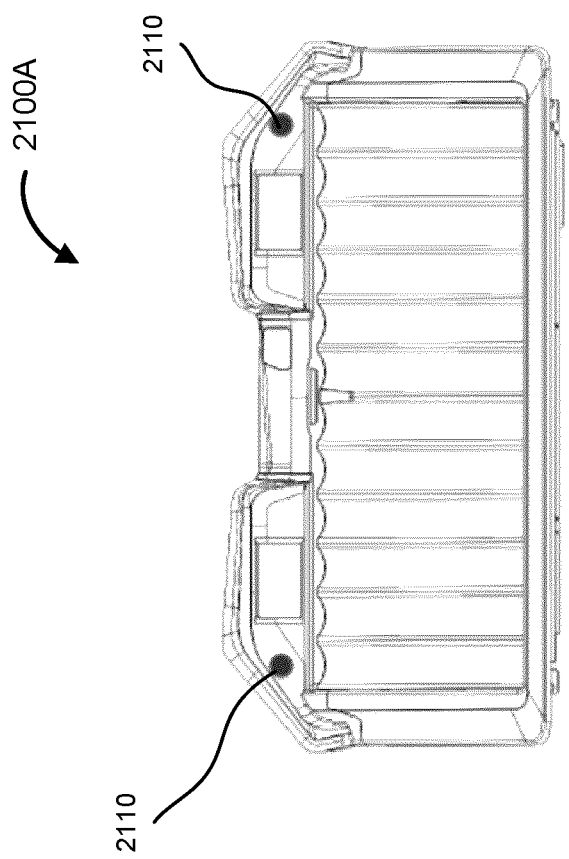

Reference is made to FIGS. 21A and 21B, which illustrate top views of chip trays in accordance with embodiments of the present application. In FIG. 21A, the chip tray 2100A may include cameras positioned at opposing sides/corners of the chip tray assembly. The cameras 2110 may capture images for tracking playing chip deposits or withdrawals from the chip tray assembly. In some embodiments, the cameras 2110 may capture images of the dealer user or a player user. Cameras 2110 positioned at other locations about the chip tray assembly may be contemplated. Further, any number of cameras 2110 may be positioned proximate to the chip tray assembly, at various positions.

In FIG. 21B, the chip tray 2100B may include biometric or fingerprint scanners/readers 2120 for authenticating a dealer user operating or interfacing with the chip tray assembly. In some embodiments, the chip tray 2100B may include a logic interface board 2130 or a computing device interfacing with the fingerprint or biometric scanner/readers 2120. It may be appreciated that biometric scanners, logic interface boards, or computing devices may be positioned at any other location about the chip tray assembly.

In some embodiments, chip tray assemblies may include a lid for mounting under the chip tray. Reference is made to FIG. 22A, which illustrates a side elevation view of a chip tray assembly 2200A without a lid stored beneath the chip tray and with a lid stored beneath the chip tray, in accordance with embodiments of the present application. In some embodiments, additional components may be provided for supporting the lid such that the lid may be mounted to the chip tray assembly to, for example, prevent a non-dealer user form accessing the chip tray lid.

Figure 22B:
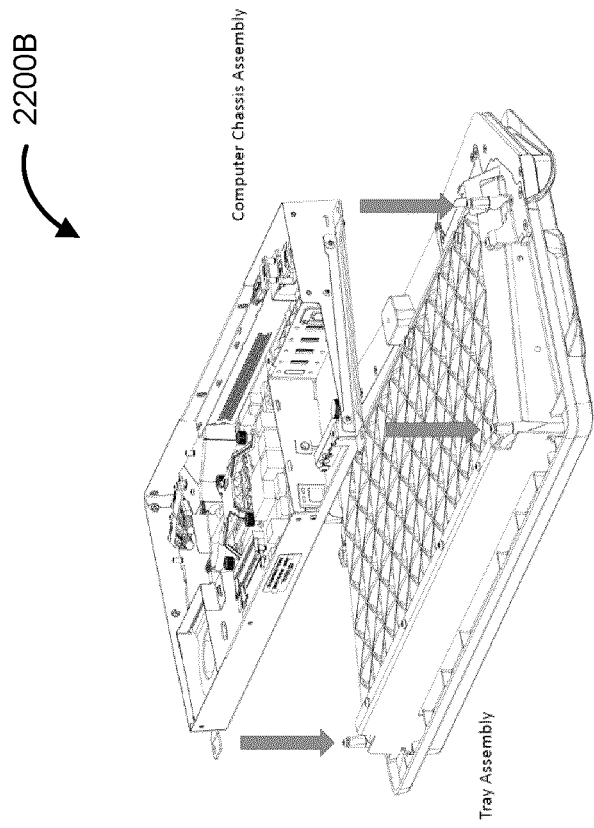
FIGS. 22A and 22B illustrate chip tray assemblies, in accordance with embodiments of the present application.
Figure 22A:
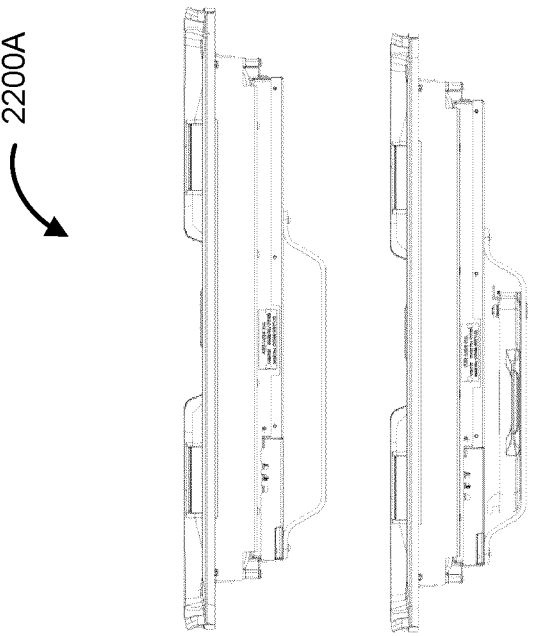

Reference is made to FIG. 22B, which illustrates a partial exploded, bottom perspective view of a chip tray assembly 2200B with a computer chassis assembly, in accordance with embodiments of the present application. The computer chassis assembly may be coupled to an underside of the chip tray assembly. In some embodiments, the computer chassis assembly may include chassis features for restraining and shielding cables and connectors from dealer users or player users of playing tables. In some embodiments, cables for coupling sensors or optical devices of game playing tables described herein may be restrained by cable clamps and cable guards that may allow cables to be routed to other portions of game playing tables.

In some embodiments, computing devices may be mounted to an underside of a chip tray assembly such that cabling length for coupling the computing devices with one or more sensors may be minimized. In some embodiments, by mounting computing devices beneath the chip tray assembly, the chip tray assembly may assist with dissipating heat generated by computing devices.

In some embodiments, the computing device chassis may be configured in a sloped shape to correspond to a sloping profile of the example chip tray described with reference to FIG. 9A.

Figure 23:
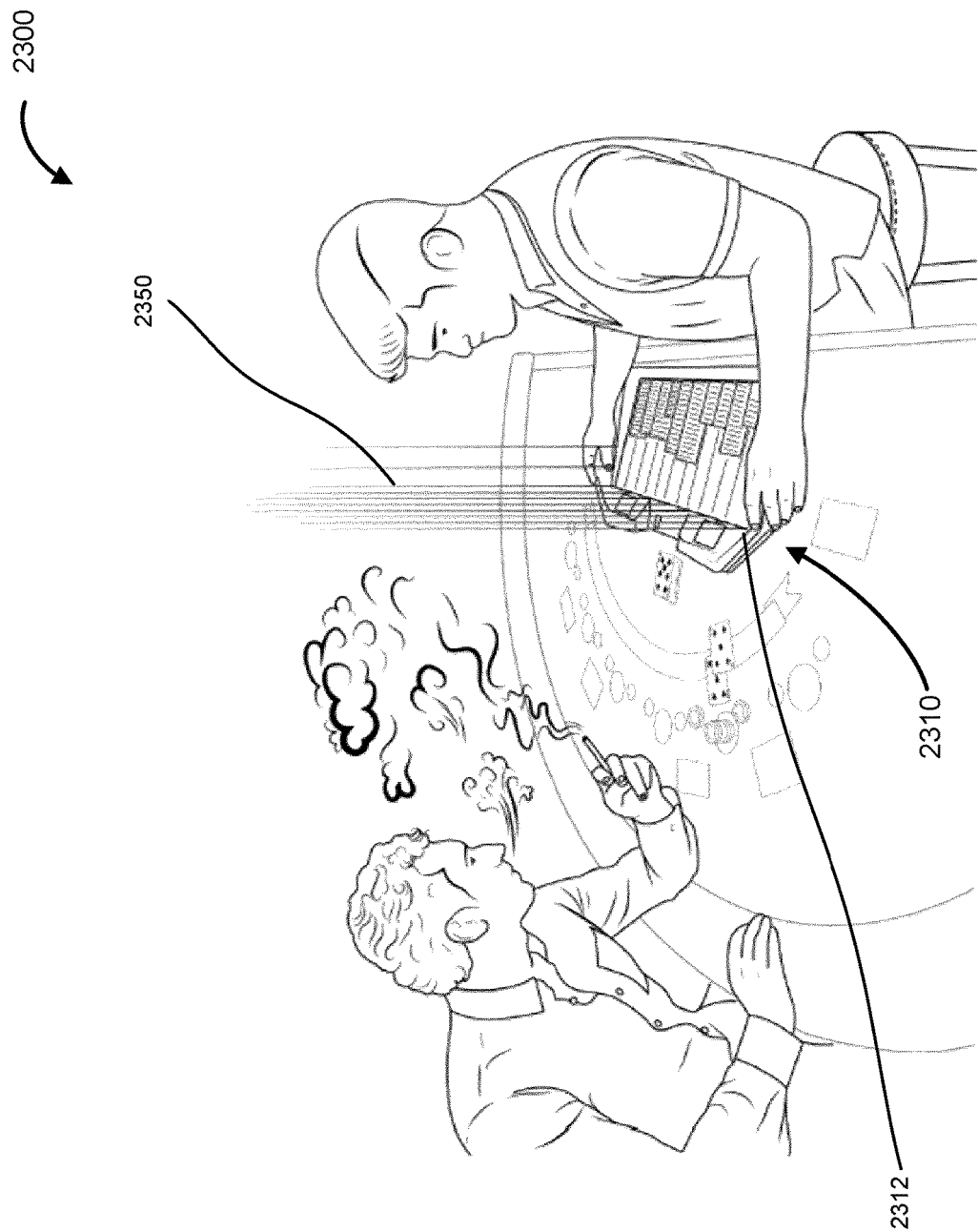
FIG. 23 illustrates a game playing table, in accordance with embodiments of the present application.

Reference is made to FIG. 23, which illustrates a game playing table 2300, in accordance with an embodiment of the present application. The game playing table 2300 may include one or more airflow output vents 2310 along a portion of a front edge(alternatively referred to as a distal end or edge) or side edges of a chip tray assembly 2312. The one or more airflow output vents 2310 may be configured to provide air exhaust to generate an air curtain 2350. The air curtain 2350 may be configured to redirect contaminants (e.g., cigar or cigarette smoke) that may be blown towards the dealer user. In some embodiments, the one or more airflow output vents 2310 may generate a stream of air in an upward direction away from the chip tray assembly 2312 or towards a ceiling. Other directions of the stream of air may be contemplated.

Figure 24B:
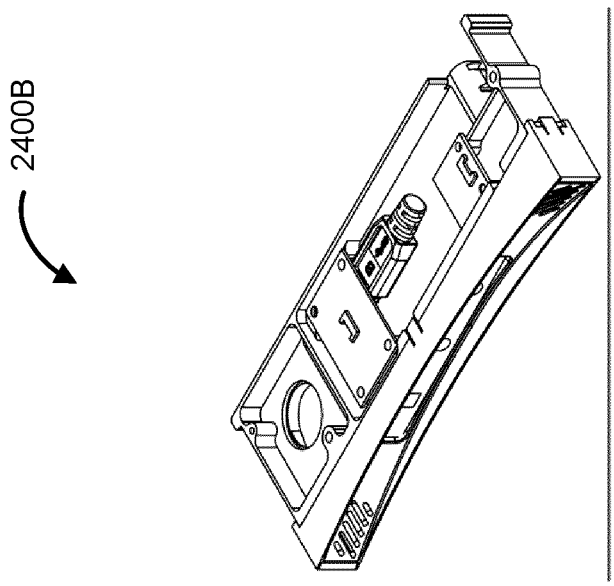
FIGS. 24A and 24B illustrate image capture sensor modules, in accordance with embodiments of the present application.
Figure 24A:
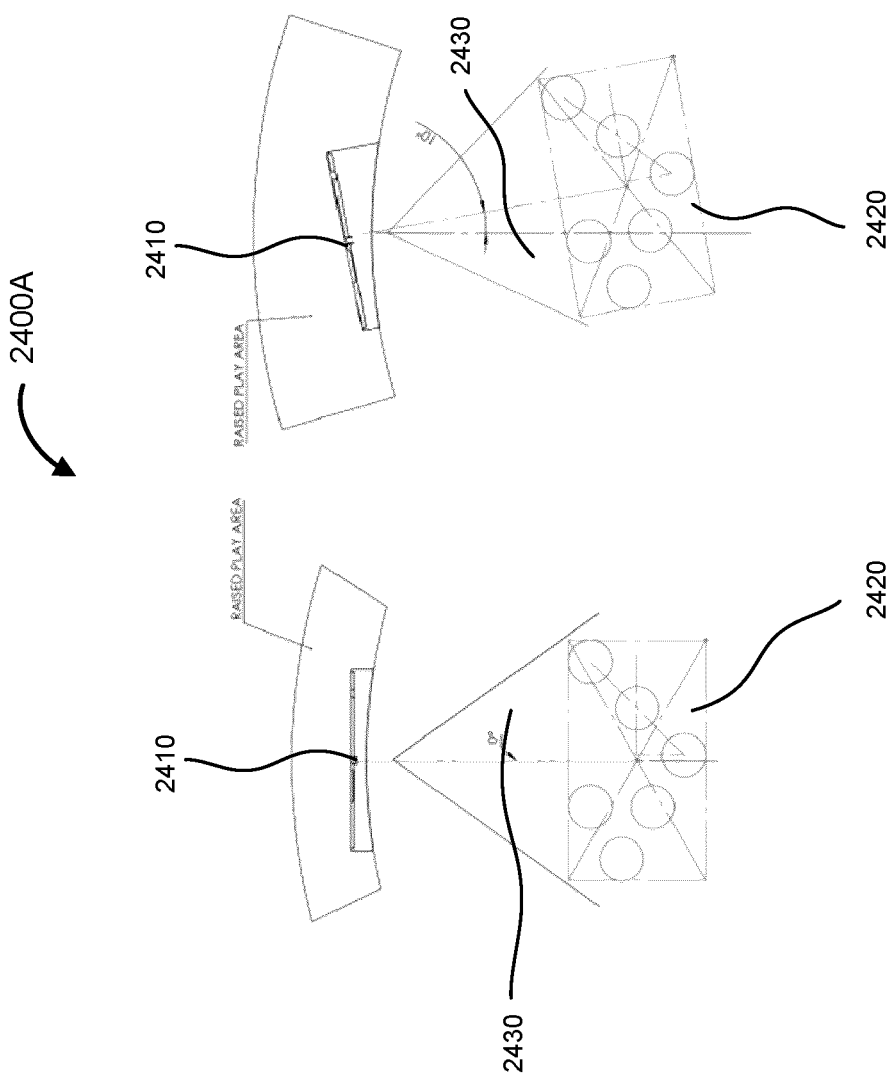

Reference is made to FIG. 24A, which illustrates a partial top view of a playing surface 2400A including image capture sensors 2410 configured relative to chip exchange regions 2420, in accordance with embodiments of the present application. The image capture sensors 2410 may be positioned beneath a raised or elevated playing surface. The image capture sensors 2410 may be associated with a chip exchange region 2420 and may have an optical field of view 2430 for capturing images of at least a portion of the chip exchange region 2420.

Reference is made to FIG. 24B, which illustrates a perspective view of a sensor module 2400B, in accordance with an embodiment of the present application. The sensor module 2400B may include an image capture sensor 2410 described with reference to FIG. 24A. The sensor module 2400B may be associated with a player user region about a game playing table surface and may be positioned for detecting playing chips associated with that player user region.

In some embodiments, the image capture sensor 2400B at least one of infrared transceiver devices for detecting playing chips within the respective chip exchange regions or illumination devices for illuminating playing chips within a chip exchange region.

Figure 25:
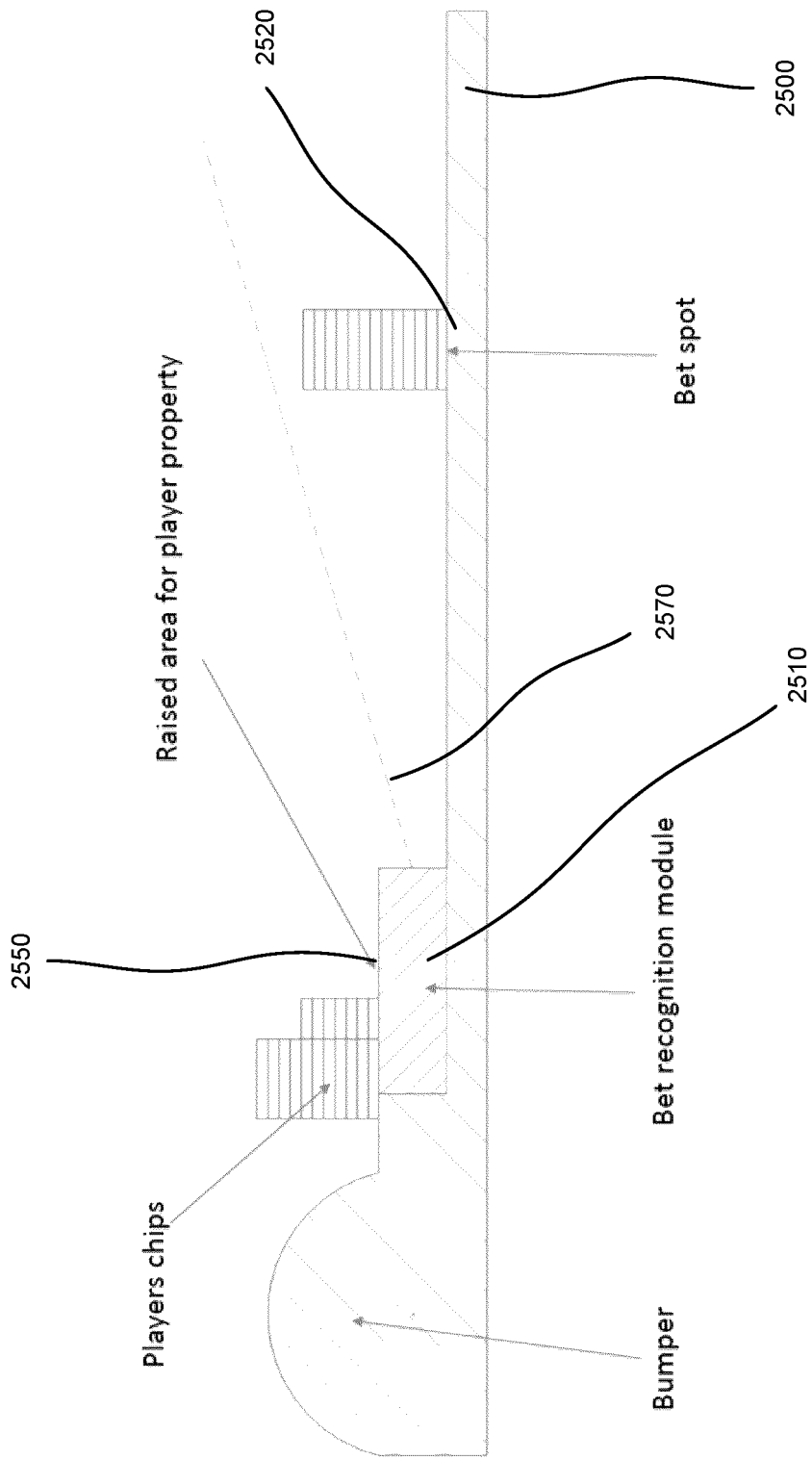
FIG. 25 illustrates a side elevation view of a game playing system, in accordance with embodiments of the present application.

Reference is made to FIG. 25, which illustrates a side elevation view of a game playing system, in accordance with an embodiment of the present application. The game playing system may include a playing surface 2500. The game playing surface 2500 may have a playing chip exchange region 2520 positioned at a portion of the game playing surface 2500. The respective playing chip exchange region 2520 may be associated with a player user region about the game playing surface 2500.

The game playing system may include a sensor module 2510, or a chip amount recognition module, associated with a chip exchange region 2520. The chip amount recognition module may include an image capture sensor having an optical field of view 2570 for capturing images of at least a portion of an associated chip exchange region 2520. In the example illustrated in FIG. 25, the sensor module 2510 may be beneath or may provide a raised player surface 2550 for a player to place playing chips that have not been placed for gaming on the game playing surface 2500. Because the sensor module 2510 may be recessed or beneath a raised player surface 2550, the game playing system may be configured to capture images of playing chips at a level/elevation of the game playing surface 2500. Further, positioning the sensor module 2510 beneath a raised player surface 2550 may reduce the likelihood that a player's arm or other object may obstruct or impede image captures of playing chips placed within the chip exchange region 2520.

In some embodiments, the game playing systems described herein may be configured to combine sensor data captured from the plurality of sensors positioned about the game playing table for determining win/loss statistics associated with players. For example, the game playing system may conduct operations to compile a reverse look up of cards played in a round of a game (e.g., player's first card to dealer's last card), cross-reference quantity of playing chips detected in chip tray assemblies, cross-reference chip movement events, or player gaming data. In some embodiments, fuzzy logic may be applied to decision cards (e.g., cards after the dealer may receive a second card) for determining a likely distribution of cards in a card game.

Figure 26:
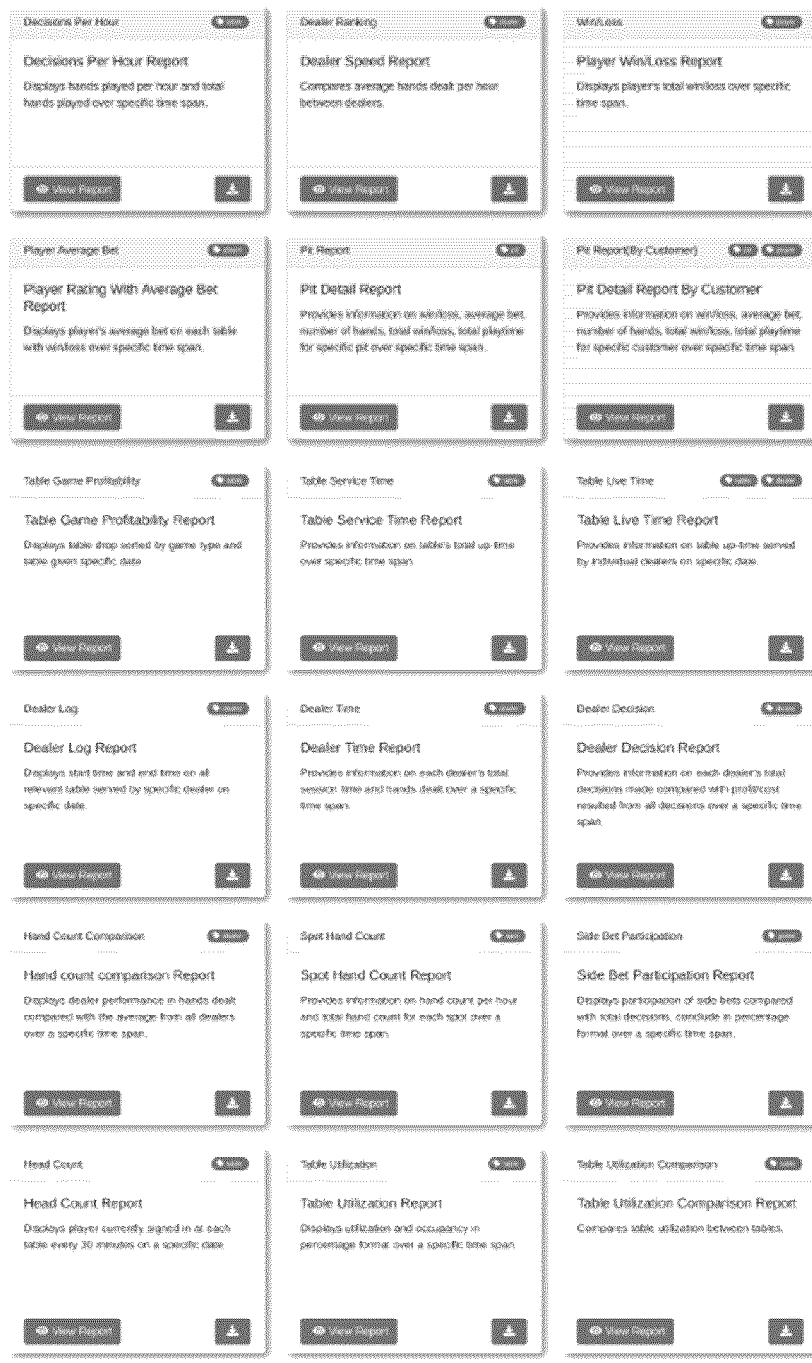
FIG. 26 illustrates a graphical user interface, in accordance with embodiments of the present application.

Reference is made to FIG. 26, which illustrates a graphical user interface 2600, in accordance with an embodiment of the present application. The graphical user interface 2600 may be configured to combine sensor data captured from the plurality of sensors positioned about the game playing table and other data for providing consolidated reporting relating to game play, game environment, or the like.

In some embodiments, systems of tracking playing chips on a gaming table may include a chip tray input system. The chip tray input system may include user interface buttons or touchscreen user interface elements for tracking gaming buy-ins or walk-withs. In some embodiments, when a chip tray assembly may be filled, a chip tray trigger may initiate detection of a quantity of chips within the chip tray assembly. Once the chip tray assembly has been filled, another chip tray trigger may be initiated to detect a quantity of chips within the chip tray assembly. The chip tray input system may determine a difference between said chip quantity counts and may log the difference quantity as the number of playing chips that have been received within the chip tray assembly.

In another example, when a chip tray assembly is emptied of playing chips, a chip tray trigger may initiate detection of a quantity of chips within the chip tray assembly. Once removal of playing chips by a security or staff user is complete, a subsequent chip tray trigger may initiate detection of a quantity of chips within the chip tray assembly. The chip tray system may determine a difference between said chip quantity counts and may log the difference quantity as the number of playing chips that have been removed from the chip tray assembly.

In some embodiments, computing devices described herein may include memory storing processor executable instructions that, when executed configure a processor to conduct operations for processing image data for tracking playing chips or other objects within a resource exchange environment. In the description herein, the following abbreviations may be used:

| | |
|---|---|
| 1D | One Dimensional |
| 2D | Two Dimensional |
| 3D | Three Dimensional |
| FFT | Fast Fourier Transform |
| DFT | Discrete Fourier Transform |
| CSFT | Center Shifted Fourier Transform |
| DFB | Directional Filter Bank |
| DDFB | Decimation-Free Directional Filter Bank |

Digital filtering may be considered as a key step in digital signal and image processing. Digital filtering may be used for amplification or attenuation of some frequencies depending on the nature of application. Filtering can be performed in either time/spatial or frequency domain. In spatial domain, filtering is generally performed with the help of spatial masks (also called spatial filters, kernels, and templates) that are convolved over the entire image. Mathematically, it can be written as:

$$g(x, y) = h(x, y) * f(x, y) = \sum_{i=-\infty}^{\infty} \sum_{j=-\infty}^{\infty} h(i, j) f(x-i, y-j) \quad (1.1)$$

where * represents the convolution between the input image f and the spatial mask h.

The values or the coefficients of the mask determine the nature and the properties of filtering technique. Generally, the spatial mask whose coefficients sums to one may be known as a low-pass filter and may be used for smoothing purpose. On the other hand, the coefficients of a high-pass filter sums to zero and may be used to detect sharp changes and edges. In spatial filtering, the output value at the location (x, y) not only depends on the input value at (x, y), but also on the specified number of neighbouring pixel values around (x, y) determined by the size of mask.

In the frequency domain, filtering can be performed by the point-wise multiplication:

$$G(u,v)=F(u,v)H(u,v) \quad (1.2)$$

where F(u, v) represents the Fourier transform of f(x, y) and H(u, v) represents the Fourier transform of h(x, y). Once, the filtering has been performed in the frequency domain, inverse Fourier transform may be applied to G(u, v) to bring it back to the spatial domain. A brief description of the 2D sinusoids and the Fourier transform is described herein.

A 2D sinusoid may be characterized by phase shift, frequency and the direction of oscillation. Mathematically, a 2D sinusoid can be written as:

$$S(x,y)=A \sin(2\pi(Ux+Vy)+\phi), \quad (1.3)$$

where A represents the amplitude, φ represents the phase shift, U and V (with units of cycles/pixel) represents the frequency of oscillation along the horizontal and the vertical spatial image dimensions.

In case of 2D sinusoids defined on a finite grid of size M×N, it may be often preferred to use scaled frequencies (u, v) that have the visually intuitive units of cycles/image. So, a 2D sinusoid defined on a finite grid of size M×N can be written as:

$$S(x, y) = A\sin\left(2\pi\left(\frac{ux}{M} + \frac{vy}{N}\right) + \phi\right), \quad (1.4)$$

Figure 27:
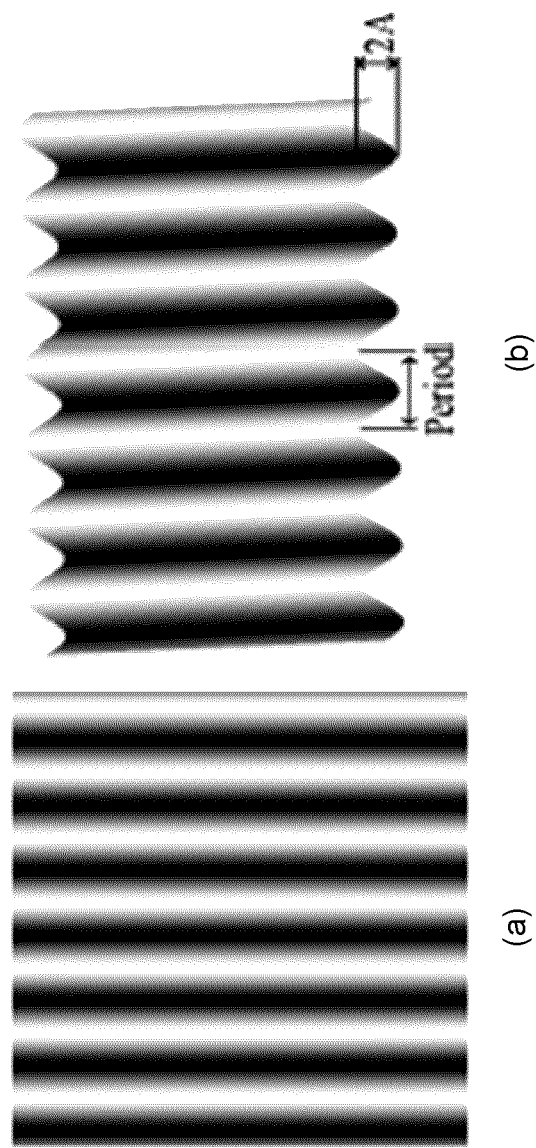
FIGS. 27 to 37 illustrate image portions based on image processing operations, in accordance with embodiments of the present application.

Reference is made to FIG. 27, which represents a 2D sinusoid with its cross sectional view. Generally, a 2D sinusoid oscillates along every direction except for the direction orthogonal to the direction of fastest oscillation. The direction of the fastest oscillation may be given by:

$$\theta = \tan^{-1}\left(\frac{v}{u}\right), \quad (1.5)$$

whereas its frequency can be expressed as:

$$\omega = \sqrt{u^2 + v^2}. \quad (1.6)$$

Figure 28:
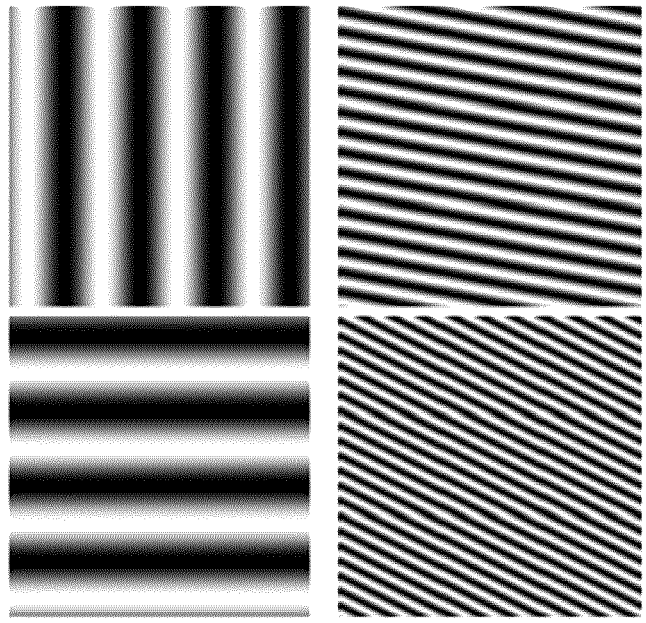

Reference is made to FIG. 28, which illustrates multiple sinusoids of varying frequencies, orientations, and phase.

Fourier transform may be a signal/image analysis tool that decomposes a signal/image into its sine and cosine components. It may transform a spatial domain image into its frequency domain representation. In the frequency domain, each point may represent a particular frequency contained in the spatial domain image. In examples of digital images, the description may be focused on the Discrete Fourier Transform (DFT) which is a sampled version of the Fourier transform.

According to the DFT, an image can be resolved into sinusoids of varying frequencies. Mathematically, it can be written as:

$$F(u, v) = \frac{1}{MN}\sum_{x=0}^{M-1}\sum_{y=0}^{N-1} f(x, y)e^{-2\pi j\left(\frac{ux}{M} + \frac{vy}{N}\right)}, \quad (1.7)$$

where 0≤u≤M−1, 0≤v≤N−1, and F(u, v) is the complex-valued function of the sinusoid passing through the whole image f(x, y) of size M×N. Here, frequency (u, v) is defined in terms of cycles/image. The basis functions of the DFT are complex exponentials with increasing frequencies that exist through out the signal/image at each time/spatial location. Due to this global nature, Fourier transform may provide the information only about the frequency components that are present in a signal/image irrespective of where these components appear in the signal/image.

Generally, a 2D DFT F(u, v), is characterised by frequency (w), magnitude (|F(u, v)|), phase (∠F (u, v)) and direction of the fastest oscillation (θ). Mathematically, these four characteristics can be expressed as:

$$\omega = \sqrt{u^2 + v^2}, \quad (1.8)$$

$$\theta = \tan^{-1}\left(\frac{v}{u}\right),$$

$$|F(u, v)| = \sqrt{\Re(F(u, v))^2 + \Im(F(u, v))^2},$$

$$\phi = \tan^{-1}\left(\frac{\Im(F(u, v))}{\Re(F(u, v))}\right).$$

In the polar form, F(u, v) can be written as:

$$F(u,v) = \Re(F(u,v)) + j\Im(F(u,v)) = |F(u,v)|e^{j\phi} \quad (1.9)$$

where |F (u, v)| is the magnitude and φ represents the phase. The magnitude of the Fourier transform decreases rapidly as one moves away from origin.

The 2D DFT can be implemented efficiently by computing the 1D DFT row-wise followed by column-wise computation of 1D DFT or vice versa. This separability property of the DFT may assist to reduce the number of computations. Even with these computational savings, an N-point 1D DFT has the computational complexity of O(N2). However, this computational complexity can be further reduced to O(N/log2N) by using the Fast Fourier Transform (FFT) to compute the 1D DFT.

Directional analysis may be a process of decomposing an image into a set of several components, each one containing a set of frequency subbands. These subbands can be represented in the frequency domain by partitioning the Fourier spectrum of an image. Directional analysis has been widely used for texture analysis, feature extraction, image enhancement, segmentation, edge detection, and target detection.

In some embodiments, a directional analysis tool may be Gabor filter which is a frequency and orientation selective filter. It can be a modified version of Gaussian filter which can be constructed by modulating a Gaussian in some particular frequency and orientation. Mathematically, the 2D Gabor filter can be written as:

$$g(x, y) = \frac{1}{2\pi\sigma_x\sigma_y}\exp\left[-\frac{1}{2}\left(\frac{x^2}{\sigma_x^2} + \frac{y^2}{\sigma_y^2}\right)\right]\cos(2\pi u_o x) \quad (1.10)$$

where $u_o$ represents the center frequency of a cosine wave along the x-axis and ($\sigma_x$, $\sigma_y$) defines the standard deviation of the 2D Gaussian along the x- and y-axes, respectively.

The 2D Gabor filter g(x, y) may have the following Fourier transform:

$$G(u, v) = A\left[\exp\left\{-\frac{1}{2}\left(\frac{u - u_o^2}{\sigma_u^2} + \frac{v^2}{\sigma_v^2}\right)\right\} + \exp\left\{-\frac{1}{2}\left(\frac{u + u_o^2}{\sigma_u^2} + \frac{v^2}{\sigma_v^2}\right)\right\}\right] \quad (1.11)$$

where $A = 2\pi\sigma_x\sigma_y$, $\sigma_u = 1/2\pi\sigma_x$ and $\sigma_v = 1/2\pi\sigma_y$ [14].

The 2D Gabor filter of arbitrary orientation can be obtained by rotating x-y coordinate system in Eq. 1.10.

Figure 29:
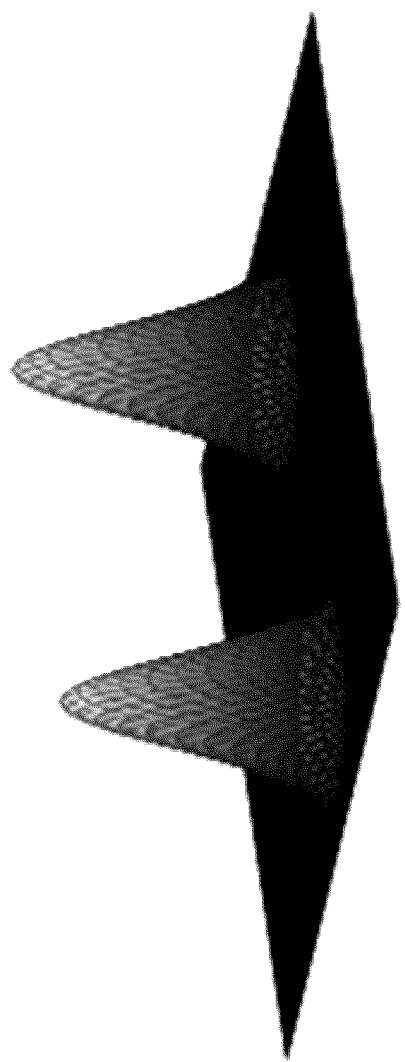

FIG. 29 shows the power spectrum of the 2D Gabor filter, which is a sum of a pair of Gaussians oriented in a particular direction with some radial center frequency $u_o$.

Gabor filters may be widely used for local texture analysis. However, in most of the natural images, it may be hard to find a single filter resolution at which one can localize a spatial structure in an image.

Figure 30:
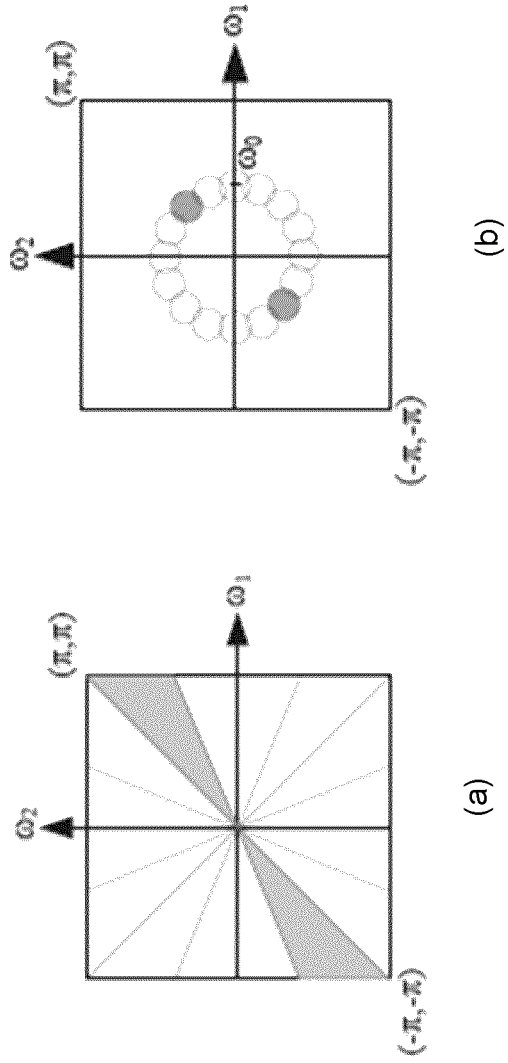

Another directional analysis tool is Directional Filter Bank (DFB) which is capable of extracting the spatial directional information that may be global in nature. DFB was proposed by Bamberger and later refined by Sang. It decomposes the spectrum of an image into wedge-shaped like passbands as shown in FIG. 30. These passbands corresponds to global features in a specific direction in spatial domain. The outputs of DFB may be known as directional sub-bands which are maximally decimated and may be orthogonal to each other. Each sub-band may be of smaller size as compared to the original image because of the presence of down samplers. The original structure of DFB may suffer from frequency scrambling, i.e., after the second stage of DFB, sub-bands become visually distorted. The solution to this frequency scrambling was proposed in, where all the sampling matrices were moved to the end of analysis section of DFB.

Figure 31:
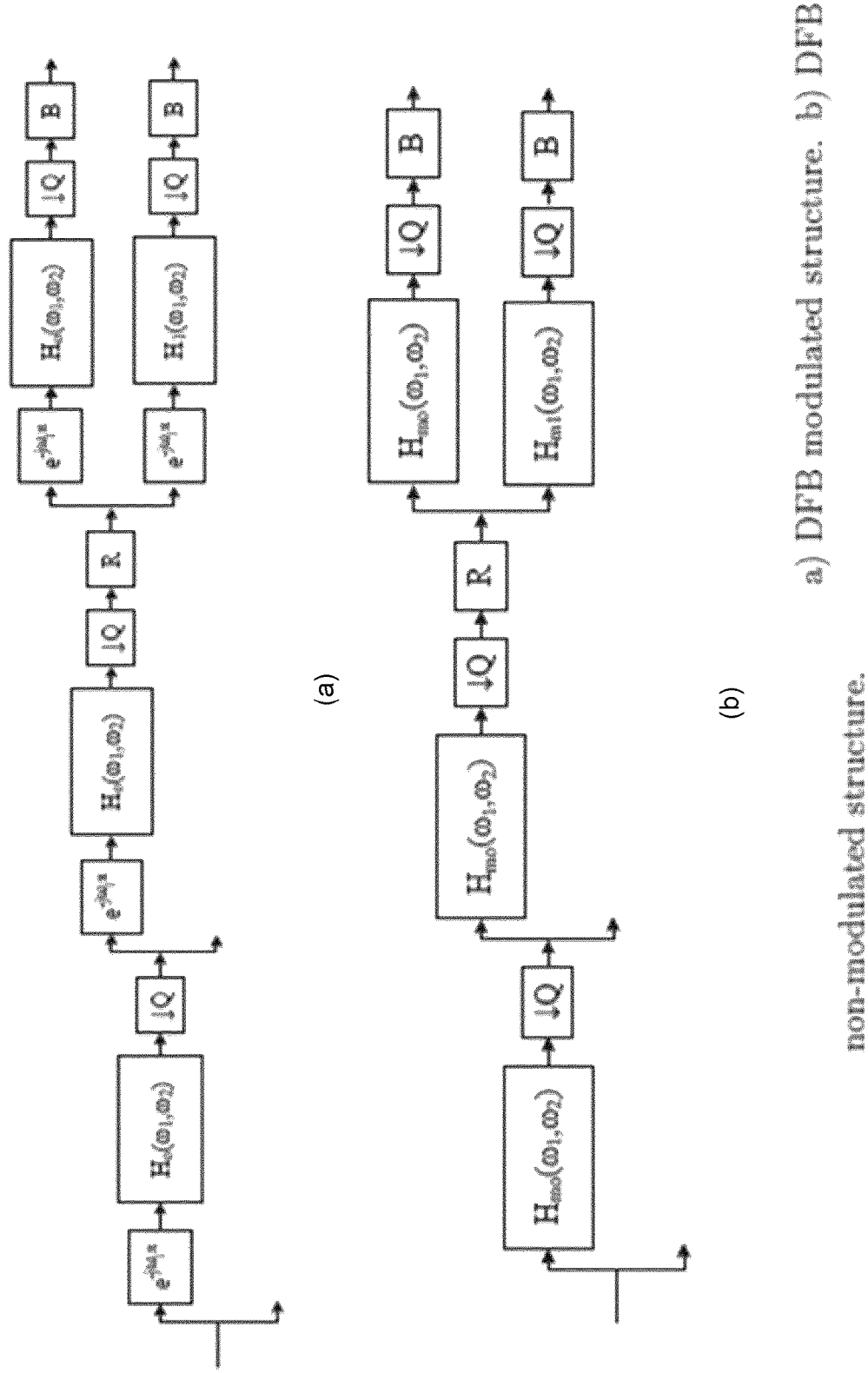

FIG. 31 shows the structure of latest version of 3-stage DFB proposed in, which eliminates frequency scrambling.

The basic structure of the DFB shown in FIG. 31($a$) consists of diamond shaped low-pass filter $H_o(\omega_1, \omega_2)$, diamond shaped high-pass filter $H_1(\omega_1, \omega_2)$, Quicncunx down sampler Q, diamond conversion matrices R, modulators $e^{-j\omega\pi}$, and post-sampling matrix B. The modulator varies the spectrum of the image so that the modulated image can be divided into two directional sub-bands using $H_o(\omega_1, \omega_2)$ and $H_1(\omega_1, \omega_2)$. The Quincunx down sampling matrix used in DFB structure may be given below:

$$Q = \begin{bmatrix} 1 & 1 \\ -1 & 1 \end{bmatrix}$$

Figure 32:
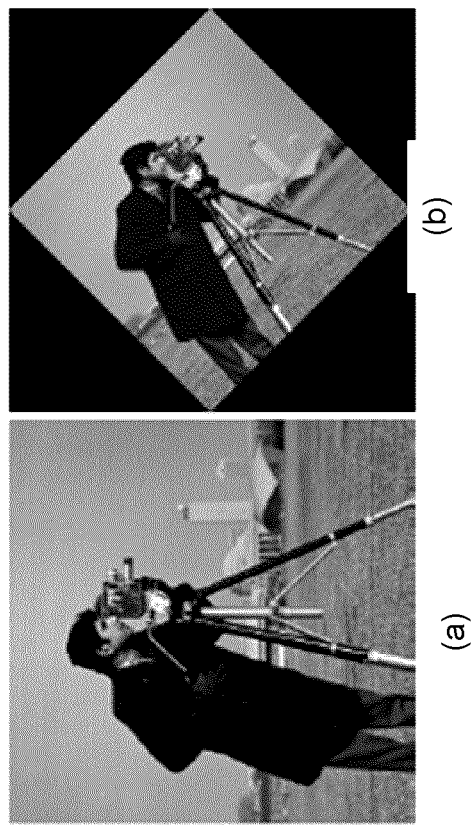

The matrix Q may not only down samples the image diagonally but may also rotate the image by 45 degrees around its origin. FIG. 32 shows the effect of Quincunx down sampling on a cameraman image. The four diamond conversion matrices R applied in the DFB structure are given below:

$$R_1 = \begin{bmatrix} 1 & 1 \\ 0 & 1 \end{bmatrix} \quad R_2 = \begin{bmatrix} 1 & -1 \\ 0 & 1 \end{bmatrix}$$
$$R_3 = \begin{bmatrix} 1 & 0 \\ 1 & 1 \end{bmatrix} \quad R_4 = \begin{bmatrix} 1 & 0 \\ -1 & 1 \end{bmatrix}$$

These matrices may help to map the parallelogram shaped passband to a diamond shaped pass-band. The matrix B in the DFB structure may be the post sampling matrix which is used to correct the frequency scrambling associated with each subband.

Figure 33:
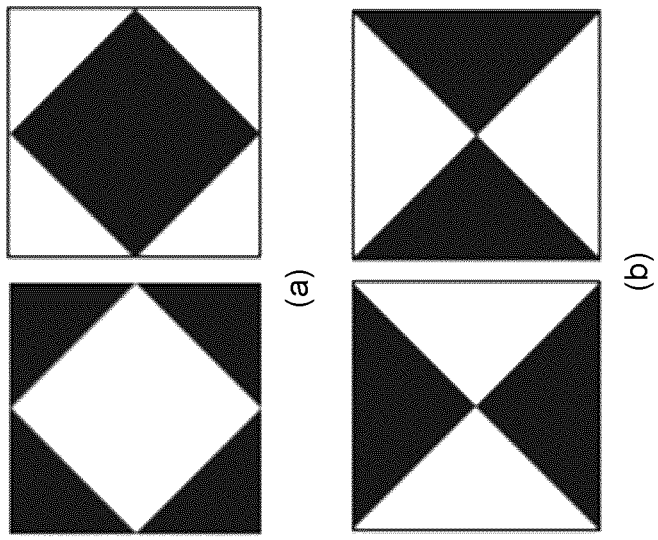
Figure 34:
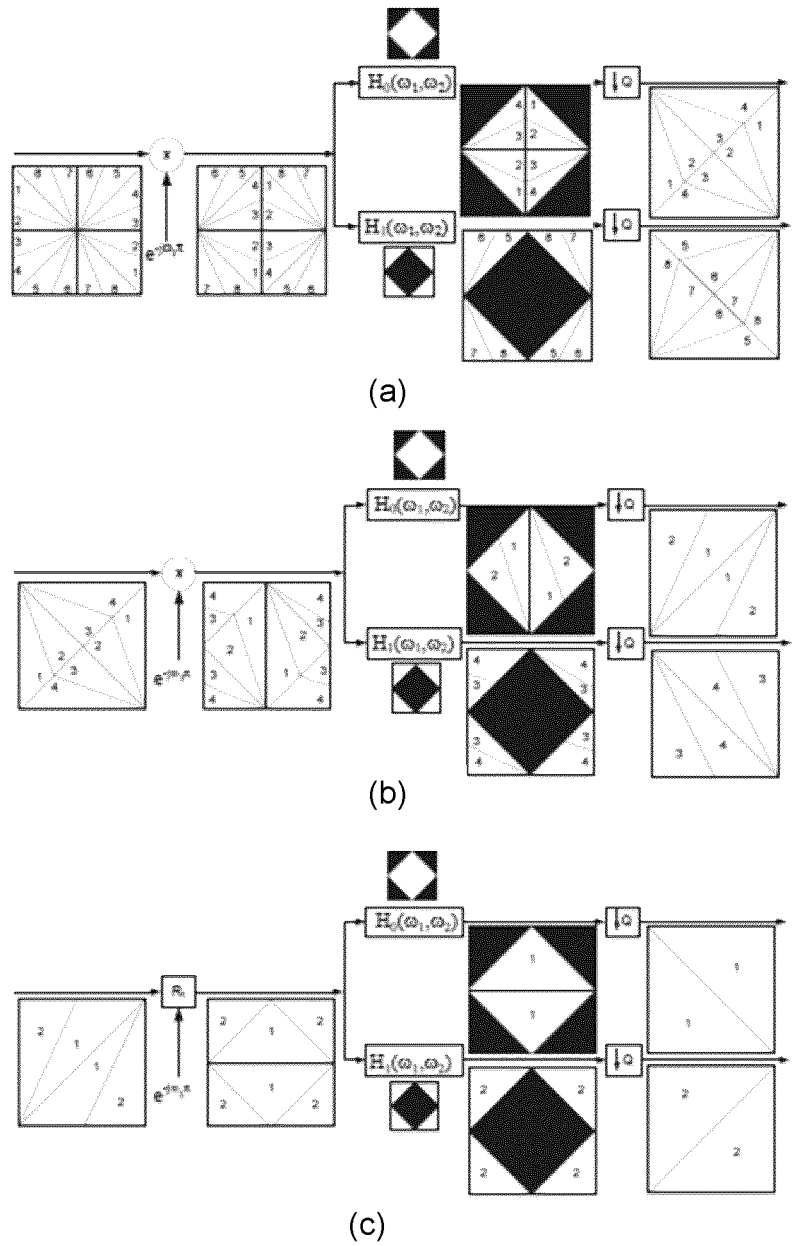

In FIG. 31($b$), the modulators $e^{-j\omega_1\pi}$ has been moved inside the diamond shaped filters to give rise to hour-glass shaped filters $H_{mo}(\omega_1, \omega_2)$ and $H_{m1}(\omega_1, \omega_2)$, as shown in FIG. 33($b$). However, the outputs of the two structures shown in FIG. 31 may be equivalent to each other. FIG. 34 illustrates the filtering steps associated with a 3-stage DFB decomposition. The two sub-bands corresponding to the first stage of DFB are shown in FIG. 34($a$). In the second stage, the outputs of the first stage are further divided into four sub-bands using a procedure shown in FIG. 34($b$). In the third stage, eight directional sub-band outputs are generated.

Figure 35:
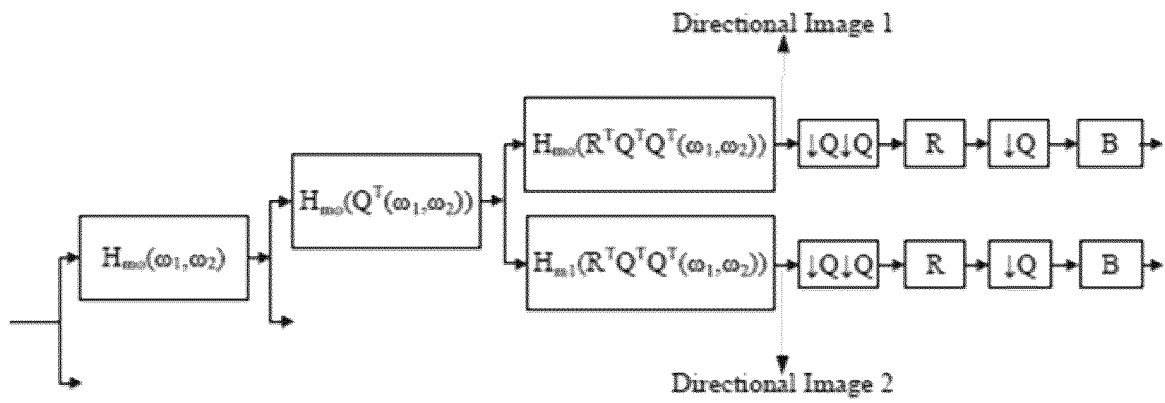

In, DFB has been used for the image enhancement, where directional energies of sub-bands were calculated for the enhancement purpose. Interpolation was used before calculating directional energies to establish a one-to-one correspondence between all the directional sub-bands of DFB. To overcome the extra step of interpolation, Decimation-Free Directional Filter Bank (DDFB) was proposed in, where the decimators and re-samplers were shifted to the right of the filters by using the multi-rate noble identities. The outputs of the DDFB are known as directional images and they are of same size as the input image. In DDFB, there is a one-to-one correspondence between pixels of all directional images, i.e., two pixels located at a spatial position (x, y) in two different directional images corresponds to the same position (x, y) in the original image. FIG. 35 shows the structure of 3-stage DDFB proposed in. Here, Q and R corresponds to the same Quincunx down-sampling matrix and the diamond conversion matrices used in DFB.

Figure 36:
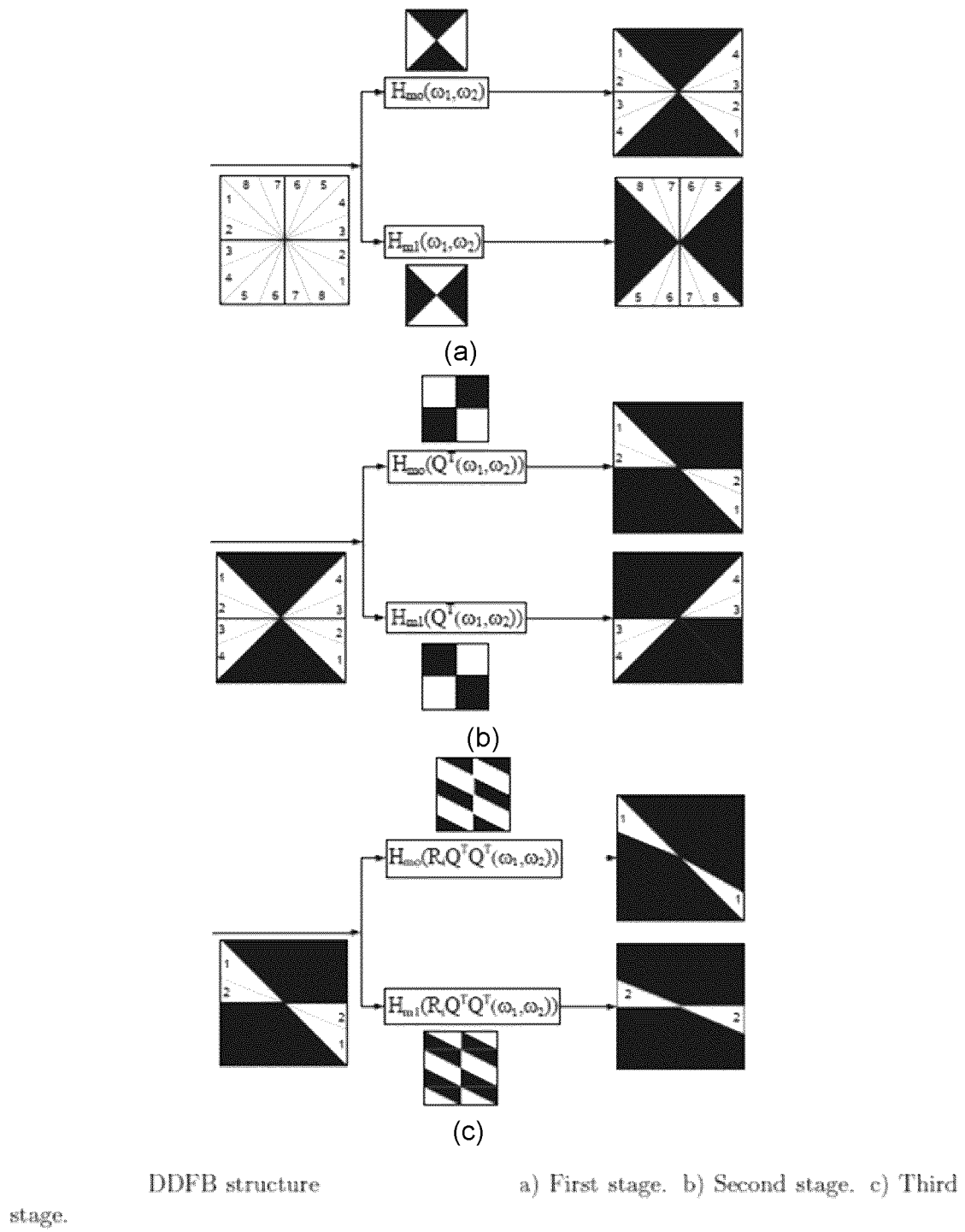

FIG. 36 shows a 3-stage DDFB decomposition where the outputs corresponding to the first stage of DDFB are shown in FIG. 36($a$). FIG. 36($b$) and FIG. 36($c$) shows some of the filters corresponding to the second and the third stage of DDFB.

Local Intensity Inhomogeneity Correction: In some embodiments, methods described herein may include local intensity inhomogeneity correction. Generally, global intensity inhomogeneity may be modelled as a slowly varying component. However, this assumption may not hold in case of images having shadow artifacts. These artifacts may appear as sharp discontinuities and may only visible at shadow boundaries. The presence of the shadow artifacts shifts the paradigm from global to local intensity inhomogeneity correction. The literature shows that the presence of local intensity inhomogeneity may affect the performance of image matching. Especially, in uncontrolled environments such as Casinos, the suppression of local intensity inhomogeneity may be considered as one of the major challenges which is often corrected at different scales and orientations. However, the selection of scale and orientation may be a problem in itself.

Generally, it may be believed that the features invariant to local intensity inhomogeneity are most discriminatory and helpful in image recognition. In case of playing chips, the topographic/spherical structure of chips often gives rise to vertical shadows. This suggests that the horizontal features are least effected by the local intensity inhomogeneity.

In some examples, a comparison between horizontal and vertical chip features in presence of local intensity inhomogeneity may be provided. It may be empirically shown that in presence of local intensity inhomogeneity, most of the discrimatory power may lie within the horizontal features.

Decimation-Free Directional Filter Banks (DDFB): Generally, global intensity inhomogeneity may be modelled by low frequency components. However, this assumption does not hold in case of local intensity inhomogeneity as it gives rise to shadows artifacts. These shadow artifacts may be often considered as high frequency components and they appear as edges after any global normalization method.

Depending on the severity of the local intensity inhomogeneity, these edges at the shadow boundaries can appear at different scales. Gabor filters may provide a mechanism to deal with edges occurring at different scales and orientation. But to choose a specific scale and orientation may have been an open question up till now. In some examples, the methods can construct a partial solution to the orientation problem by using the prior that the shadow boundaries may be mainly vertical in nature. The ambiguity in scale selection leaves with no other option except to use all scales at the same time.

To suppress the edges produced at the shadow boundaries, DDFB appears to be an appropriate candidate as it provides a mechanism to design orientation selective filters irrespective of the scale. These filters split the Fourier transform of an image into wedge shaped passbands. In the spatial domain, these passbands may correspond to all features in a specific orientation irrespective of the scale. See also references. As examples herein may be interested in suppressing the vertical shadows, a filter pair may use DDFB, which decomposes chips' features into its horizontal and vertical components.

The following may be example operations, in accordance with embodiments described herein, to construct the desired filter pair:

1. Construct a 1D linear phase FIR low-pass filter u, with a cut-off frequency of $0.47\pi$ to avoid aliasing.
2. Construct a 2D filter by taking the tensor product of the 1D filter u, with itself. For instance, a 1-dimensional filter u=(u1, u2, ..., um) having m coefficients, after the tensor product can be expressed as:

$$X = u \otimes u = \begin{bmatrix} u_1 u_1 & u_1 u_2 & \cdots & u_1 u_m \\ u_2 u_1 & u_2 u_2 & \cdots & u_2 u_m \\ \vdots & \vdots & \ddots & \vdots \\ u_m u_1 & u_m u_2 & \cdots & u_m u_m \end{bmatrix}$$

where the $\otimes$ symbol defines the tensor product. FIG. 2.1(a) shows the Fourier transform of the 2D filter X constructed by using the tensor product.

3. Now, perform the directional down-sampling on the 2D filter X by using the Quincunx downsampling matrix M, where M is:

$$M = \begin{bmatrix} 1 & 1 \\ -1 & 1 \end{bmatrix}$$

Figure 37:
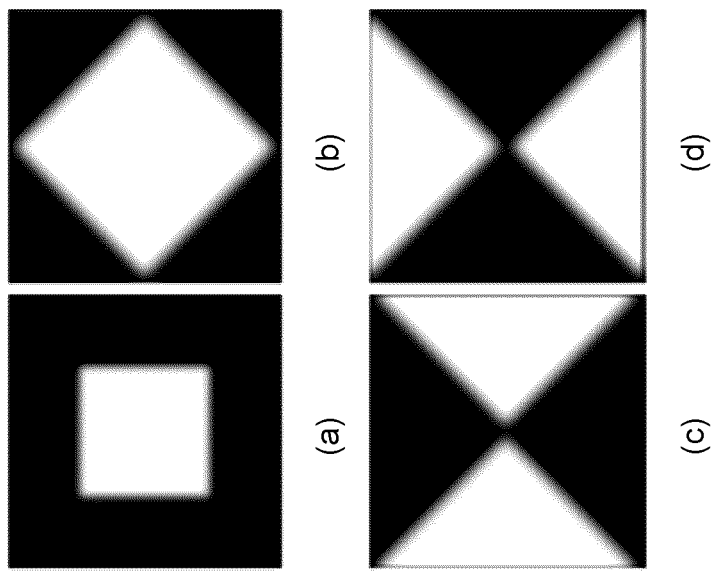

Mathematically, the whole operation in the frequency domain can be represented as:

$$X_w(\omega) = \frac{1}{|det(M)|} \sum_{k \in N(M^T)} X(M^{-T}(\omega - 2\pi k)) \quad (2.1)$$

where N (MT) is the set of integers of the form MT x, with $x \in [0, 1)^D$. The result of this transformation on FIG. 37(a) is shown in FIG. 37(b). Here, it is trivial that the directional down-sampling maps the square shaped passband in FIG. 37(a) to diamond shaped passband as shown in FIG. 37(b). It is important to mention that the directional down-sampling will not decrease the total number of filter coefficients in the spatial domain, however, it will introduce zeros in the filter.

4. As a last step to construct the desired filter pair, we modulate the 2D filter having a diamond shaped passband with $\pi$ in each frequency dimension. Mathematically, it can be stated as:

$$v(x, y) = x_w(x, y)e^{j2\pi\left(\frac{\pi x}{R}\right)} \quad (2.2)$$

$$h(x, y) = x_w(x, y)e^{j2\pi\left(\frac{\pi y}{C}\right)}$$

where $x_w$ (x, y) is the spatial domain representation of the diamond shaped passband filter, v(x, y) will capture the vertical components, h(x, y) will capture the horizontal components of the image, R and C defines the size of the filter.

5. From Eq. 2.2, this transformation may map the diamond shaped passband to an hour glass shaped passband. FIG. 37(c) and FIG. 37(d) shows the Fourier transform after such a transformation. It is also worth mentioning that application of these filters will decompose the input image into its directional components irrespective of their scale. In some examples, the filters shown in FIG. 37(c) and FIG. 37(d) may be used to decompose the face image into its directional components. The filter in FIG. 37(c) may capture the vertical components while the filter in FIG. 37(d) may capture the horizontal components of the image. This may be mainly due to the fact that the horizontal components (having gradient in the vertical direction) may be localized vertically in the Fourier transform and vice versa.

Key Frame Extraction: In some embodiments, the methods described herein may include operations for key frame extraction. For key frame extraction, some examples include non-linear dimensionality reduction methods in addition to k-medoids clustering.

Clustering is a supervised/unsupervised classification of patterns (objects, observations, data items, or feature vectors) into groups or clusters. The goal of clustering may be to minimize the within cluster dissimilarity and to maximize the between cluster dissimilarity. It can also be considered as finding groups of patterns such that the patterns within a group are similar to each other and different from the patterns in other groups.

K-medoids may be a classical partitioning method where each cluster is represented by one of the data points in the cluster as its center, i.e., medoid. A medoid can be defined as the data point of a cluster, whose average dissimilarity to all the data points in the cluster is minimal.

Given an unlabelled data set $X=\{x_1, x_2, \ldots, x_n\}$ of n data points where $x_i \in R^d$, K-medoids algorithm partitions X into K clusters by minimizing the total squared error between X and all the medoids V, where $V=\{v_1, v_2, \ldots, vK\} \subset X$ with cardinality K.

Mathematically, it can be written as:

$$\min_V J(V) = \sum_{j=1}^{K} \sum_{i=1}^{n} \|x_i - v_j\|^2, \quad (2.1)$$

The k-medoids operations include:

1. Fix the number of clusters K, $K \in [2, n)$
2. Randomly choose the initial configuration of medoids V.
3. Associate each data point to the closest medoid using a distance measure and calculate the cost.
4. For each medoid vj
   (a) Swap the non-medoid data point with vj.
   (b) Compute the cost of the configuration, i.e., total squared error.
   (c) Select the configuration with the lowest cost.
5. Repeat steps 3 to 4 until there is no change in the medoids.

Laplacian Eigen Maps (LEM) may be a non-linear dimensionality reduction method which aims to find the lower dimensional manifold embedded in the higher dimensional space while preserving the spatial relationship. To accomplish this task, LEM may construct a graph G in which every data point di is connected to its k-nearest neighbours. All edges between the connected data points in a graph G have a cost equal to one. It is followed by the construction of an adjacency matrix Cij which have an entry 1 at location (i, j), if the data point di is among the k-nearest neighbours of $d_j$. The rest of the locations in Cij are set to zero. LEM requires the construction of Laplacian matrix L, which can be computed as:

$$L_{ij} = \begin{cases} D_{ij} & \text{if } i = j \\ -C_{ij} & \text{if } d_i \text{ and } d_j \text{ are adjacent data points} \\ 0 & \text{otherwise.} \end{cases} \quad (2.2)$$

Here, D is a diagonal matrix computed as $$D_{ij} = \sum_j C_{ij}.$$

The final step in the LEM method is to find the generalized eigenvector solution to:

$$Lf = \lambda Df. \quad (2.3)$$

As L is a symmetric positive semidefinite matrix with $\lambda 0=0$ as a trivial eigenvalue, it implies that all eigenvalues can be ordered as: $0=\lambda 0 \leq \lambda 1 \leq \lambda 2 \ldots \leq \lambda N-1$. Now, the mapping of di in a low-dimensional space m is computed by leaving the eigenvector f0 and using the next m eigenvectors as:

$$d_i \rightarrow (f_1(i), f_2(i), \ldots, f_m(i)). \quad (2.4)$$

Here, the mapping $f_{opt}$ is the solution to the following minimization problem.

$$f_{opt} = \arg \min_f \sum_{(i,j)} C_{ij} \| f^{(i)} - f^{(j)} \|^2 \quad (2.5)$$

where $f^{(j)} = [f1(i), f2(i), fm(i)]T$ is the m-dimensional representation of the i-th data point.

As, the examples described herein may be interested in extracting the key-frame with no obstruction between camera and chips, that LEM on such data may provide quite logical representation by mapping the obstructed, semi-obstructed, non-obstructed frames close to obstructed, semi-obstructed, and non-obstructed frames, respectively in the lower dimensional space. K-medoids clustering of this low-dimensional mapping into three clusters yields intuitive classification, i.e., obstructed, semi-obstructed, and non-obstructed classes. This mapping may ease the selection of the template frame. Each low-dimensional point may have a one-to-one correspondence with the higher dimensional point. The class having the medium average value (computed among the corresponding higher dimensional points) may be considered as the state when there may be no obstruction. The point in the higher dimensional space may be considered as key frame if the corresponding lower dimensional point represents the key frame. The key frame selected using this method may be relatively insensitive to outliers and noise. To construct the adjacency matrix, 5-nearest neighbours may be used and for the low-dimensional embedding, we have set m=2. The choice of 5-nearest neighbours may be motivated by the fact that it may result in one-connected component in the graph for our test videos.

In some scenarios, background subtraction may be a computer vision task. We analyze the usual pixel-level approach. An efficient adaptive algorithm using Gaussian mixture probability density may be used. It may be based on two papers by Z. Zivkovic, "Improved adaptive Gaussian mixture model for background subtraction" in 2004 and "Efficient Adaptive Density Estimation per Image Pixel for the Task of Background Subtraction" in 2006.

The used algorithm may be an improved version of GMM background subtraction scheme. It can automatically select the needed number of components per pixel and in this way fully adapt to the observed scene. Furthermore, it may provide better adaptability to varying scenes due illumination changes etc. In some examples, it may discard all the frames with dealer's hand during cards placement. Furthermore, after applying the mask, it may compute none zero pixels. If the count is greater than a predefined threshold, the frame may be discarded. In our case, we may use 20,000 as a predefined threshold.

Figure 38:
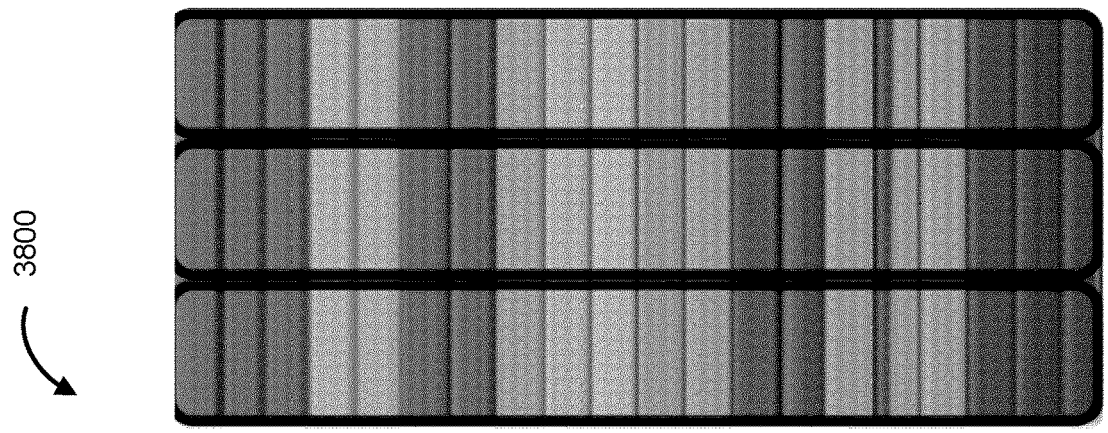
FIG. 38 illustrates images of a stack of playing chips, in accordance with embodiments of the present application.
Figure 38:
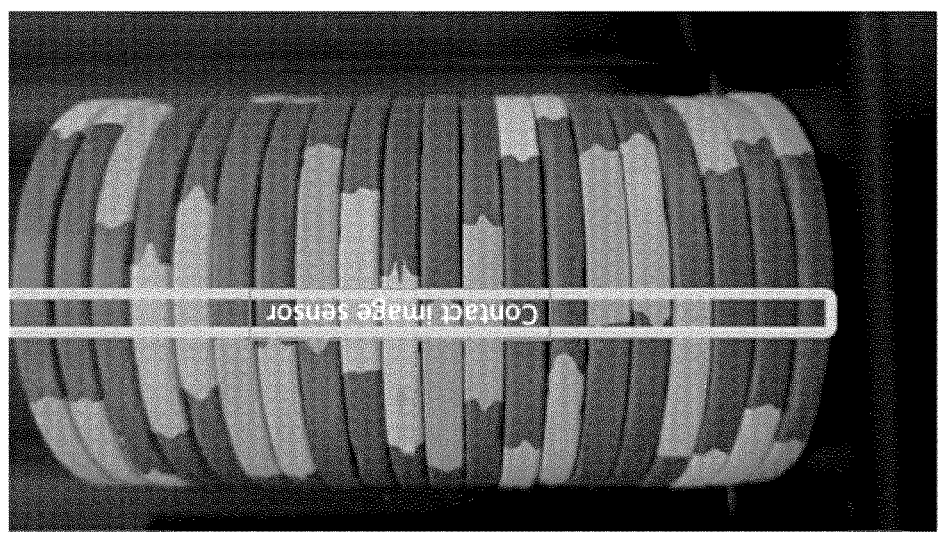

Reference is made to FIG. 38, which illustrates images 3800 of a stack of playing chips, in accordance with embodiments of the present application. On the left hand side of FIG. 38, a stack of playing chips of a single denomination (e.g., $5 playing chips) is illustrated. In some embodiments, a contact image sensor may capture an image of the stack of playing chips at the shown position. For example, the contact image sensor may be an elongate sensor 710 as described with reference to FIG. 7. On the right hand side of FIG. 38, an enlarged view of an image captured by the contact image sensor is illustrated.

In some embodiments, a respective contact image sensor positioned at or embedded within respective chip storage apertures 720 (FIG. 7) may capture images of the plurality of playing chips. Embodiments of a game monitoring system or computing device described herein may be configured to identify the playing chip denomination based on images captured by the contact image sensor.

In some examples, methods may identify stripe patterns created based on a combination of playing chip colors. The stripe patterns may be based on a random rotational orientation of respective playing chips in a stack of playing chips. Methods including fast Fourier transform (FFT) analysis may be used.

In some embodiments, the method of identifying playing chip denominations may be based on color or gradient space. Further, operations including thresholding color histogram values may increase accuracy of deducing or identifying the playing chip denomination based on images captured by the contact image sensor.

In some embodiments, methods may be conducted based on presumption that the respective adjacent chip storage apertures store playing chips having a single denomination. In some embodiments, methods may include operations to conduct classifications based on a weighted check-list of colors. For example, if two of the 3 or 4 colors of a given playing chip denomination are depicted in a contact sensor image, it may be feasible to predict the playing chip denomination of playing chips within that chip storage aperture. In some examples, the weighted check-list may be based on dominant colors, which may be a color associated with a majority side surface of a playing chip. In some embodiments, methods may be conducted to identify a color and deduce that the respective stack of playing chips may not be a particular playing chip denomination.

In some embodiments, the methods may include estimating a particular playing chip denomination stochastically, where a playing chip denomination may be determined if a contact sensor image illustrates a majority of playing chips in a stack of playing chips having a particular color (e.g., greater than 70%), where that particular color may be a dominant color of a particular denomination (e.g., color red for $5 playing chips). In another example, where a contact sensor image having an N by 3 matrix of data values indicates that the color white is detected greater than 70% of the data points, the stack of playing chips may be $1 denomination playing chips.

Figure 40:
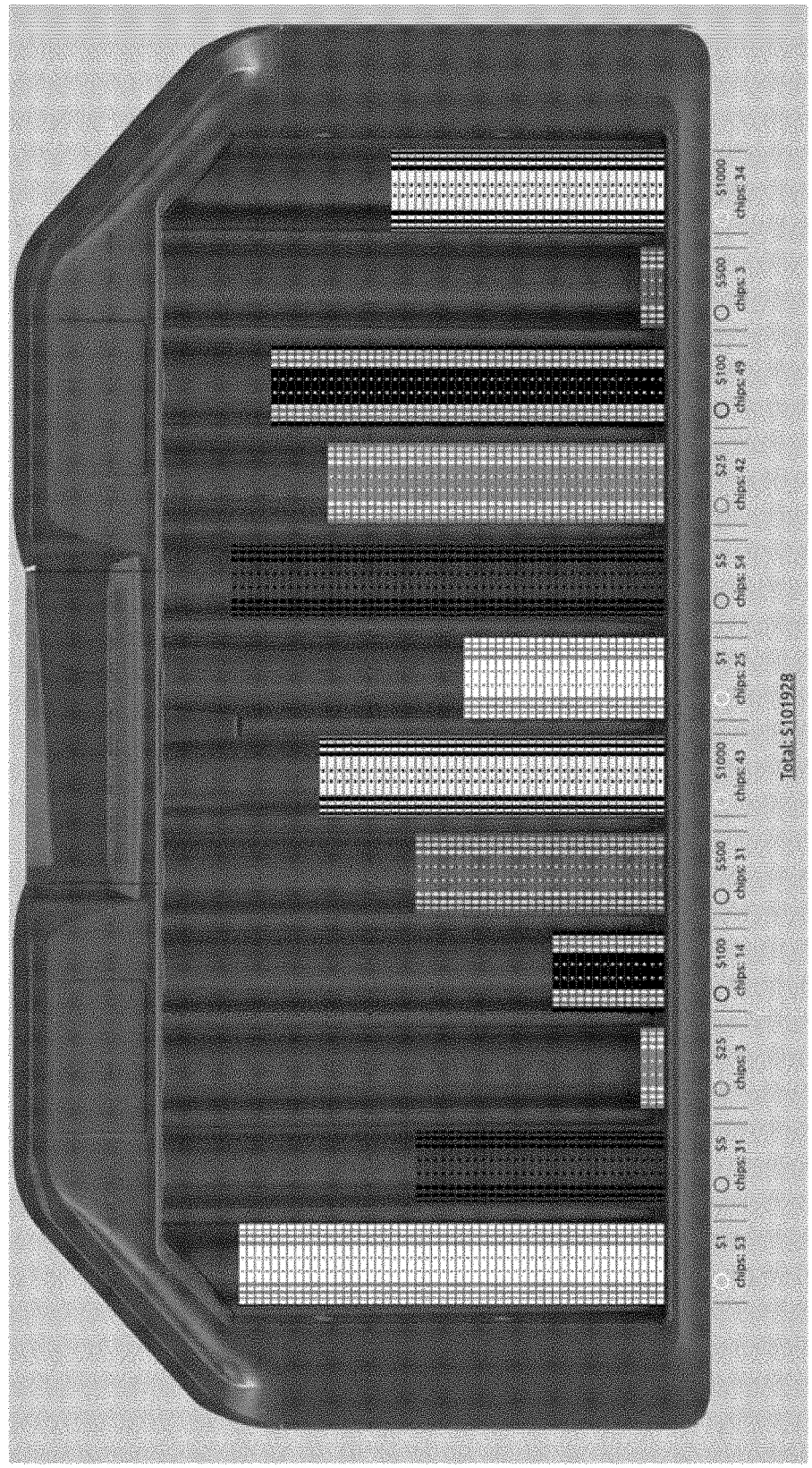
FIG. 40 illustrates a graphical user interface of a chip tray tube counting status indicator, in accordance with an embodiment of the present application.

Reference is made to FIG. 40, which illustrates a graphical user interface 4000 of a chip tray tube counting status indicator, in accordance with an embodiment of the present application. The game monitoring server may conduct operations via sensors, devices, or methods described herein for detecting and tracking playing chips within example chip storage apertures of a chip tray. The game monitoring server may be configured to conduct operations to retrieve status of detected playing chips and to retrieve the detected playing chip denominations associated with the respective chip storage apertures. The game monitoring server may generate the graphical user interface 4000 for displaying in real-time to a dealer user, a game administrator, or the like current detected status of playing chips within the chip tray. In some embodiments, a playing chip quantity count and a tally of a total monetary value of the playing chips stored in the chip tray may be provided.

Figure 41:
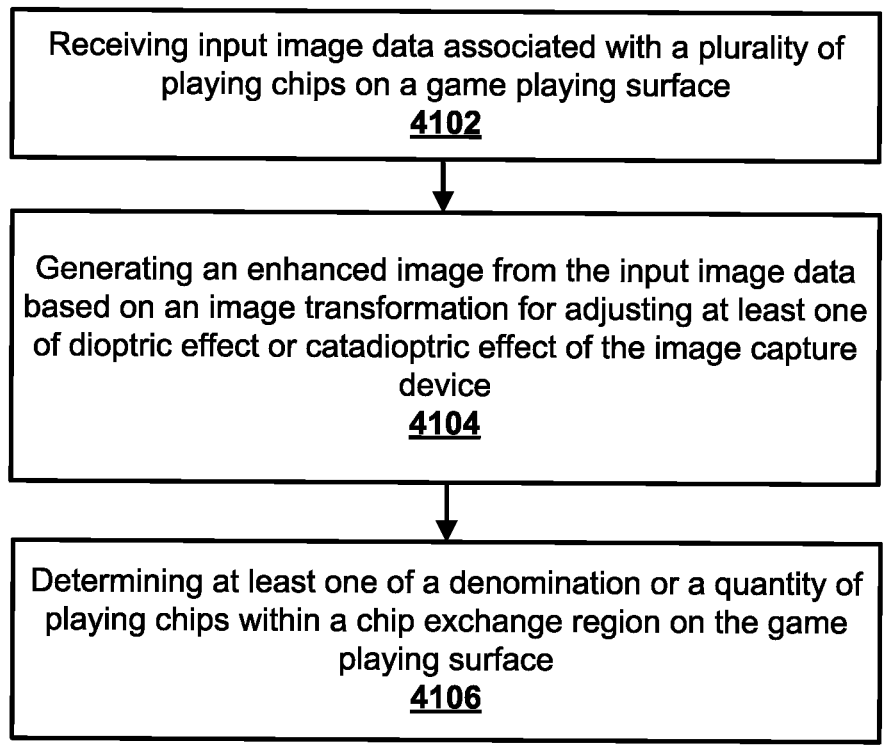
FIG. 41 illustrates a flowchart of a method of image recognition, in accordance with an embodiment of the present application.

Reference is made to FIG. 41, which illustrates a flowchart of a method 4100 of image recognition, in accordance with an embodiment of the present application. The method 4100 may be conducted by a processor of a game monitoring system. The processor readable instructions may be stored in a memory and may be associated with processor readable applications.

At operation 4102, the processor may receive, from a camera, input image data associated with a plurality of playing chips on a game playing surface. In some embodiments, the camera may be at least one of a wide angle, 360 degree field of view, or other type of camera.

At operation 4104, the processor may generate an enhanced image from the input image data based on an image transformation for adjusting at least one of dioptric effect or catadioptric effect of the camera. In some embodiments, the image transformation may be for compensating for or correcting image data for a dioptric effect or catadioptric effect such that the image data may be undistorted.

In some embodiments, the image transformation may be based on a Taylor series expansion model of the camera. In some embodiments, the image transformation for calibration of a 360 degree field of view camera may be based on:

$$x_k^I = KPX_k^W$$

$$x_k^I = \begin{bmatrix} f_x & s & p_x \\ 0 & f_y & p_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} X_k^W$$

where K is an intrinsic camera parameter and P is an extrinsic camera parameter.

In some embodiments, the image transformation may be based on Decimation-Free Directional Filter Banks (DDFB) for suppressing vertical shadows captured within image data of the plurality of playing chips.

In some embodiments, the image transformation may be based on key frame extraction including non-linear dimensionality reduction or k-medoids clustering.

At operation 4106, the processor may determine at least one of a denomination or a quantity of playing chips within a chip exchange region on the game playing surface.

In some embodiments, the processor may determine at least one of a denomination (alternatively referred to as a chip type of the playing chip) or a quantity of playing chips (via chip locations) stored within a chip tray based on a light passed through a diffuser.

Figure 42:
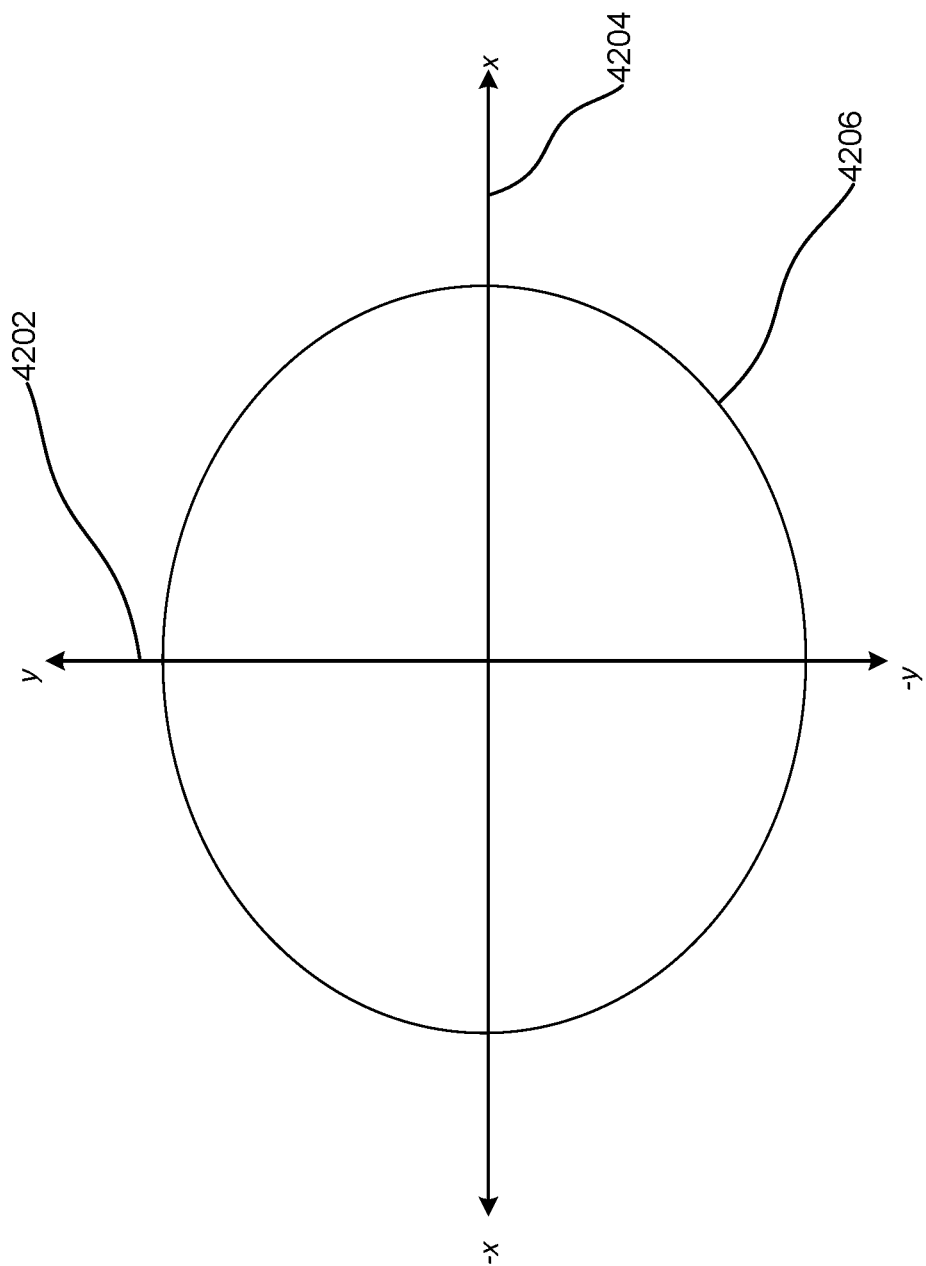
FIG. 42 illustrates an example light distribution pattern, in accordance with an embodiment of the present application.

FIG. 42 illustrates an example light distribution pattern 4206, in accordance with an embodiment of the present application. The example light distribution pattern 4206 may be a light distribution pattern generated by a light emitting device (e.g., light emitting device 1400A). The example light distribution 4206 is shown as being symmetrical across both a vertical axis 4202 and the horizontal axis 4204 in the depicted plane. The example light distribution pattern 4206 may be a variety of different shapes and sizes. For example the example light distribution pattern 4206 may be larger or smaller depending on the size of the light. Example light distribution pattern 4206 may be different for different light emitting devices as a result variations in manufacturing processes between different types of light emitting devices or different as a result of variation between manufacturing similar light emitting devices.

The light emitting devices may be positioned to emit light according to the light distribution pattern towards the playing chips. For example, in example embodiments, the light emitting device is a light-emitting diode as described in reference to the cage device 1200.

Figure 43:
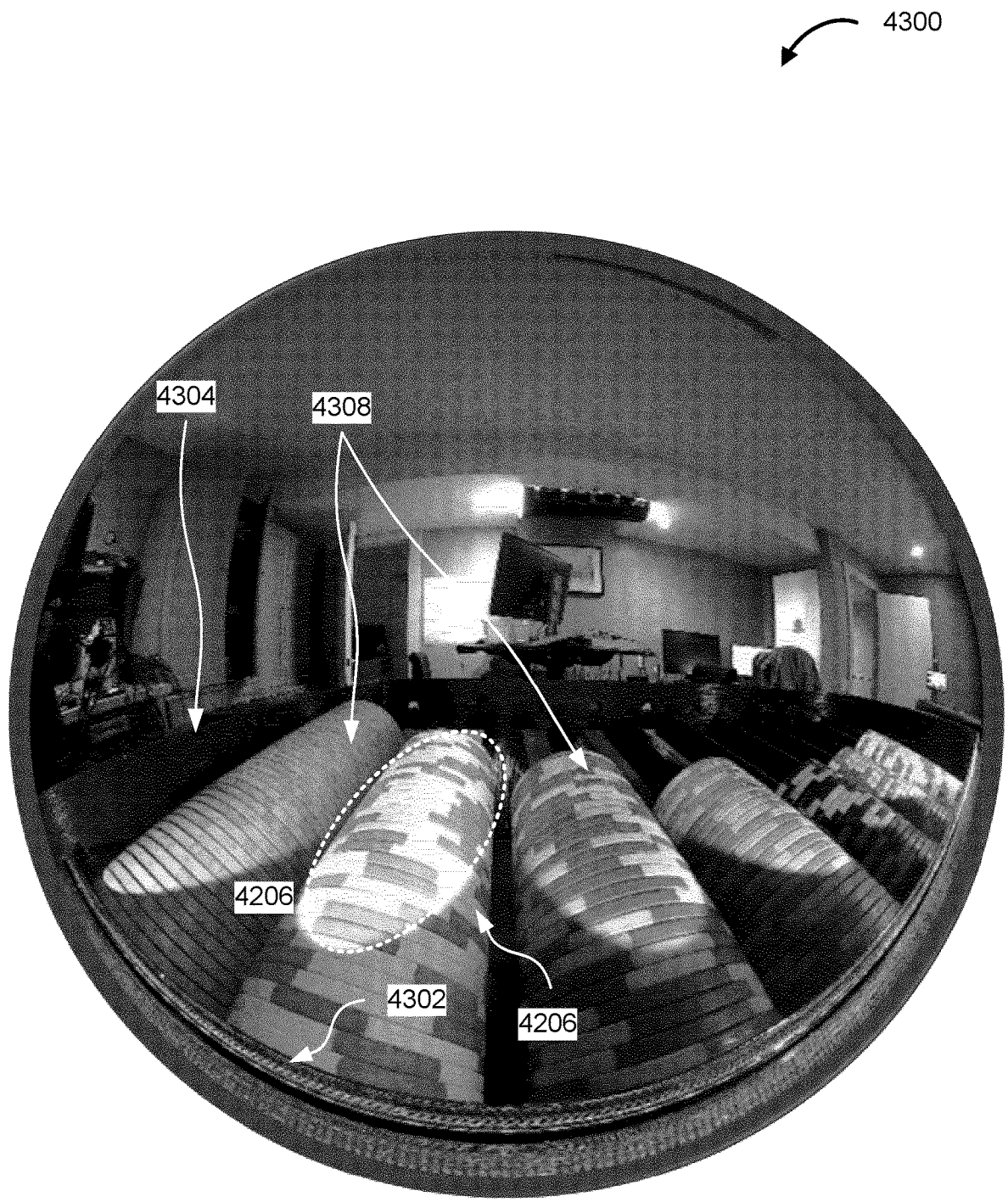
FIG. 43 shows a captured image of a chip tray, in accordance with an embodiment of the present application.

FIG. 43 shows a captured image 4300 of a chip tray 4304 illuminated by a light emitting device 4302 with a light emitted according to a light distribution pattern, in accordance with an embodiment. Captured image 4300 shows the playing chips 4308 in the chip tray 4304 (e.g., similar to playing chips 970 in chip tray 900) illuminated by the light emitting device 4302 according to a light distribution pattern (e.g., light distribution pattern 4206) where the light emitted by light emitting device 4302 does not pass through a diffuser (e.g., diffuser 4604 of FIG. 46).

In the shown embodiment, the playing chips 4308 are unevenly illuminated, with a greater amount of the light emitted from the light emitting device 4302 being incident on playing chips nearer to the light emitting device 4302. For example, in example embodiments where the captured image 4300 is reflective of an image of chips illuminated by a light having light distribution pattern 4206, more of the light emitted by the light emitting device 4302 is incident on the playing chips 4308 proximate to the light emitting device 4302, and which of the playing chips 4308 which are illuminated to a greater extent are defined by the light distribution pattern 4206 and the distance between the light emitting device 4302 and the playing chips 4308. In the shown embodiment, the uneven distribution of light intensity is visible in the projection of the light distribution pattern 4206 on the playing chips 4308.

Figure 44:
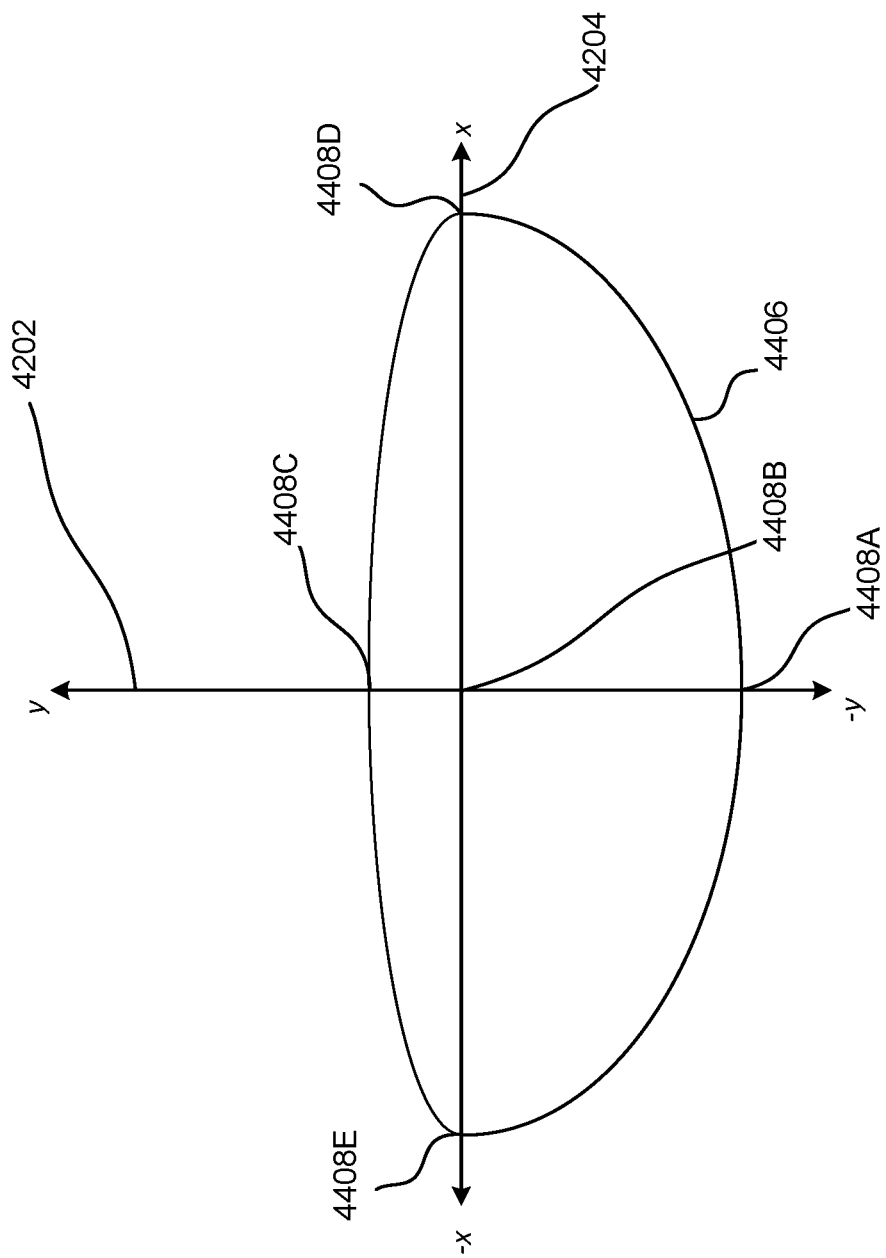
FIG. 44 illustrates another example light distribution pattern, in accordance with an embodiment of the present application.

FIG. 44 illustrates a further example light distribution pattern 4406, in accordance with an embodiment of the present application. In example embodiments, light distribution pattern 4406 results from light emitted by a light according to a light distribution pattern (e.g., light distribution pattern 4206) passing through a diffuser (e.g., diffuser 4502 of FIG. 49).

Light distribution pattern 4406 is asymmetric relative to the horizontal axis 4204, and symmetric relative to the vertical axis 4202, resulting in a greater amount of light being distributed below the horizontal axis 4204, where playing chips may be expected to be. Light distribution patterns, such as light distribution pattern 4406, having a majority of light being distributed below the horizontal axis 4204 may provide greater illumination of playing chips in, for example, a chip tray. In example embodiments, a diffuser is manufactured to produce a light distribution pattern shaped to have the largest intensity of emitted light in a location(s) where playing chips are expected to be. For example, the playing chips are expected to be in the third and fourth quadrants of FIG. 44, the light distribution pattern may be such to provide the greatest light intensity in the third and fourth quadrants. Similarly, the diffuser may be manufactured such that the light distribution pattern allows a low amount of light to pass through, or alternatively stated provide the lowest light intensity, to the locations where chips are not expected to be (e.g., a player's eyes), such as the first quadrant.

The shown light distribution pattern 4406 (alternatively referred to as an emittance plot) includes a bottom edge 4408A, defining the lowest point, relative to the horizontal axis 4204, at which light is emitted. Similarly, top edge 4408C defines the highest point, relative to the horizontal axis 4204, at which light is emitted. Center point 4408B defines a edge at which light emitted according to the light distribution travels perpendicular to the plane of the shown distribution. Rightmost edge 4408D defines, relative to the vertical axis 4202, the rightmost point at which light is emitted. Similarly, leftmost edge 4408E defines, relative to the vertical axis 4202, the leftmost point at which light is emitted.

The center point 4408B is parallel to the gaming surface 4608 in the shown plane. Center point 4408B may be a first vertical distance as measured in vertical axis 4202 from gaming surface 4608 in the shown plane, which first distance may be based on a size of an expected chip stack. For example, the first distance may be the average size of the chips that placed on the gaming surface 4608.

In the shown embodiment, the angle, in the shown plane, between the center point 4408B and the top edge 4408C is shown as being 5 degrees (alternatively referred to as the top angle). The top angle may be configured to be relatively low to prevent emitted light from shining into the eyes of a player interacting with the gaming surface 4608. In example embodiments, the top angle is substantially equal to 5 degrees, having a variation of plus or minus 5 degrees where the surface on which the one or more chips 4606 rest is relatively flat, such as gaming surface 4608.

In the shown embodiment, the angle, in the shown plane, between the center point 4408B and the bottom edge 4408A (alternatively referred to as the bottom angle) is similarly 5 degrees. Similar to the top angle, the bottom angle may be substantially equal to 5 degrees where the surface on which the one or more chips 4606 rest is relatively flat, such as gaming surface 4608.

Figure 45:
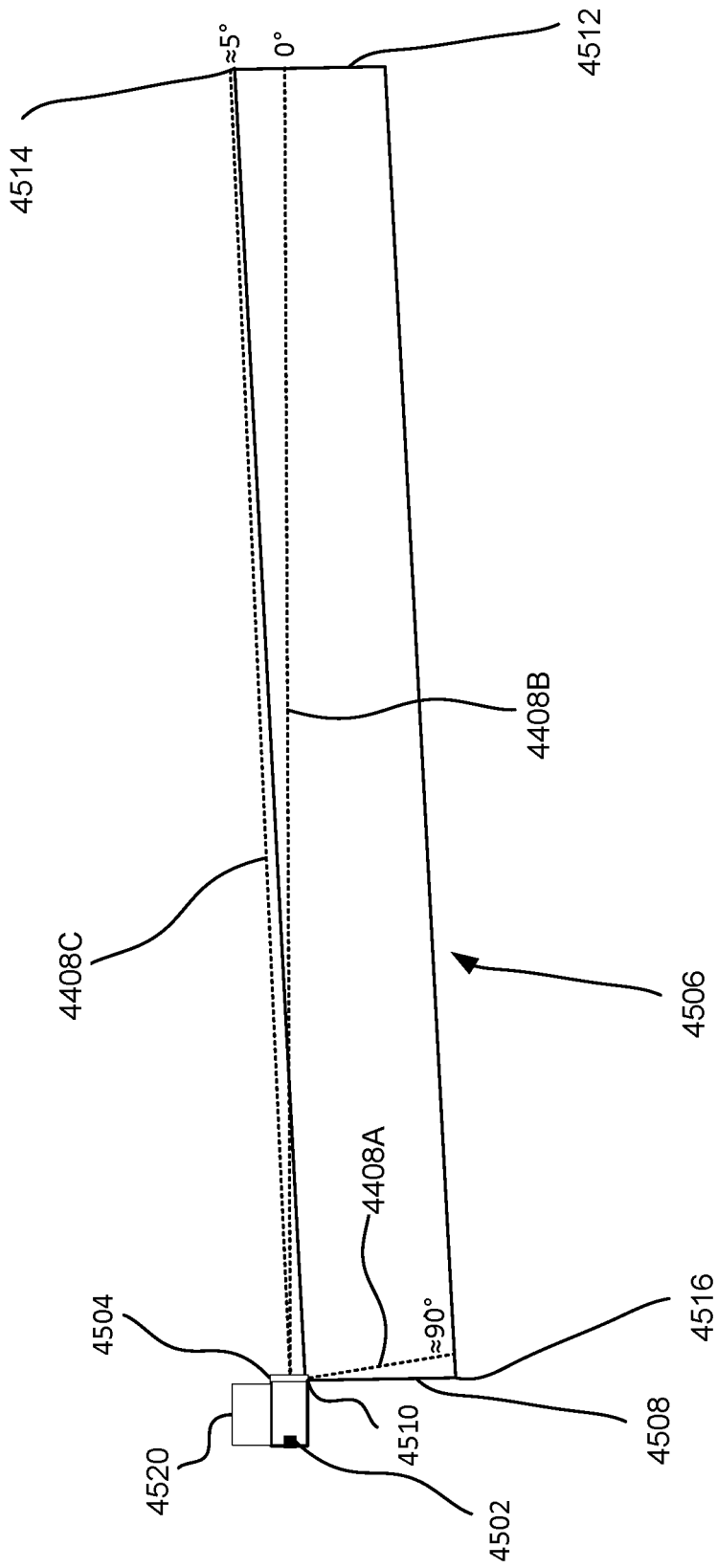
FIG. 45 illustrates a side view of gaming surface, in accordance with an embodiment of the present application.

FIG. 45 illustrates a side view of chip tray 4506, in accordance with an embodiment of the present application. Chip tray 4516 includes a distal wall 4512, and a proximate wall 4508, having a respective distal wall highest elevation 4514 (alternatively referred to as a first end of the distal wall) and a proximate wall highest elevation 4510 (alternatively referred to as a first end of the proximate wall), providing an inclined chip tray for receiving playing chips.

Light emitting device 4502 and diffuser 4504 are mounted to chip tray 4506 proximate to a proximate wall highest elevation 4510 of proximate wall 4508. Light emitted from light emitting device 4502 passes through diffuser 4504 and is modified into diffused light emitted according to the light distribution pattern 4406. The diffused light, relative to the light emitted from light emitting device 4502, distributes light more uniformly incident on playing chips within the chip tray 4506. For example, where light from light emitting device 4502 is unlikely to be reflected back to camera 4520 based on the expected position of playing chips in a leftmost region of the chip tray, as a result of chip tray 4506 geometry (e.g., the location, and incline of the chip tray), diffuser 4504 may be configured to permit a maximum amount of light directed towards the leftmost region through diffuser 4504, while permitting less light to pass through and other better lit regions of chip tray 4506.

In example embodiments, diffuser 4504 may re-direct or modify light emitted according to the light emitting device light distribution pattern having a relatively low amount of light pointed towards the leftmost region, into the second light distribution pattern, which includes a greater amount of light being directed towards the leftmost region. In example embodiments, the diffuser 4504 is configured to both redirect, or augment, light emitted from the light-emitting device 4502, and prevent some light emitted from the light-emitting device 4502, in order to generate a more uniform distribution of light across the playing chips within the chip tray 4506.

In example embodiments, the one or more image signal processing features include an auto brightness feature, and the normalized feature range is defined at least in part by minimum pixel values (in dark environmental conditions, or maximum pixel values in bright environmental conditions) in a pixel value reference scheme (e.g., a RGB notation). For example, the normalized feature range may be defined by a particularly dark shade of red to represent a red playing chip in a dark environment.

The combination of the static sensor sensitivity values and the diffused light may be particularly advantageous to capturing image data having a normalized feature range where the light-emitting device 4502 is proximate to the camera 4520, such as in a chip tray. In example embodiments, the combination of the normalized feature range and the diffused light illuminating the playing chips in the chip tray 4506 can be used to train a classifier to identify the presence and type of playing chips that has significant improvements in accuracy as compared to a similar classifier trained without the benefit of the normalized feature range and the diffused light. In example embodiments, accuracy improvements of greater than 50% may be possible.

In example embodiments, the light-emitting device 4502, and/or camera 4520 are controlled to, respectively, be activated, and to capture image data, in response to receiving a signal reflective of playing chips being detected within a chip storage aperture.

In example embodiments, two cameras (e.g., a first camera and a second camera, such as the left camera and the right camera of FIGS. 9A and 9B, are used to track playing chips. In such embodiments, the first image data, generated by the first camera, and the second image data, generated by the second camera, are used to populate a combined image data of the playing chips.

The combined image data may be generated by identifying one or more calibration parameters of the respective cameras. The calibration parameters may be identified by identifying one or more chip tray fiducials in both the first image data and the second image data. In example embodiments, chip tray fiducials include physical aspects of the chip tray 4506, such as the rear or distal wall. In example embodiments, chip tray fiducials may be objects or markings temporarily or permanently inserted on the board, such as a checkbox pattern placed atop the chip tray, or etched into certain surfaces of the chip tray. A distance between the one or more chip tray fiducials in each of the first image data and the second image data are compared to reference fiducials (which may be stored in a reference fiducial library) of the chip tray 4506. For example, the reference fiducials of the chip tray may be the true location of the chip tray fiducials based on the number geometry of the chip tray relative to the position of the respective camera.

One or more calibration parameters can thereafter be determined based on the distance between the fiducials and the reference fiducials. For example, the one or more calibration parameters may be used to determine overlap between the first image data and the second image data and unique image data within the first image data and the second image data. The one or more calibration parameters may be defined to average overlapping image data, and to append the unique data to the averaged image data. In example embodiments, various combinations of manipulations of overlapping image data and unique image data being defined by the one or more calibration parameters are contemplated.

The combined image is subsequently populated with the first image data and the second image data according to the one or more calibration parameters.

Light emitting device 4502 and diffuser 4504 are mounted to chip tray 4506 such that the top edge 4408C of diffused light is substantially coincident with (or angled towards) the distal wall highest elevation 4514. In example embodiments, substantially coincident may mean that the vertical distance (e.g., as measured along horizontal axis 4202) between the top edge 4408C and the distal wall highest elevation 4514 in the shown plane is no greater than 10 cm. In example embodiments, the top edge 4408C is incident on the distal wall 4512 just below the distal wall highest elevation 4514. In example embodiments, the top angle (i.e., the angle between the top edge 4408 C and the center point 4408B) is 5 degrees (plus or minus 5 degrees), or substantially similar thereto. In this way, the diffuser 4504 may prevent light that would not be directed towards playing chips in chip tray 4516 from passing through diffuser 4504, preventing light from entering for example, a player's eyes.

Similarly, light emitting device 4502 and diffuser 4504 are mounted to chip tray 4506 such that bottom edge 4408A is substantially coincident with a proximate wall lowest elevation 4516. Similar to the distance between the top edge 4408C and the distal wall highest elevation 4514, substantially coincident may mean that the distance between the bottom edge 4408A and the proximate wall lowest elevation 4516, in the shown plane, is no greater than 10 cm. In example embodiments, the bottom edge 4408A is incident on the interior of the chip tray 4506 at a location where chip storage apertures (e.g., chip storage aperture 320) begin. According to some embodiments, for example, the bottom angle (e.g. the angle between the bottom edge 4408A and the center point 4408B) is 90 degrees (exaggerated in the image for clarity).

Light emitted by the light emitting device 4502, passing through diffuser 4504, and being modified into the diffused light emitted according to the second light distribution may be calibrated to reflect the diffused light incident on the playing chips towards the camera 4520. For example, diffuser 4504 may be manufactured, or selected, to modify light passing through according to the second light distribution pattern so as to be angled to reflect off of an expected position of playing chips within the chip tray 4506.

Camera 4520 is positioned to capture the image data of playing chips within the chip tray 4506. Camera 4520 may be positioned such that only a portion of the field of view captures image data of the playing chips within the chip tray 4506. In example embodiments, camera 4520 is positioned such that the playing chips are in the entire field of view of the camera 4520.

Camera 4520 may be preprogrammed with one or more image signal processing features to generate image data based on optimized sensor sensitivity values. For example, camera 4520 may be preprogrammed by the camera manufacturer with image signal processing features such as automatic brightness tuning, automatic focus, automatic rebalancing of images, and other features generally associated with shutter speed, camera gain, aperture size, and other features of the camera 4520. Continuing the example, the one or more image signal processing features may be calibrated by the manufacturer to automatically implement the optimized sensor sensitivity values in response to detecting light conditions within the operating environment. For example, the optimized sensor sensitivity values may be changed as a result of the operation of an automatic brightness tuning image signal processing feature, increasing the amount of light captured by the camera 4520 when capturing image data within said environment. In a further example, camera 4520 may be capable of capturing image data consisting of pixel values in a pixel reference scheme.

For example, pixels within the image data may be represented by a pixel values in a pixel reference scheme having three channels; red, green, and blue, and each pixel may have a value of 0 to 255. The one or more image signal processing features may detect that the operating environment of camera 4520 is dark, and apply optimized sensor sensitivity values which automatically increase the pixel value of the image data captured in the dark operating environment. For example, in response to detecting a slightly dark environment in one portion of the chip tray, the image processing features may apply the optimized sensor sensitivity values which increase pixel values for the entire image by a relatively low amount (e.g., applying a small multiplier to each pixel value), shifting pixel values.

Similarly, in response to detecting a very dark environment in one portion of the chip tray, the image processing features may apply the optimized sensor sensitivity values which increase pixel values by a relatively large amount (e.g., applying a large multiplier to each pixel value), shifting pixel values of the entire image into a range dissimilar to pixels shifted with a smaller multiplier.

In example embodiments, the one or more image signal processing features of the camera 4520 are disabled, and camera 4520 generates image data based on static sensor sensitivity values. In contrast to the optimized sensor sensitivity values which are responsive to the detected lighting conditions within the operating environment (e.g., a casino environment having the chip trays), the static sensor sensitivity values do not change in response to changes in the operating environment (e.g. shadows cast on the chip tray). For example, in a slightly dark environment, the static sensor sensitivity values shift the captured pixel values a predefined amount. Similarly, in a very dark environment, the static sensor sensitivity values shift the captured pixel values the same predefined amount.

In example embodiments, where camera 4520 receives, via camera sensors (e.g., via a lens shaped to direct incident light towards a camera CMOS), the reflected diffused light from light incident on playing chips illuminated by the second light distribution pattern of diffuser 4504, and camera 4520 is configured with static sensor sensitivity values, camera 4520 perceives the reflected diffused light within a normalized feature range. For example, as a result of the more uniform light distribution of the second light distribution pattern, there may be a consistent supply of light according to one or more wavelengths reflected off the playing chips within the chip tray 4506 towards camera 4520.

Furthermore, because the playing chips are relatively fixed (e.g., playing chips are one of one or more chip types used by a casino), a relatively consistent supply of a particular reflected diffused light may be directed towards camera 4520. In combination with the consistent supply of light, and the consistent supply of the type of light, camera 4520 having static sensor sensitivity values may receive image data within a normalized feature range defined by the consistent supply of light and the consistent supply of type of light. For example, as a result of the consistent supply of light, a red playing chip may consistently reflect a particular wavelength of red light towards camera 4520, such that red playing chips produce consistent image data components within a particular feature range.

As a result of the consistent supply of light, furthermore, the red playing chips may consistently reflect the particular wavelength of red light towards the camera 4520 irrespective of the environmental conditions. Alternatively stated, red chips illuminated by the diffused light may produce image data having a consistent wavelength of light to represent the red coloring of the chip.

A normalized feature range may be defined by a subset of values responsive to the static sensor sensitivity values. For example, the static sensor sensitivity values may be selected to be particularly suited to an expected normalized feature range (e.g. calibrated to a certain color of chips for a particular casino). In example embodiments, the normalized feature range is based on one or more transformations of the captured image data. For example, the normalized feature range may be a feature range within a greyscale space, such that the static sensor sensitivity values may be selected to highlight the normalized feature range subsequent to a greyscale transformation being applied to the captured image data.

The normalized feature range may be a normalized feature range with respect to each type of playing chip. For example the normalized feature range may include a sub-range for blue chips, red chips, and the like.

Camera 4520 may capture image data according to a variety of channels (e.g., infrared red, green, blue, and the like), and similarly the static sensor sensitivity values and the normalized feature range may be defined based on the type of image data captured by camera 4520.

Figure 39:
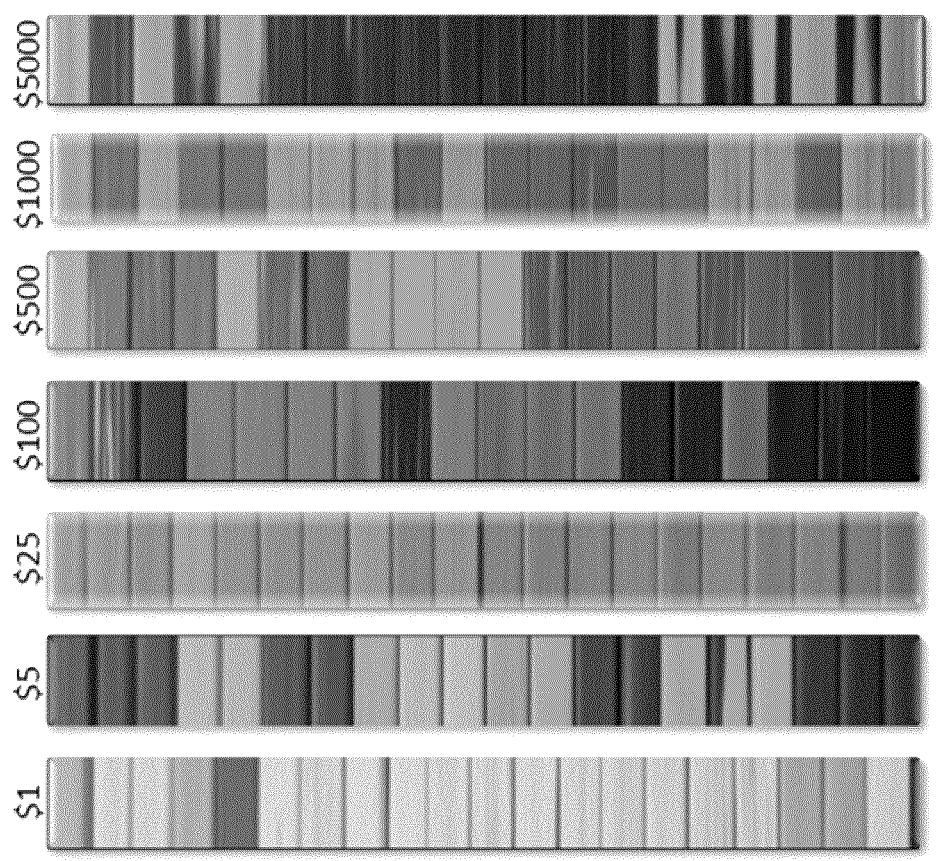
FIG. 39 illustrates respective images from contact image sensors for a plurality of playing chip denominations, in accordance with embodiments of the present application.

In example embodiments, camera 4520 may be a camera integrated into a contact image sensor which is embedded within a chip storage aperture of the chip tray (e.g., the contact image sensor of FIGS. 38-40). The contact image sensor camera may have a smaller sensor, with fewer image signal processing features which need to be disabled or modified. In example embodiments, the camera 4520 similarly has a smaller lens when integrated into a contact image sensor as compared to a camera not embedded in the chip tray 4506.

Various image signal processing features of the one or more image signal processing features may be deactivated according to various combinations. For example, every image signal processing feature may be disabled or only the automatic focusing feature of the camera 4520 may be disabled.

Figure 46:
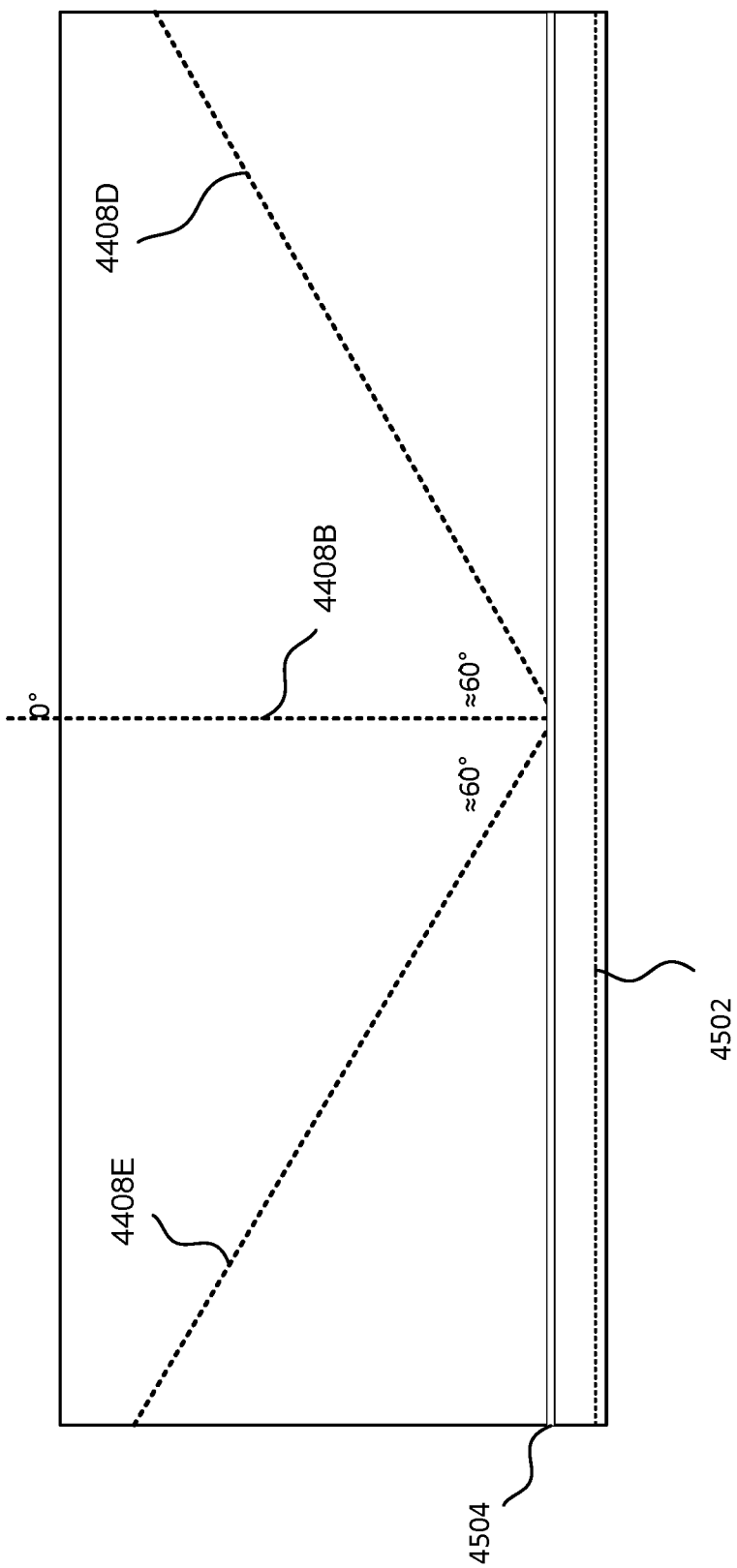
FIG. 46 illustrates a top view of the gaming surface of FIG. 45, in accordance with an embodiment of the present application.

FIG. 46 shows a top view of the chip tray 4506 of FIG. 45, in accordance with an embodiment of the present application. The rightmost angle (defined similarly to the rightmost angle of FIG. 44) and the leftmost angle (defined similarly to the leftmost angle of FIG. 44) are shown as being 30 degrees. In example embodiments, various leftmost and rightmost angles are contemplated.

Figure 47:
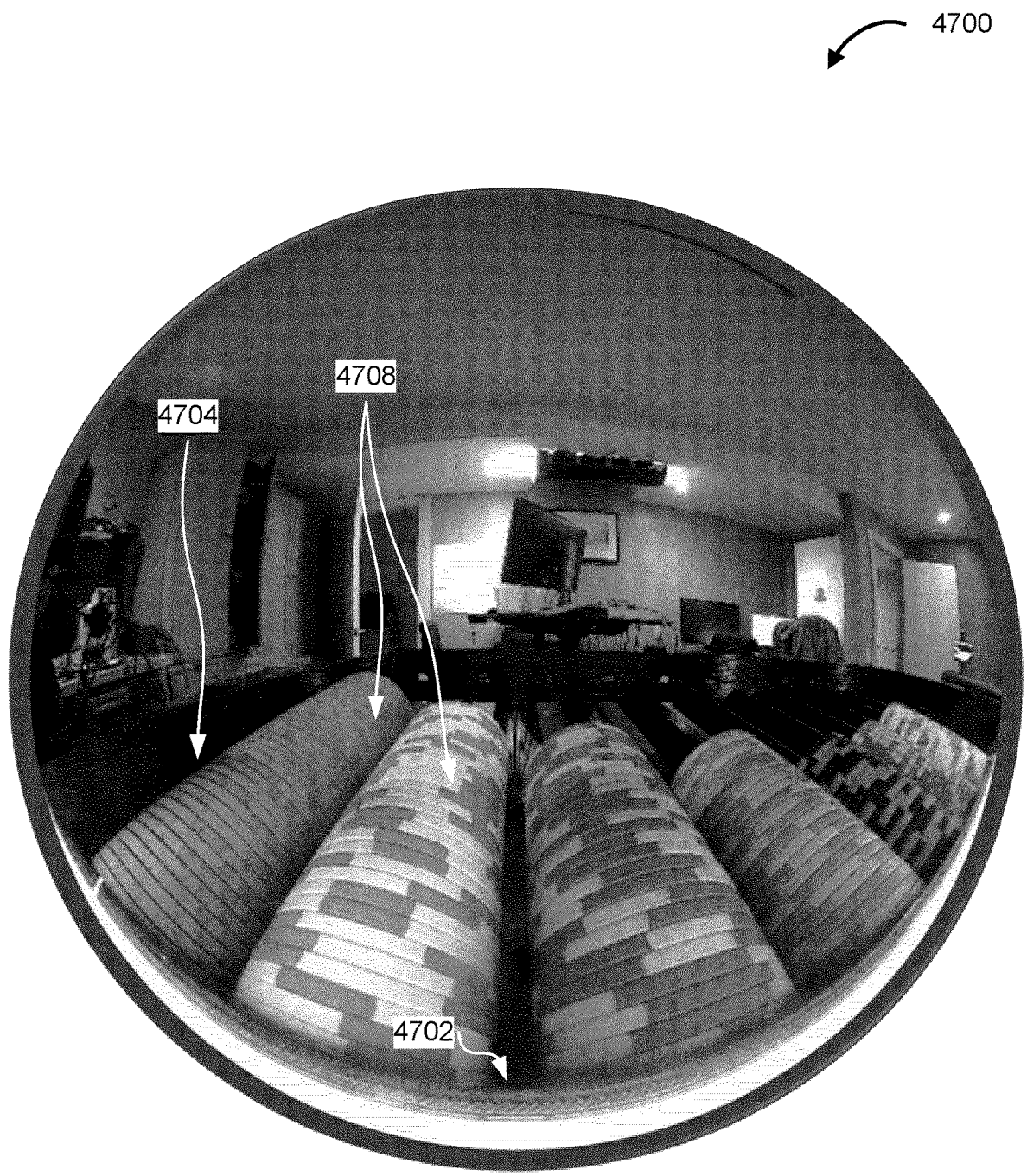
FIG. 47 shows a captured image of a chip tray illuminated in accordance with the light source of FIG. 45, in accordance with an embodiment of the present application.

FIG. 47 shows a captured image 4700 of a chip tray 4704 illuminated by a light emitting device 4702 in accordance with light distribution pattern (e.g., light distribution pattern 4406 of FIG. 44), in accordance with an embodiment of the present application. In the shown embodiment, a diffuser (not shown) is positioned between the light emitting device 4702 and the playing chips 4708, and the playing chips 4708 in captured image 4700 are more evenly illuminated, relative to captured image 4300, as a result of the operation of the diffuser (not shown).

Figure 48:
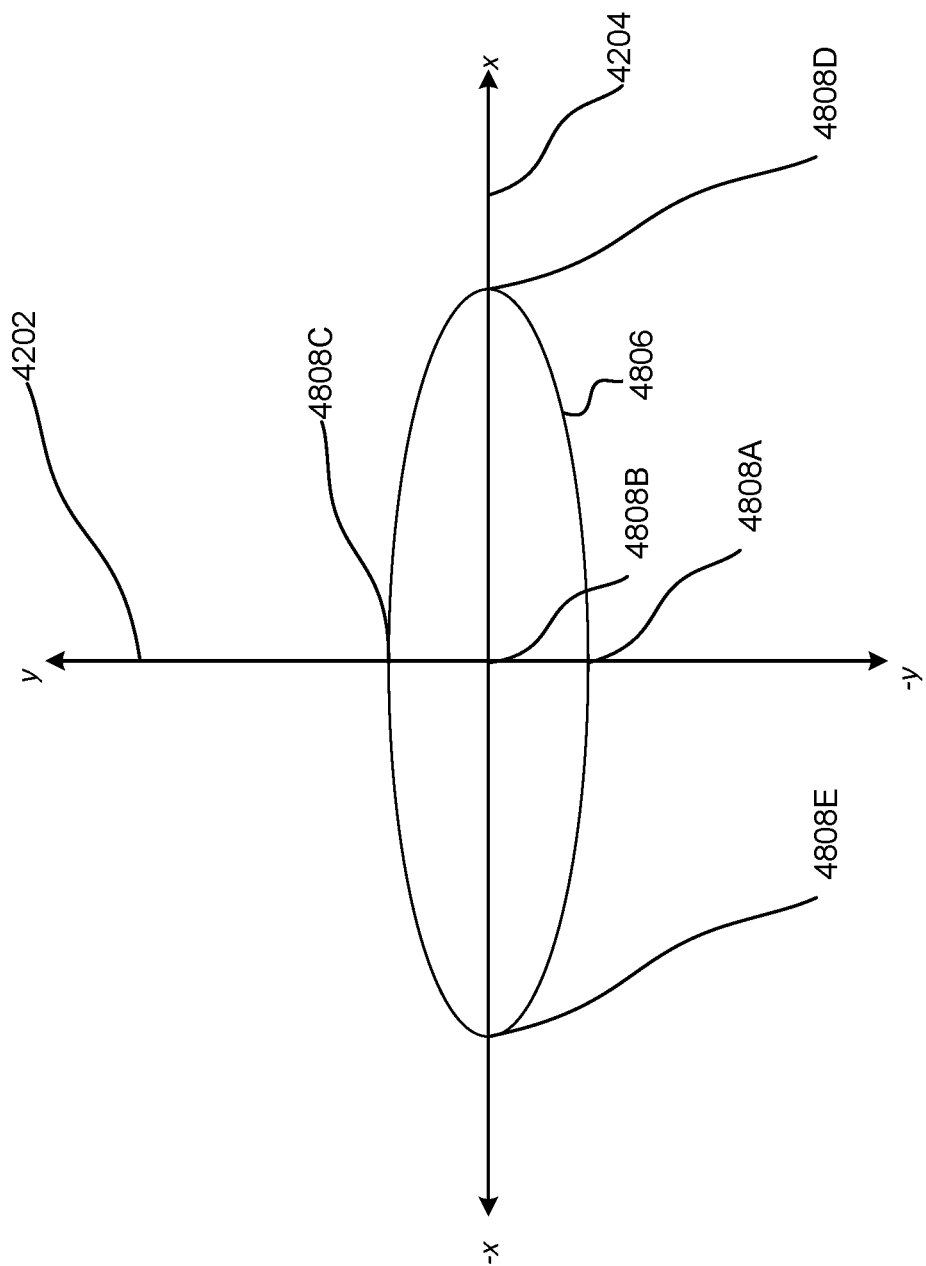
FIG. 48 illustrates a further example light distribution pattern, in accordance with an embodiment of the present application.

FIG. 48 illustrates another example light distribution pattern 4806, in accordance with an embodiment of the present application. In example embodiments, light distribution pattern 4806 results from light emitted by a light according to a light distribution pattern (e.g., light distribution pattern 4206) passing through a diffuser (not shown). In example embodiments, light distribution pattern 4806 is symmetric relative to the horizontal axis 4204 and the vertical axis 4202.

The shown light distribution pattern 4806 (alternatively referred to as an emittance plot) includes a bottom edge 4808A, defining the lowest point, relative to the horizontal axis 4204, at which light is emitted. Similarly, top edge 4808C defines the highest point, relative to the horizontal axis 4204, at which light is emitted. Center point 4808B defines a projection at which light emitted according to the light distribution travels perpendicular to the plane of the shown distribution. Rightmost edge 4808D defines, relative to the vertical axis 4202, the rightmost point at which light is emitted. Similarly, leftmost edge 4808E defines, relative to the vertical axis 4202, the leftmost point at which light is emitted.

In the shown light distribution pattern 4806, the distance from the bottom edge 4808A, or the top edge 4808C, to the horizontal axis 4204 is smaller relative to the distance from the leftmost edge 4808C, or the rightmost edge 4808D, to the vertical axis 4202, generating a light distribution pattern having a relatively oblong elliptical shape. In example embodiments, the distance between the various axes and the edges vary. For example, the distance between the rightmost edge 4808D to the vertical axis 4202 may be different than the distance between the leftmost edge 4808E and the vertical axis 4202. Various light distribution patterns are contemplated.

Figure 49:
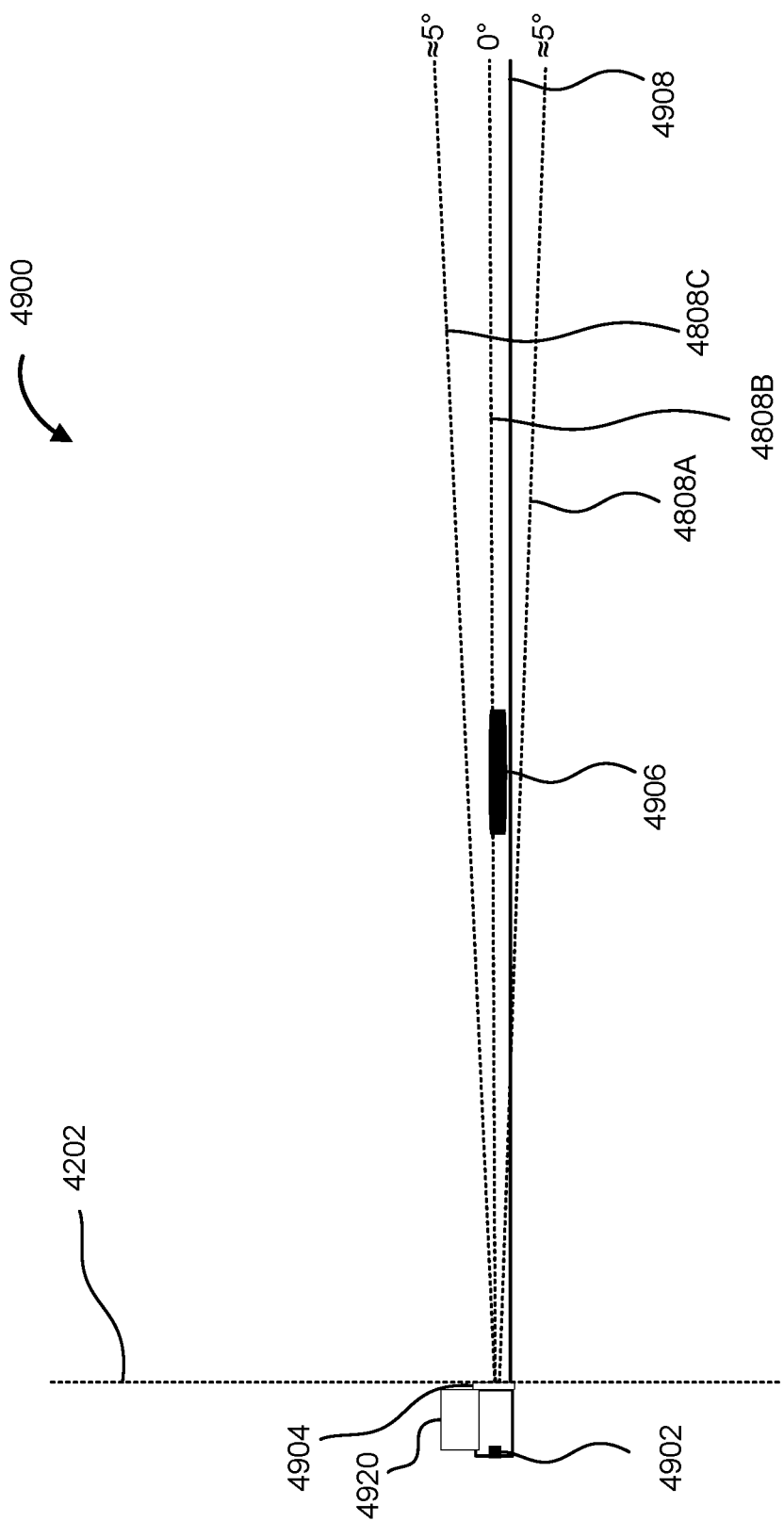
FIG. 49 illustrates a side view of a chip tray, in accordance with an embodiment of the present application.

FIG. 49 illustrates a side view of gaming surface 4900, in accordance with an embodiment of the present application. Gaming surface 4900 includes light 4902, and a diffuser 4904. The light emitting device 4902 emits light, which light passes through the diffuser 4904 and is diffused into a light emitted according to the light distribution pattern 4806, with the top edge 4808C, the bottom edge 4808A, and the center point 4808B. The emitted light passed through the diffuser 4904 is directed towards the one or more playing chips 4906 which are on gaming surface 4908.

In example embodiments, diffuser 4904 is a thin plastic covering or film (e.g., a polycarbonate, polyester or acrylic substrate) which is adhered to the light emitting device 4902. For example, diffuser 4904 may be a plastic covering or film having varying degrees of thickness throughout said plastic covering or film to produce the light distribution pattern 4806. Various types of diffusers are contemplated. For example, the diffuser may be a relatively planar sheet of plastic, or the diffuser may be a conically shaped plastic, glass, or other material capable of varying light passing through it.

In example embodiments, each diffuser 4904 is purpose made for a specific light 4902 in a specific environment. According to some embodiments, for example, a diffuser 4904 is designed for a type of light 4902, and the image processing techniques are based on the specific combination of diffuser type and light type. Continuing the example, diffuser 4904 may be made to retrofit existing cameras of a certain type.

Figure 50:
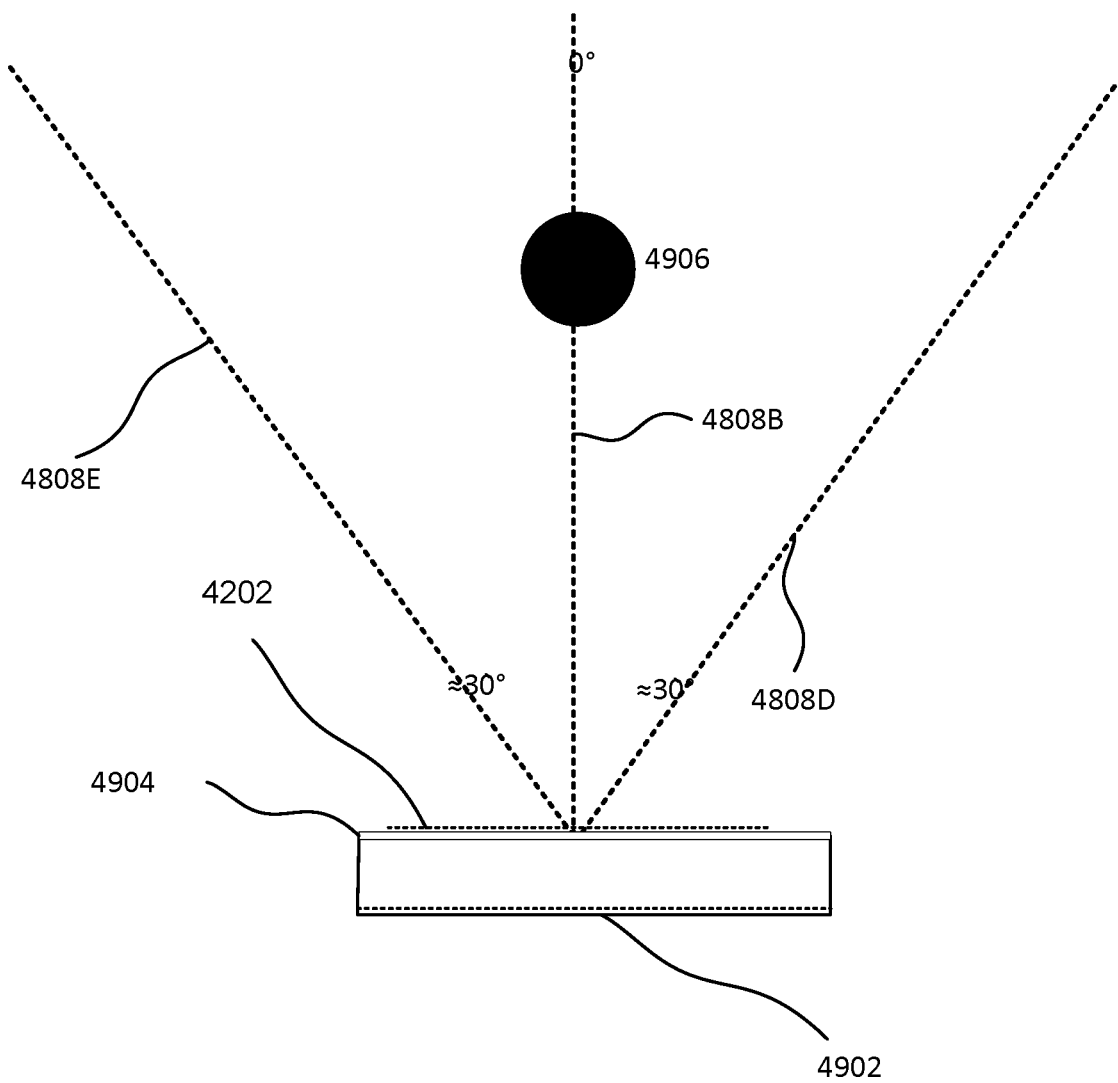
FIG. 50 shows a top view of the chip tray of FIG. 49, in accordance with an embodiment of the present application.

FIG. 50 illustrates a top view of the gaming surface 4908 of FIG. 49, in accordance with an embodiment of the present application. In the shown embodiment, the angle between the center point 4808B and both of the rightmost edge 4808D and the leftmost edge 4808E (alternatively referred to as the rightmost angle and the leftmost angle, respectively) is approximately 30 degrees.

According to some embodiments, a plurality of lights having a plurality of associated diffusers may be arranged around the gaming surface, and similarly a plurality of cameras may be positioned to capture images of the gaming surface. In example embodiments each camera may be paired with a light and associated diffuser, with both the camera and the light emitting device having a similar field of view. The light emitting device and associated diffusers described in FIGS. 44-50 may be used in conjunction with any of the systems and methods described in FIGS. 1 to 43.

In example embodiments, playing chip tracking systems including the light emitting device and the diffuser may be combined with other cameras, at least one or more sensors in at least one sensor array (e.g., sensors 310 arranged in a sensor array), and so forth. For example, playing chip tracking systems may be configured to activate the light emitting device and the camera in response to at least one or more sensors detecting one or more playing chips within the respective chip storage apertures of the chip tray. Similarly, playing chip tracking systems may be configured to activate the light emitting device and the camera in response to a signal that a user's hand crosses a threshold boundary associated with the openings of chip storage apertures of the chip tray (as described in relation to FIGS. 9A and 9B).

In example embodiments, in response to detecting the user's hand crosses the threshold boundary, the system may be configured to generate and transmit an alert (e.g., a message, a visual representation, an email, etc.) to the front and interface (e.g. front-end interface 60).

In example embodiments, the light emitting device having an associated diffuser is only activated to allow for a camera to capture an image of the playing chips in the chip tray illuminated by the light distribution pattern associated with the diffuser. Similarly, in response to the camera capturing the image of the playing chips, the light emitting device may be deactivated. In this way, player comfort may be increased as lights may not be continuously shining and providing a sense of being watched.

FIG. 51 illustrates a method 5100 of tracking playing chips, in accordance with an embodiment of the present application.

At step 5102, one or more images (in the form of image data) of the one or more playing chips within the chip tray are captured by one or more cameras, wherein the one or more playing chips are illuminated according to a light distribution pattern generated by a diffuser.

In example embodiments, the one or more cameras (and/or a light emitting devices) are activated in response to receiving a signal reflective of one or more playing chips being detected within a chip storage aperture. For example, the signal may be received in response to detection of chips by at least one sensor array embedded into the chip tray.

In example embodiments, the signal is a preprogrammed activation or control signal configured to activate or control the light emitting device or the camera to capture image data of the playing chips illuminated with the diffused light. For example, the signal may be a preprogrammed to capture the image data according to a reference interval. In example embodiments, the signal is an activation or control signal received from the game monitoring server 20. For example the signal may be a signal indicative of a new round of gaming action commencing. In example embodiments, the signal may be reflective of user input to capture the image data.

In example embodiments, the one or more cameras (and/or lights) are activated in response to image data being processed to identify a user hand crossing a threshold boundary associated with the openings of the chip storage apertures of the chip tray are detected. For example, image data may be captured every time a user hand interacts with a playing chip to track theft.

At step 5104, the captured image data is processed to determine series of amounts reflective of an amount of chip locations associated with each of the one or more chip types in the captured image data via a classifier.

In example embodiments, the classifier is trained to identify chip locations of the playing chips and one or more chip types associated with each chip location of the playing chips by comparing the image data to reference image data. The reference image data may at least in part defined by reflected diffused light that was incident on reference playing chips illuminated by the diffused light (i.e., light emitted according to a light distribution pattern generated by the diffuser) and captured with a reference camera having the static sensor sensitivity values for proceeding reflected diffused light within the normalized feature range. In example embodiments, the reference image data is generated during an calibration phase in the same operating environment where the image data is captured. For example, the reference camera may be the camera, and the reference image data may be generated during a set up phase.

In example embodiments, the reference image data is generated based on a method of generating reference data comprising capturing a plurality of sample image data of the chips using the reference camera of the playing chips incident on a variety of diffused light types (e.g., different channels of diffused light, different intensities of diffused light, etc.), and with the reference camera having a plurality of static sensor sensitivity values. The plurality of sample image data may subsequently be compared to a reference sample image data, and sample image data most similar to the reference sample image data may be used as the reference image data. The diffused light and static sensor sensitivity values of the most similar sample image data may thereafter be used as the static sensor sensitivity values of the camera, and the diffuser which generated the diffused light may be used as the diffuser for subsequent captured image data.

The reference representations or image data may be generated during an initial calibration phase of the system, wherein images are taken of the various playing chips (e.g., playing chips which may be specific to the casino in which the system is operating), annotated (manually, via unsupervised learning, or otherwise), and stored in a reference representation library.

At step 5106, a series of amounts reflective of an amount of chip locations associated with each of the one or more chip types is determined.

The series of amounts may be aggregated to generate a total or aggregate series of amounts. Similarly, a change in the series of amounts may be generated based on comparing the series of amounts and a previous series of amounts in the system.

At step 5108, the series of amounts are transmitted to a game monitoring server (e.g., game monitoring server 20).

FIG. 52 illustrates a flowchart of a method 5200 of calibrating a system for tracking playing chips, in accordance with an embodiment of the present application.

At step 5202, a light emitting device is activated. The light emitting device emits light towards the playing chips in a chip tray, the light emitted according to a light emitting device distribution pattern, wherein a diffuser is positioned between the light emitting device and the chip tray, the diffuser modifying the light passing through the diffuser into a diffused light emitted according to a second light distribution pattern, the second light distribution pattern calibrated to reflect the diffused light incident on the playing chips towards the camera.

At step 5204, image data of the illuminated chip tray having the playing chips is captured by a camera positioned to capture the image data of the playing chips. The camera may be preprogrammed to generate image data based on optimized sensor sensitivity values. The camera may have one or more image signal processing features disabled to generate the image data based on static sensor sensitivity values, and the camera static sensor sensitivity values may perceive reflected diffused light within a normalized feature range.

At step 5206, a classifier (e.g., the classifier of step 5104) having one or more calibration parameters for identifying current playing chips illuminated by the diffused light is trained based on identifying a chip location of each of the playing chips in the image data based on the normalized feature range, identifying a chip type of one or more chip types for each identified chip location based on the normalized feature range, and adjusting the one or more diffusion calibration parameters to have the classifier identify the identified location of the playing chips and the chip type of the playing chips. For example, the classifier may identify the location of certain playing chips based on the normalized feature range by detecting and expected red wavelength (e.g., as described in relation to FIG. 45) associated with the particular casinos red color chips. Continuing the example embodiment, based on an expected location of playing chips, and the normalized feature range be defined based on the expected color and other properties of the playing chips of the specific casino, the location may be determined based on detecting the expected color and intervals between said expected color. In example embodiments, the type of chip is identified based on the detected color in the image.

At step 5208, the determined diffusion calibration parameters are stored (e.g., in a reference representations library for calibrating the system).

In example embodiments, subsequent to method 5200, method 5100 may be performed with the trained classifier of method 5200 serving as the classifier in method 5100.

The system may process subsequent images of one or more current playing chips based on the diffusion calibration parameter stored in the reference representations library. For example, subsequent to the calibration, the system may be configured to capture via the camera one or more current images of one or more current playing chips within the chip tray. The captured one or more current images may be processed to determine one or more current playing chip amounts based on the one or more diffusion calibration parameters. Subsequently, the determined current playing chip amounts may be transmitted to a front-end interface for displaying.

Similar to method 5100, a method 5200, the camera and/or the light emitting device may be activated in response to detecting one or more current playing chips within the chip tray. The current playing chips may be detected by a sensor or at least one sensor of a sensor array. The camera and/or the light emitting device made also similarly be deactivated in response to the camera capturing one or more current images of the playing chips illuminated by the second light distribution pattern.

In example embodiments, receiving further image data from a contact image sensor embedded within the chip tray (e.g., within a chip tray aperture) positioned to capture further image data reflective of one or more images of the current playing chips is processed with a second classifier to generate a second series of amounts reflective of the amount of current chip locations associated with each of the one or more chip types. The second classifier may be trained similar to the classifier of method 5200, namely, the second classifier may be trained to identify the chip location of each of the playing chips in contact image sensor reference image data based on the normalized feature range, and identify the chip type of one or more chip types for each identified chip location in the contact image sensor reference image data based on the normalized feature range. Subsequently, the series of amounts (i.e., the series of amounts generated by a classifier trained according to method 5200, and subsequently used to generate a series of amounts in accordance with method 5100) and the second series of amounts (e.g., a series of amounts generated by the classifier of the contact image sensor) are compared to determine a final series of amounts. The final series of amounts may be an average of the various series of amounts, or a weighted average, and so forth.

In some embodiments, a non-transitory computer readable medium may store computer instructions affixed thereon. The computer readable medium may include a DVD, a CD, flash memory, a hard drive, among other types of computer readable medium.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. For example, the computer readable tangible, non-transitory medium may have instructions stored thereon which cause a processor to perform any of the methods set out herein (e.g., method 5100 or 5200).

The technical solution of embodiments may be a computer readable medium in the form of a software or computer program product. The software product may be stored in a non-volatile or non-transitory storage medium, which can be a compact disk read-only memory (CD-ROM), digital versatile disc (DVD), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

What is claimed is:

1. A system of tracking playing chips, the system comprising:
    a chip tray for receiving the playing chips;
    a camera preprogrammed with one or more image signal processing features to generate image data based on optimized sensor sensitivity values, the camera positioned to capture the image data of the playing chips, the camera having the at least one of the one or more image signal processing features disabled to generate the image data based on static sensor sensitivity values;
    a light emitting device emitting a light according to a light emitting device distribution pattern towards the playing chips;
    a diffuser positioned between the light emitting device and the playing chips, the diffuser modifying the light into a diffused light emitted according to a second light distribution pattern, the second light distribution pattern distributing light more uniformly, relative to the light emitting device distribution pattern, incident on the playing chips, the second light distribution pattern calibrated to reflect the diffused light incident on the playing chips towards the camera, wherein the camera static sensor sensitivity values perceive reflected diffused light within a normalized feature range; and
    a processor in communication the camera and a memory, the processor configured to:
        receive, from the camera, the image data reflective of the playing chips illuminated by the diffused light;
        process the image data with a classifier, the classifier trained to:
            identify chip locations of the playing chips and one or more chip types associated with each chip location by comparing the image data to reference image data reflective of reflected diffused light incident on reference playing chips illuminated by the diffused light and captured with a reference camera having the static sensor sensitivity values for perceiving reflected diffused light within the normalized feature range; and
            determine a series of amounts reflective of an amount of chip locations associated with each of the one or more chip types; and
        transmit the series of amounts to a game monitoring server.

2. The system of claim 1, wherein the one or more image signal processing features of the camera include an auto-brightness feature, and wherein the normalized feature range is defined by minimum pixel values in a pixel reference scheme of the static sensor sensitivity values.

3. The system of claim 1, wherein the one or more image signal processing features of the camera include an auto-brightness feature, and wherein the normalized feature range is defined by maximum pixel values in a pixel reference scheme of the static sensor sensitivity values.

4. The system of claim 1, wherein the camera integrated into a contact image sensor embedded within a chip storage aperture of the chip tray.

5. The system of claim 1, wherein the processor is further configured to:
    in response to receiving a signal reflective of the playing chips being detected within the chip storage aperture, control the camera to capture the image data.

6. The system of claim 5, wherein the processor is further configured to:
    in response to receiving the signal, activate the light emitting device to emit the light.

7. The system of claim 1, wherein the camera is a first camera positioned along a first side of the chip tray, and the image data reflective of one or more images is the first image data, further comprising:
    a second camera positioned at a position along a second side of the chip tray, and wherein the processor is further configured to:
        receive the second image data from the second camera;
        populate a combined image data of the playing chips with the first image data and the second image data by:

identifying one or more calibration parameters for the first camera and the second camera by:
  identifying one or more chip tray fiducials in the first image data and the second image data;
  comparing the one or more chip tray fiducials to one or more reference fiducials in a reference fiducial library;
  determining a distance between the one or more chip tray fiducials and the one or more reference fiducials; and
  determining the one or more calibration parameters for the first camera and the second camera, respectively, based on the distance and identifying overlap between the first image data and the second image data;
populating the combined image data by combining the images according to the one or more calibration parameters; and
determine the series of amounts based on the combined image data.

8. The system of claim 7, wherein the one or more calibration parameters average overlapping image data between the first image data and the second image data.

9. The system of claim 1, wherein the processor is further configured to determine an aggregate playing chip amount based the series of amounts.

10. The system of claim 1, wherein the chip tray includes a distal wall further from the camera and a proximate wall relatively nearer to the camera, the distal wall having a distal wall elevation greater than a proximate wall elevation of the proximate wall, and wherein a top edge of the diffused light is angled at the distal wall elevation.

11. A method of calibrating a system for tracking playing chips, the method comprising:
  activating a light emitting device to emit a light towards the playing chips in a chip tray, the light emitted according to a light emitting device distribution pattern, wherein a diffuser is positioned between the light emitting device and the chip tray, the diffuser modifying the light passing through the diffuser into a diffused light emitted according to a second light distribution pattern, the second light distribution pattern calibrated to reflect the diffused light incident on the playing chips towards the camera;
  capturing image data, with a camera preprogrammed to generate image data based on optimized sensor sensitivity values, the camera positioned to capture the image data of the playing chips, the camera having one or more image signal processing features disabled to generate the image data based on static sensor sensitivity values, the camera static sensor sensitivity values perceiving reflected diffused light within a normalized feature range;
  training a classifier having one or more calibration parameters for identifying current playing chips illuminated by the diffused light based on:
    identifying a chip location of each of the playing chips in the image data based on the normalized feature range;
    identifying a chip type of one or more chip types for each identified chip location based on the normalized feature range; and
    adjusting the one or more diffusion calibration parameters to have the classifier identify the identified location of the playing chips and the chip type of the playing chips; and
  storing the one or more diffusion calibration parameters on a memory.

12. The method of claim 11, wherein the one or more image signal processing features of the camera include an auto-brightness feature, and wherein the normalized feature range is defined by minimum pixel values in a pixel reference scheme of the static sensor sensitivity values.

13. The method of claim 11, wherein the one or more image signal processing features of the camera include an auto-brightness feature, and wherein the normalized feature range is defined by maximum pixel values in a pixel reference scheme of the static sensor sensitivity values.

14. The method of claim 11, further comprising:
  capturing, via the camera, current image data reflective of one or more current images of current playing chips in the chip tray;
  processing the current image data with the trained classifier to determine, for each current playing chip, a current chip location and a current chip type of the one or more chip types based on the one or more diffusion calibration parameters; and
  transmitting a series of amounts reflective of an amount of current chip locations associated with each of the one or more chip types to a game monitoring server.

15. The method of claim 14, further comprising:
  determining an aggregate playing chip amount based on the series of amounts; and
  transmitting the aggregate playing chip amount to a game monitoring server.

16. The method of claim 11, further comprising:
  in response to receiving a signal reflective of the playing chips being detected within the chip tray, activating the light emitting device to emit the light.

17. The method of claim 11, wherein the second light distribution pattern is asymmetric relative to a horizontal axis parallel to a gaming surface associated with the chip tray.

18. The method of claim 11, wherein the camera is a first camera positioned along a first side of the chip tray and the current image data is first image data, and further comprising:
  receiving second image data from a second camera at a position along a second side of the chip tray to capture one or more images of the current chips;
  populating a combined image data of the playing chips with the first image data and the second image data by:
    identifying one or more calibration parameters for the first camera and the second camera by:
      identifying one or more chip tray fiducials in the first image data and the second image data;
      comparing the one or more chip tray fiducials to one or more reference fiducials in a reference fiducial library;
      determining a distance between the one or more chip tray fiducials and the one or more reference fiducials;
      determining the one or more calibration parameters for the first camera and the second camera, respectively, based on the distance and identifying overlap between the first image data and the second image data;
    populating the combined image data by combining the images according to the one or more calibration parameters; and
  determining the series of amounts reflective of an amount of chip locations associated with each of the one or more chip types based on the combined image data.

19. The method of claim 18, wherein the one or more calibration parameters average overlapping image data between the first image data and the second image data.

20. A non-transitory computer readable medium storing machine interpretable instructions which, when executed by a processor, cause the processor to perform a method comprising:
- activating a light emitting device to emit a light towards the playing chips in a chip tray, the light emitted according to a light emitting device distribution pattern, wherein a diffuser is positioned between the light emitting device and the chip tray, the diffuser modifying the light passing through the diffuser into a diffused light emitted according to a second light distribution pattern, the second light distribution pattern calibrated to reflect the diffused light incident on the playing chips towards the camera; and
- capturing image data, with a camera preprogrammed to generate image data based on optimized sensor sensitivity values, the camera positioned to capture the image data of the playing chips, the camera having one or more image signal processing features disabled to generate the image data based on static sensor sensitivity values, the camera static sensor sensitivity values perceiving reflected diffused light within a normalized feature range;
- training a classifier having one or more calibration parameters for identifying current playing chips illuminated by the diffused light based on:
    - identifying a chip location of each of the playing chips in the image data based on the normalized feature range;
    - identifying a chip type of one or more chip types for each identified chip location based on the normalized feature range; and
    - adjusting the one or more diffusion calibration parameters to have the classifier identify the identified location of the playing chips and the chip type of the playing chips; and
- storing the one or more diffusion calibration parameters on a non-transitory computer readable memory.

* * * * *